US007425802B2

(12) United States Patent
Kumagai et al.

(10) Patent No.: US 7,425,802 B2
(45) Date of Patent: Sep. 16, 2008

(54) DISCHARGE LAMP LIGHTING APPARATUS, LUMINAIRE AND ILLUMINATION SYSTEM

(75) Inventors: Jun Kumagai, Kadoma (JP); Satoru Nagata, Shijonawate (JP); Minoru Maehara, Matsubara (JP); Naoki Komatsu, Kobe (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 11/568,142

(22) PCT Filed: Apr. 19, 2005

(86) PCT No.: PCT/JP2005/007467

§ 371 (c)(1),
(2), (4) Date: Oct. 20, 2006

(87) PCT Pub. No.: WO2005/104630

PCT Pub. Date: Nov. 3, 2005

(65) Prior Publication Data

US 2007/0210723 A1 Sep. 13, 2007

(30) Foreign Application Priority Data

| Apr. 23, 2004 | (JP) | ............................. 2004/128788 |
| Apr. 23, 2004 | (JP) | ............................. 2004/128790 |
| Sep. 3, 2004 | (JP) | ............................. 2004/257720 |

(51) Int. Cl.
*G05F 1/00* (2006.01)

(52) U.S. Cl. .................. 315/291; 315/360; 315/224; 315/DIG. 5; 315/DIG. 7; 315/209 R; 315/289; 315/312

(58) Field of Classification Search ............ 315/209 R, 315/247, 224, 226, 291, 294, 307, 308, 312, 315/324, 289, 290, 360, 362, DIG. 5, DIG. 7
See application file for complete search history.

(56) References Cited

U.S. PATENT DOCUMENTS 6,066,921 A 5/2000 Nakamura et al. ............ 315/71

(Continued)

FOREIGN PATENT DOCUMENTS

| JP | 2003-229289 | 8/2003 |
| JP | 2003-338392 | 11/2003 |

OTHER PUBLICATIONS

English Language Abstract of JP 2003-338392.
English Language Abstract of JP 2003-229289.

*Primary Examiner*—Haissa Philogene
(74) *Attorney, Agent, or Firm*—Greenblum & Bernstein, P.L.C.

(57) ABSTRACT

There is provided a high-intensity discharge lamp lighting apparatus to be loaded with a plurality of types of high-intensity discharge lamps and connected with any one of the lamps to be lighted, and the apparatus comprises a power conversion circuit for converting power supplied from a DC power source to supply the power to a high-intensity discharge lamp and a lighting control circuit for controlling the supply power of the power conversion circuit, wherein the type of the connected high-pressure discharge lamp is determined based upon a change rate of an electric characteristic of the high-intensity discharge lamp during a specific period, and the connected high-intensity discharge lamp is lighted with a desired electric characteristic selected based upon the determination result, thereby enabling discrimination of types of rated power of the plurality of types of lamps by the same detection method and the same control method irrespective of states in starting of the lamps, and by enabling the discrimination before stable lighting of the lamp, it is possible to start the discharge lamp with little stress applied to the discharge lamp.

45 Claims, 40 Drawing Sheets

U.S. PATENT DOCUMENTS

| | | | |
|---|---|---|---|
| 6,914,395 B2 * | 7/2005 | Yamauchi et al. | 315/308 |
| 6,958,581 B2 * | 10/2005 | Okawa et al. | 315/291 |
| 7,141,937 B2 * | 11/2006 | Kumagai et al. | 315/224 |
| 2004/0113567 A1 | 6/2004 | Yamauchi et al. | 315/291 |
| 2006/0049777 A1 | 3/2006 | Kumagai et al. | 315/224 |
| 2007/0063659 A1 * | 3/2007 | YAamashita et al. | 315/360 |

* cited by examiner

CHANGE IN BALLAST CHARACTERISTIC OF 35W LAMP

DISCHARGE LAMP LIGHTING APPARATUS, LUMINAIRE AND ILLUMINATION SYSTEM

TECHNICAL FIELD

The present invention relates to a discharge lamp lighting apparatus fox electronically lighting a high-intensity discharge lamp, and to a luminaire and an illumination system which comprise the discharge lamp lighting apparatus.

BACKGROUND ART

Conventionally, a copper-iron type stabilizer has been mainstream as a high-intensity discharge lamp lighting apparatus for lighting a high-intensity discharge lamp (hereinafter, simply referred to as "discharge lamp" or "HID lamp"). However, an electronic ballast is recently becoming mainstream which uses a large number of electronic components with the aim of size and weight reduction as well as a function increase of a stabilizer. This electronic ballast is briefly described below.

A direct-current (DC) power source circuit section including a rectification circuit is connected to an alternating-current (AC) power source. A power conversion circuit section capable of adjusting and controlling a supply power to a discharge lamp is connected to the output end of the DC power source circuit section. Further, the discharge lamp is connected to the output end of the power conversion circuit section. The power conversion circuit section comprises: an inverter circuit section for converting an output of the DC power source circuit section into an AC voltage of a low frequency to be supplied to the discharge lamp and comprises a lighting control circuit section for controlling an operation of the inverter circuit section according to a state of the discharge lamp.

As for the conventional high-intensity discharge lamp lighting apparatus as described above, when HID lamps with different characteristics are to be lighted, it has been necessary to use high-intensity discharge lamp lighting apparatuses applying to the respective lamps intended to be lighted. Namely, it has been necessary to set high-intensity discharge lamp lighting apparatuses exclusively for the respective discharge lamps with different characteristics, which results in incurring a great deal of investment in terms of development cost, development term, and the like. For such a reason, the high-intensity discharge lamp lighting apparatus has been desired to have a performance capable of lighting a plural types of HID lamps.

Japanese Patent Laid-Open No. 2003-229289 proposes a high-intensity discharge lamp lighting apparatus adapted to light a plural types of HID lamps, introducing a means of integrating a time until the HID lamps exceed a prescribed threshold to discriminate the types of HID lamps as loads, and a means of giving a transitional change from the lighting apparatus to the HID lamps after the HID lamps reach the stable lighting state to detect transitional responses of the loads so as to discriminate the load types.

FIG. 54 shows a block diagram of the conventional example disclosed in Japanese Patent Laid-Open No. 2003-229289. In this figure, the apparatus comprises; a DC power source 111; a power conversion circuit 112 for converting a power from the DC power source 111 to supply the power to a high-intensity discharge lamp DL; a lighting control circuit 114 for controlling the supply power of the power conversion circuit 112; a detection means 115 of detecting that an electric characteristic, an optical characteristic or a temperature characteristic of the high-intensity discharge lamp after turning-on of the DC power source has exceeded a prescribed threshold; a timer means 116 of integrating the time until the characteristic exceeds the prescribed threshold; and a discrimination means 117 of discriminating the types of high-intensity discharge lamps according to the lengths of the integrated time obtained by the timer means 116. With such a configuration, the discharge lamp lighting apparatus and a luminaire are provided, wherein the apparatus is capable of discriminating a plurality of high-intensity discharge lamps with different rated power and lighting those high-intensity discharge lamps with the respective rated power.

As described above, the load objects of the lighting apparatus of Japanese Patent Laid-Open No. 2003-229289 are HID lamps with a plurality of types of rated power, and this lighting apparatus discriminates the types of loads according to transient characteristics or steady characteristics of the HID lamps when lighted, thereby to light any of the HID lamps at a rating. This makes it possible to use the HID lamps with different rated power with one lighting apparatus. There are therefore advantages as follows. For example, the HID lamp is easily switched to one with a lower rated power than normal for the purpose of energy saving. Further, when an optical design is to be changed due to renovation of a store or the like, what is required is just replacement of the HID lamp.

Further, foregoing Japanese Patent Laid-Open No. 2003-229289 proposes measurement of the time until the transient characteristic exceeds a prescribed value as a means of discriminating the loads, and proposes modification of the time in restarting. Here, the time is corrected in restarting because the startup in restarting is faster than that as an initial start characteristic.

DISCLOSURE OF INVENTION

Problem to be Solved by Invention

In the case of using the conventional example of Japanese Patent Laid-Open No. 2003-229289, the transient characteristic of the HID lamp in the restarting mode, where the power source is turned on again immediately after turning-off of the HID lamp, differs from in initial starting, thereby leading to regulation of the timing of restarting the HID lamp. Besides, it is considered that, when the transitional change is given after the HID lamp is once stably lighted, an excessive load may be applied to the HID lamp, or the control becomes complicated.

Moreover, Japanese Patent Laid-Open No. 2003-229289 does not disclose a method of discriminating between an initial start and a restart. Further, there are not only two startup states as the initial start and restart characteristics, but a variety of in between states can be taken depending upon a cooling condition of the HID lamp. Consequently, a more reliable load discrimination means is necessary, and in particular, a load discrimination means based upon the assumption of the difference between the initial start and the restart is necessary.

As described above, a change in behavior of the HID lamp due to improvement in characteristic thereof cannot be dealt with by mere discrimination based upon the transient characteristic.

Further, while the discharge lamp lighting apparatus of Japanese Patent Laid-open Publication No. 2003-229289 discriminates a plural types of high-intensity discharge lamps and lights the lamps with the respective rated lamp power, there is no description of an output characteristic of the lighting apparatus. Generally, there exists a rated value of each of the high-intensity discharge lamps, and when the lamp is lighted by a lighting apparatus deviating from the rated value of the lamp, a prescribed discharge lamp characteristic does not appear, or the life of the discharge lamp significantly deteriorates.

The present invention was made for solving the problems as described above, and has an object to provide a high-intensity discharge lamp lighting apparatus, which is capable of discriminating types of rated power of a plurality of types of HID lamps by the same detection method and the same control method irrespective of states in starting the lamps, namely an initial start and a restart, and also capable of performing the discrimination before stably lighting the HID lamp so as to start the HID lamp with little stress applied thereto.

Further, it is an object to enable load discrimination with respect to improvement in characteristics of the HID lamps in the discharge lamp lighting apparatus capable of lighting a plurality of discharge lamps with respective rated power and further capable of automatically discriminating the rated power of the discharge lamps to light the discharge lamps with the rated power thereof.

Moreover it is an object to provide a discharge lamp lighting apparatus and a luminaire, the apparatus being capable of discriminating a plurality of discharge lamp with different rated power and lighting the discharge lamps with the respective rated power, and also preventing deterioration in start property and the life of each of the HID lamps.

MEANS FOR SOLVING PROBLEM

In order to achieve the above-mentioned object, a high-intensity discharge lamp lighting apparatus according to a first aspect of the present invention is a discharge lamp lighting apparatus whose load objects are a plurality of types of high-intensity discharge lamps and which connects any one of those lamps for lighting, the apparatus comprising: a power conversion circuit section for converting power from a DC power source into AC power to supply the power to a high-intensity discharge lamp; a lighting control circuit section for controlling the supply power of the power conversion circuit section; and a discrimination means for determining the type of the connected high-intensity discharge lamp, wherein the discrimination means determines the type of the connected high-intensity discharge lamp based upon a change rate of an electric characteristic of the high-intensity discharge lamp during a specific period, and lights the connected high-intensity discharge lamp with a desired electric characteristic selected based upon the determination result.

A high-intensity discharge lamp lighting apparatus according to a second aspect of the present invention is a discharge lamp lighting apparatus, being connectable with a plurality of types of high-intensity discharge lamps, and comprising: a power conversion circuit section for converting power from a DC power source into AC power to supply the power to a high-intensity discharge lamp; and a lighting control circuit section for controlling the supply power of the power conversion circuit section, wherein the discharge lamp lighting apparatus comprises: a detection means for detecting a transient characteristic in starting of the high-intensity discharge lamp after the DC power source is turned on until the state of the lamp is shifted to a stable lighting state and detecting a ballast characteristic in stable lighting; a discrimination means for automatically determining the type of the connected high-intensity discharge lamp based upon a combination of results of detection by the detection means; a switching means for switching target lighting power for driving the high-intensity discharge lamp based upon the types of high-intensity discharge lamps determined by the discrimination means; and a lighting means for lighting the high-intensity discharge lamp with rated power according to the determined type of the high-intensity discharge lamp.

A high-intensity discharge lamp lighting apparatus according to a third aspect of the present invention is a discharge lamp lighting apparatus, comprising: a power conversion circuit section for converting power from a DC power source and supplying the power to a high-intensity discharge lamp; and a lighting control circuit section for controlling the supply power of the power conversion circuit section and also discriminating a plurality of types of high-intensity discharge lamps to control lighting power of the discharge lamps, wherein a voltage-current characteristic as an output characteristic of the discharge lamp lighting apparatus is set from a voltage-current characteristic set within a range of twice the minimum rated lamp current to twice the maximum rated lamp current out of the plurality of types of high-intensity discharge lamps and a voltage-current characteristic consisting of a range of a constant lamp power characteristic of the minimum rated lamp power and a constant lamp power characteristic of the maximum rated lamp power out of the plurality of types of high-intensity discharge lamps.

EFFECT OF INVENTION

By use of the high-intensity discharge lamp lighting apparatus according to the first aspect of the present invention, it is possible to discriminate a plurality of types of lamp rated power without applying stress to the lamps irrespective of states (initial start, restart) of the lamps so that storage of only one type of high-intensity discharge lamp lighting apparatus is required in production of a luminaire thereby to reduce production cost. Further, it is possible for a user to replace the lamps as usage.

According to the second aspect of the present invention, in the discharge lamp lighting apparatus capable of lighting a plurality of discharge lamps with rated power and further capable of automatically discriminating rated power of the discharge lamps to light the discharge lamps with the respective rated power thereof, even when the load object is a load whose transient characteristic is significantly different due to improvement in lamp characteristics, it is possible to reliably perform load discrimination based upon a difference between the transient characteristics in starting and two different constant characteristics.

According to the third aspect of the present invention, it is possible to provide a discharge lamp lighting apparatus and a luminaire, the apparatus being capable of discriminating a plurality of discharge lamps with different rated power and lighting the discharge lamps with the respective rated power, and also preventing deterioration in start characteristic and the life of each of the lamps.

EXPLANATION OF SYMBOLS

Figure 1:
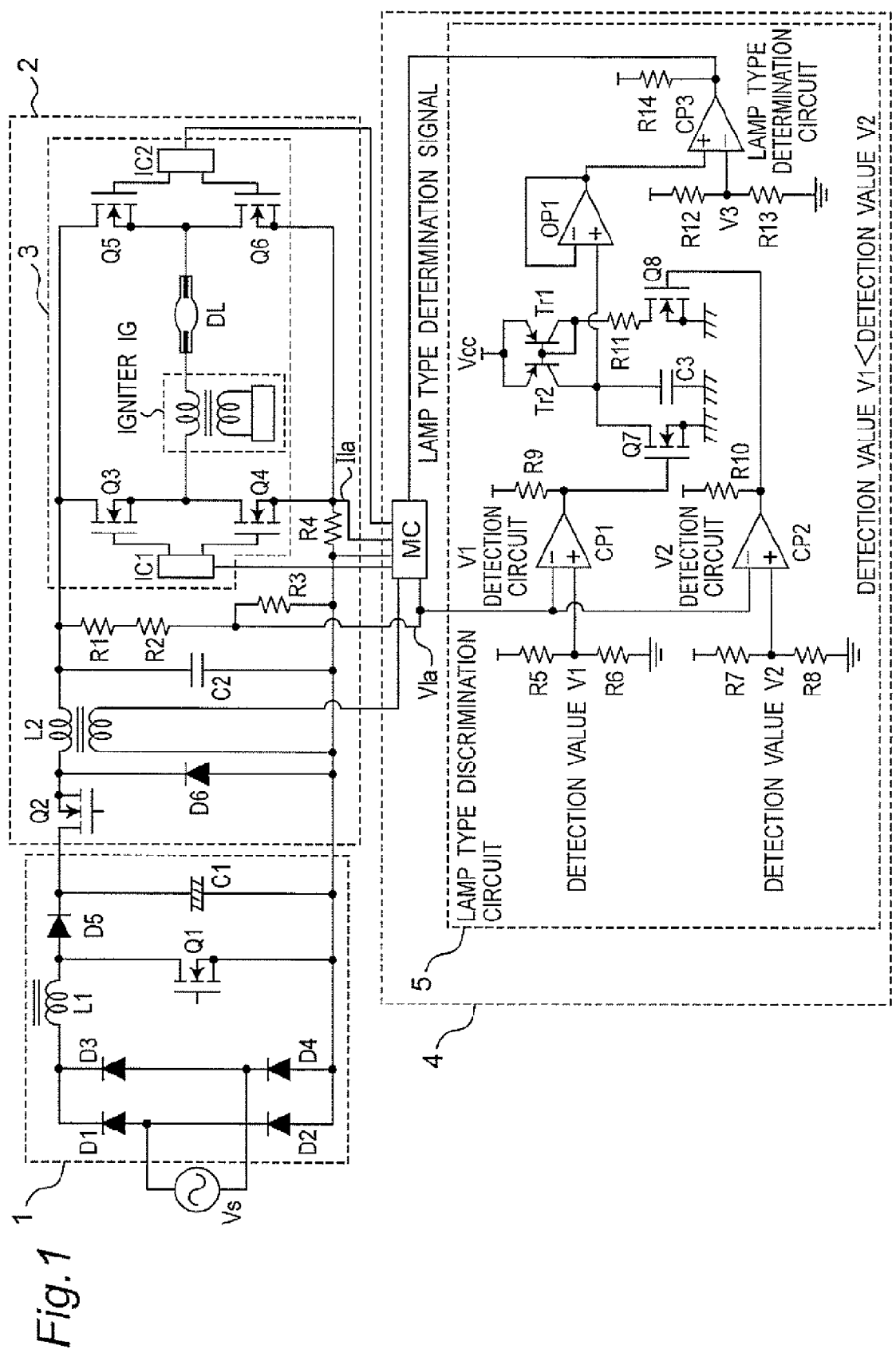
FIG. 1 is a circuit diagram of a high-intensity discharge lamp lighting apparatus according to Embodiment 1 of the present invention.

1 DC power source circuit section
2 power conversion circuit section
3 inverter circuit section
4 lighting control circuit section
5 HID lamp type discrimination circuit section
2a2 step-down chopper control circuit
4a PWM control circuit
7a, MC microcontroller
DL high-intensity discharge lamp
C1-C5 capacitor
D1-D6 diode
L1-L4 inductor
CP1-CP3 comparator
Q1-Q8, SW1-SW4 switching element
Rw1-Rw4 current detection resistor

BEST MODE FOR CARRYING OUT THE INVENTION

In the following, embodiments of the present invention are described with reference to attached drawings. It is to be noted that the same symbol is provided to a common component in the drawings, and repetition of the same description is omitted. Embodiments 1 to 9 according to the first aspect of the present invention are described with reference to FIGS. 1 to 26. Embodiments 10 to 12 according to the second aspect of the present invention are described with reference to FIGS. 27 to 42. Embodiments 13 to 18 according to the third aspect of the present invention are described with reference to FIGS. 43 to 53.

Embodiment 1

FIG. 1 shows a circuit diagram of a high-intensity discharge lamp lighting apparatus according to Embodiment 1 of the present invention. A configuration of the circuit is described below. A DC power source circuit section 1 including a rectification smoothing circuit and the like is connected to a commercial AC power source Vs. The DC power source circuit section 1 includes a full wave rectification circuit composed of diodes D1 to D4, a chopper circuit which switches the full wave rectification output for voltage boosting, and a smoothing capacitor C1 which charges the boosted DC voltage. An inductor L1, a switching element Q1 and a diode D5 constitute the step-up chopper circuit which has a function of reducing a down-period of an input current from the commercial AC power source Vs to improve an input current distortion rate.

A power conversion circuit section 2 capable of adjusting and controlling a supply power to be supplied to the discharge lamp is connected to the output end of the DC power source circuit section 1. The power conversion circuit section 2 includes a step-down chopper circuit, a lamp voltage detection circuit, a lamp current detection circuit, an inverter circuit section 3, and the like, as described later. The inverter circuit section 3 is composed of switching elements Q3 to Q6, and converts the output of the DC power source circuit section 1 into an AC voltage of a low frequency to be supplied to the discharge lamp DL.

Namely, the DC voltage obtained in the smoothing capacitor C1 of the DC power source circuit section 1 is lowered by a switching element Q2, an inductor L2 and a diode D6 of the step-down chopper circuit, to be charged into a capacitor C2. The switching element Q2 is turned on and off with a high frequency, and the on-width thereof is variably controlled by a microcontroller MC to make the charging voltage of the capacitor C2 variable, thereby to constitute a current-limiting element for controlling the current toward the load (discharge lamp). It is to be noted that in this configuration, a secondary coil is provided in the inductor L2, and the switching element Q2 is turned on when the current flowing through the inductor L2 is detected to be zero. When the switching element Q2 is kept on for a prescribed period, the capacitor C2 is charged with the voltage from the smoothing capacitor C1 through the switching element Q2 and the inductor L2. When the switching element Q2 is turned off, the storage energy in the inductor L2 is charged into the capacitor C2 through the diode D6 for regeneration. When this regeneration current becomes zero, the switching element Q2 is turned on.

To the both ends of the capacitor C2, a series circuit of the switching elements Q3 and Q4 and a series circuit of the switching elements Q5 and Q6, which constitute a polarity inversion circuit (inverter circuit section 3), are connected in parallel. The high-intensity discharge lamp DL is connected between a connecting point of the switching elements Q3 and Q4 and a connecting point of the switching elements Q5 and Q6 through an igniter circuit IG. The igniter circuit IG is a circuit that generates a high-voltage pulse for electrically breaking down the high-intensity discharge lamp DL in starting of the lamp, and the operation thereof is stopped in stable lighting. On-off control of the switching elements Q3 and Q4 is performed by the microcontroller MC through a driver element IC1, and on-off control of the switching elements Q5 and Q6 is performed by the microcontroller MC through a diver element IC2. A state where the switching elements Q3 and Q6 are on and the switching elements Q4 and Q5 are off and a state where the switching elements Q3 and Q6 are off and the switching elements Q4 and Q5 are on, are alternately switched to supply the AC voltage to the high-intensity discharge lamp DL.

The microcontroller MC is a microcontroller for control, and controls the on-width of the switching element Q2 in addition to the on-off states of the switching elements Q3 to Q6. The charging voltage of the capacitor C2 is divided by resistances R1, R2 and R3 which constitute a lamp voltage detection circuit in collaboration with the microcontroller MC, to be inputted into the microcontroller MC as a detection value corresponding to a lamp voltage Vla. Further, an output current from the capacitor C2 to the inverter circuit section 3 is current/voltage converted by a resistance R4 constituting the lamp current detection circuit in collaboration with the microcontroller MC, to be inputted into the microcontroller MC as a detection value corresponding to a lamp current Ila. The microcontroller MC is provided with an A/D conversion function for inputting these detection values.

Based upon the detection value of the lamp voltage Vla and a lamp type determination signal from a lamp type discrimination circuit section 5 to be described later, the microcontroller MC sets a target value of lamp power Wla to be supplied to the high-intensity discharge lamp DL, and this target value of the lamp power Wla is divided by the detection value of the lamp voltage Vla to calculate a target value of the lamp current Ila. Subsequently, the on-width of the switching element Q2 is variably controlled such that the detection value of the lamp current Ila agrees with the target value. Here, the target values of the lamp power Wla corresponding to the detection values of the lamp voltage Vla are stored in a plurality of kinds, in the form of V-W table showing correspondence between the voltage and the power, into a memory of the microcontroller MC. Hence the target value of the lamp power Wla corresponding to the detection value of the lamp voltage Vla is selected from the V-W table according to the lamp type based upon a lamp type determination signal from the lamp type discrimination circuit section 5, and the selected value is used. However, it is controlled that a constant current is outputted from the capacitor C2 to the polarity inversion circuit (inverter circuit section 3) during the lamp type discrimination operation.

Next, the configuration of the lamp type discrimination circuit section 5 is described. The voltage of the capacitor C2 is divided by the resistances R1, R2 and R3, which is inputted as a detection value corresponding to the lamp voltage Vla to inversion input terminals of a first comparator CP1 (hereinafter also referred to as "V1 detection circuit") and a second comparator CP2 (hereinafter also referred to as "V2 detection circuit"). A first reference voltage, obtained by division of a control power source voltage Vcc by resistances R5, R6, is applied as a detection value V1 to a non-inversion input terminal of the first comparator CP1. A second reference voltage, obtained by division of the control power source voltage Vcc by resistances R7, R8, is applied as a detection value V2 to a non-inversion input terminal of the second comparator CP2.

Outputs of the first and second comparators CP1 and CP2 are open collectors, which are inputted to gates of switching elements Q7 and Q8 while being pulled up to the control power source voltage Vcc through resistances R9 and R10. A switching element Q7 is connected in parallel to each end of the capacitor C3. A switching element Q8 is connected in series to a resistance R11 to open and close a current flowing through a transistor Tr1. When the switching element Q8 is in on-state, a constant current determined by the control power source voltage Vcc and a resistance R11 flows through the transistor Tr1, and the same constant current flows through a transistor Tr2 which constitutes a current mirror circuit. When the switching element Q7 is in off-state, the capacitor C3 is charged with the constant current.

Through a buffer circuit composed of an operation amplifier OP1, the charging voltage of the capacitor C3 is applied to a non-inversion input terminal of a third comparator CP3 (hereinafter also referred to as "V3 detection circuit) which constitutes a circuit for determining a lamp type. A third reference voltage V3, obtained by dividing the control power source voltage Vcc by resistances R12 and R13, is applied to an inversion input terminal of the third comparator CP3. An output of the third comparator CP3 is an open collector, and pulled up to the control power source voltage Vcc through a resistance R14. The output of the third comparator CP3 is outputted as a lamp type determination signal from the lamp type discrimination circuit section 5, to be inputted to the microcontroller MC.

In the following, the operation of the circuit in FIG. 1 is described with reference to FIG. 2. When a power source is supplied from the commercial AC power source Vs to the power conversion circuit section 2 through the DC power source circuit section 1, a dielectric breakdown voltage (several KV) for starting the high-intensity discharge lamp (HID lamp DL) is applied from the igniter circuit IG to the lamp DL. When the HID discharge lamp DL is electrically broken down and started, the igniter circuit IG is stopped and a detection value of the lamp voltage Vla is inputted to the lamp type discrimination circuit section 5 through the lamp voltage detection circuit composed of the resistances R1, R2 and R3.

In the circuit in FIG. 1, a change rate of the lamp voltage is detected by using the V1 detection circuit CP1 and the V2 detection circuit CP2 in the lamp type discrimination circuit section 5. The change rate here means a value which is obtained from a relation in which the lamp voltage changes with time, and a value that changes according to an expression: $dV/dt = (V2-V1)/(t2-t1)$. The lamp voltage keeps changing with time immediately after lighting, and V2 and V1 (V2>V1) are lamp voltages respectively detected by use of the detection circuits (CP1, CP2) as shown in FIG. 1. Symbols t1 and t2 are time lapse until the lamp voltage reaches respective prescribed values V1 and V2. In the present embodiment, r2 and V1 are fixed as the detection values to make a value of (V2-V1) fixed, and thereby (t2-t1) is derived as a variable value, i.e. the change rate, in the expression.

Incidentally, since the detection values V1 and V2 are in the relation of the detection value V1<the detection value V2, when the lamp voltage increases gradually toward the rated lighting voltage) the voltage first reaches the detection value V1. Then, the output of the V1 detection circuit (comparator CP1) is switched from H level to L level to turn off the switching element Q7, whereby charging of the capacitor C3 starts at a timing t1 in FIG. 2.

Figure 2:
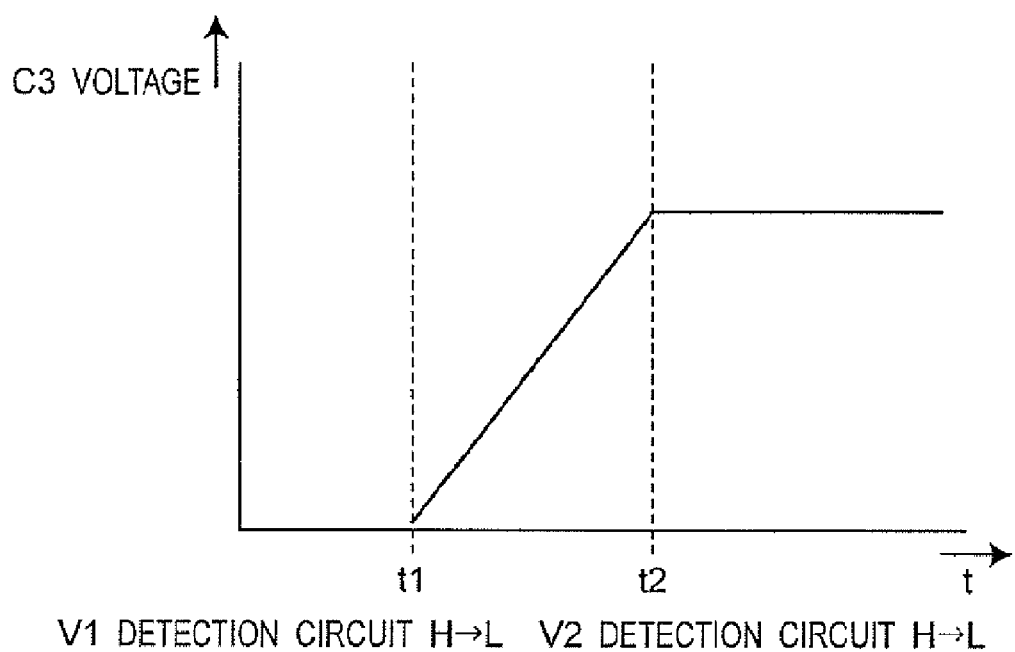
FIG. 2 is a waveform diagram for explaining an operation of a detection circuit for use in the lighting apparatus of FIG. 1.

When the lamp voltage further increases and reaches the detection value V2, the output of the V2 detection circuit (comparator CP2) is switched from H level to L level to turn off the switching element Q8, whereby the charging of the capacitor C3 stops at a timing t2 in FIG. 2, and the charge charged until then is kept in the capacitor C3.

The change rate of the connected HID lamp DL is shown from the timing t1 to the timing t2 in FIG. 2. Namely, since the time when the lamp voltage increase from the fixed value V11 to the fixed value V2 is different depending upon the lamp type, the charging voltage of the capacitor C3 is different depending upon the lamp type.

In the third comparator CP3 constituting a lamp type determination circuit (namely, V3 detection circuit), when the charging voltage of the capacitor C3 does not exceed a voltage V3 at a voltage dividing point of resistances R12 and R13, which is a detection value voltage of the lamp type determination circuit CP3, during a period between the timings t1 and t2 in FIG. 2, the connected HID lamp DL is determined for example as a 35 W lamp, and the microcontroller MC determines that the load is the 35 W lamp, and accordingly controls the supply power.

When the charging voltage of the capacitor C3 exceeds the detection value voltage V3 of the lamp type determination circuit CP3 during the period between the timings t1 and t2 in FIG. 2, the connected HID lamp DL is determined for example as a 70 W lamp, and the microcontroller MC controls the supply power based upon the determination that the load is the 70 W lamp.

Figure 3:
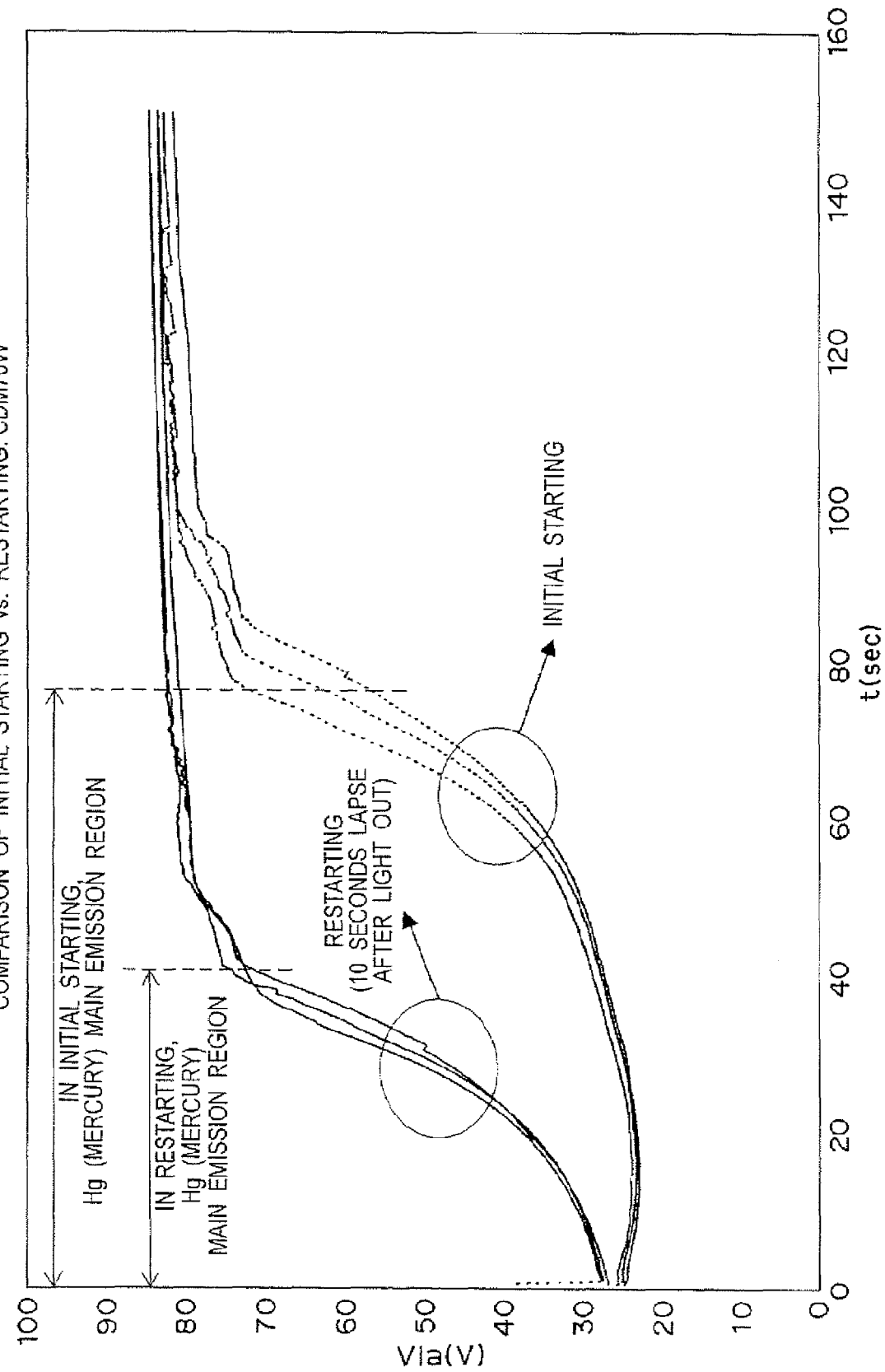
FIG. 3 is a characteristic diagram showing startup characteristics of a lamp voltage in initial starting and restarting of the high-intensity discharge lamp.

In the following, the lamp type determination is specifically described with reference to FIGS. 3 to 11 and Table 1. In FIG. 3, with regard to a 70 W lamp, one type out of a variety of HID lamps in the market, a comparison is made between a lamp voltage startup characteristic from a state (initial start) where the lamp is completely cool and a lamp voltage startup characteristic from a state where the lighted HID lamp is once turned off and then restarted as the power source is turned on again (state where the HID lamp is warm). In FIG. 3, the lamp is restarted by turning on the power source again ten seconds after turning-off of the lamp, and the longer the time lapse from the turning-off of the lamp to the second turning-on of the power source, the closer to the startup characteristic in initial starting the startup characteristic in restarting comes. In the HID lamp of FIG. 3, the startup characteristic became the same as that in initial starting 30 minutes after the turning-off of the lamp. It is revealed from this figure that the lamp voltage Vla follows the equivalent startup characteristic irrespective of the initial start and the restart when the lamp voltage Vla is at least higher than 30V. In addition, the equivalent relation between the initial start and the restart to that in the above-mentioned lamp is seen in lamps other than the above-mentioned lamp.

Figure 4:
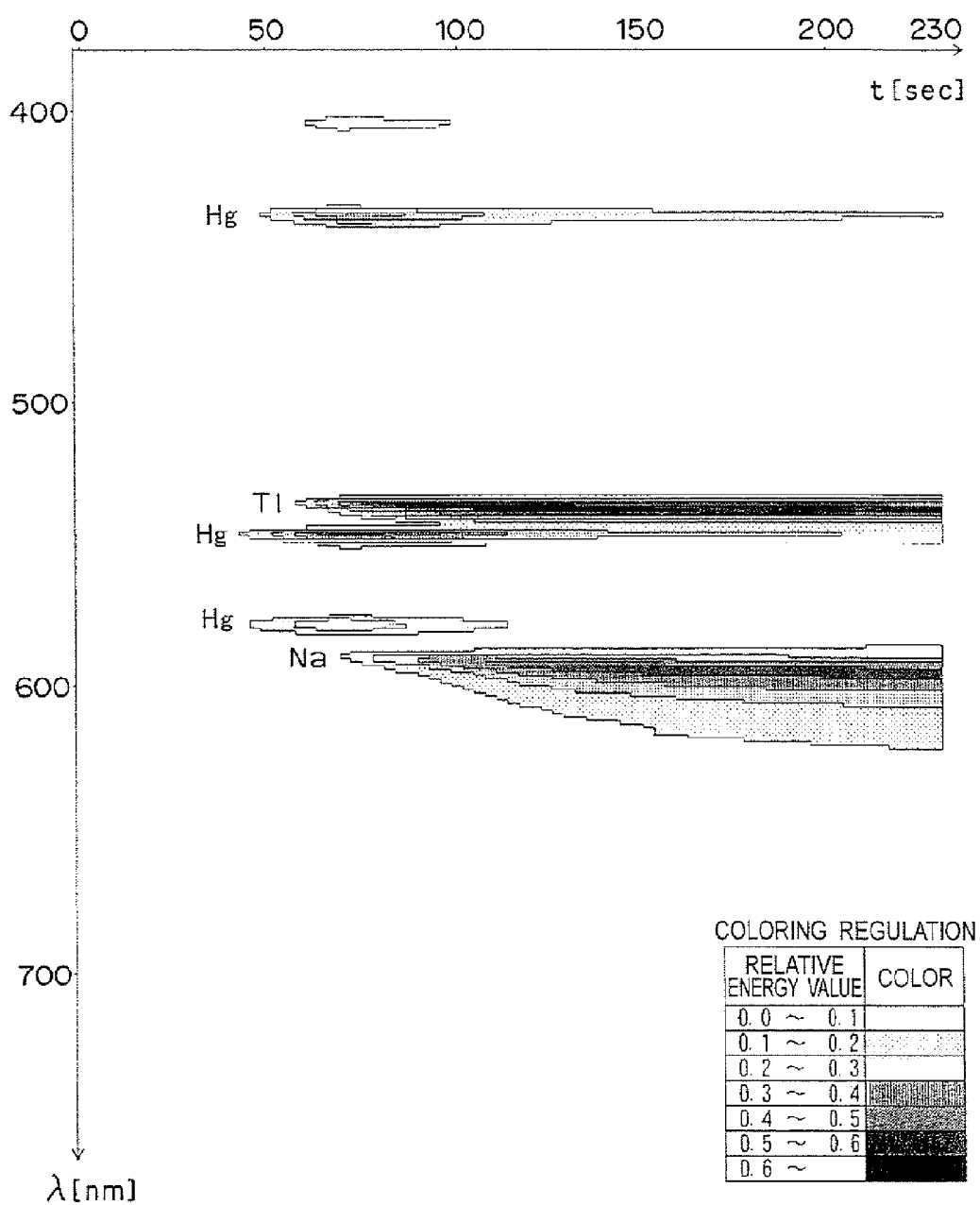
FIG. 4 is an explanatory diagram showing a change in emission spectrum in initial starting of the high-intensity discharge lamp.
Figure 5:
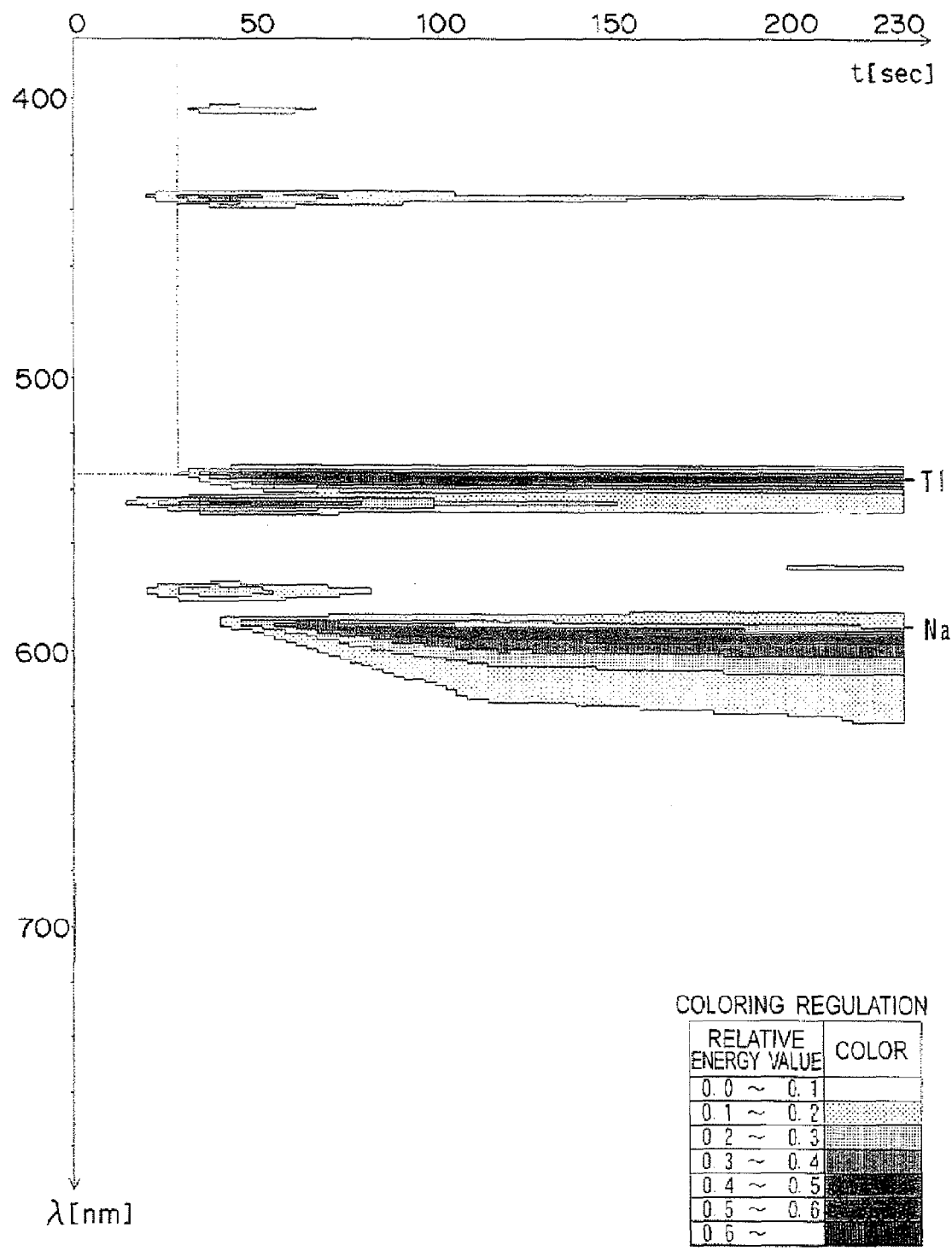
FIG. 5 is an explanatory diagram showing a change in emission spectrum in restarting of the high-intensity discharge lamp.

FIG. 4 shows an emission spectrum of the 70 W metal halide lamp in initial starting, and FIG. 5 shows that in restarting. The horizontal axis indicates a time lapse (second) after starting of the lamp, and the longitudinal axis indicates a wavelength λ (nm) of the emission spectrum. In FIG. 4, in the spectrum of the lamp type of CDM-70 W-Cold (Ti[535 nm]=59.54 sec; Na[589 nm]=71.54 sec), it is found that Hg (mercury) is the main emission element for about 80 seconds after starting of the lamp. In FIG. 5, in the spectrum of the lamp type of CDM-70 W-Hot (Ti[535 nm]=29.63 sec; Na[589 nm]=41.63 sec), it is found that Hg (mercury) is the main emission element for about 40 seconds after starting of the lamp.

In FIG. 3, the region of about 80 seconds in initial starting and the region of about 40 seconds in restarting are regions where the inclination of the lamp voltage changes, and variations in behavior of the lamp voltage in those regions are large depending upon a HID lamp to be measured as well as peripheral conditions. Therefore, the detection values V1 and V2 shown in FIG. 1 can be set within the region where mercury (Hg) is the main emission element, to detect stable inclinations.

Figure 6:
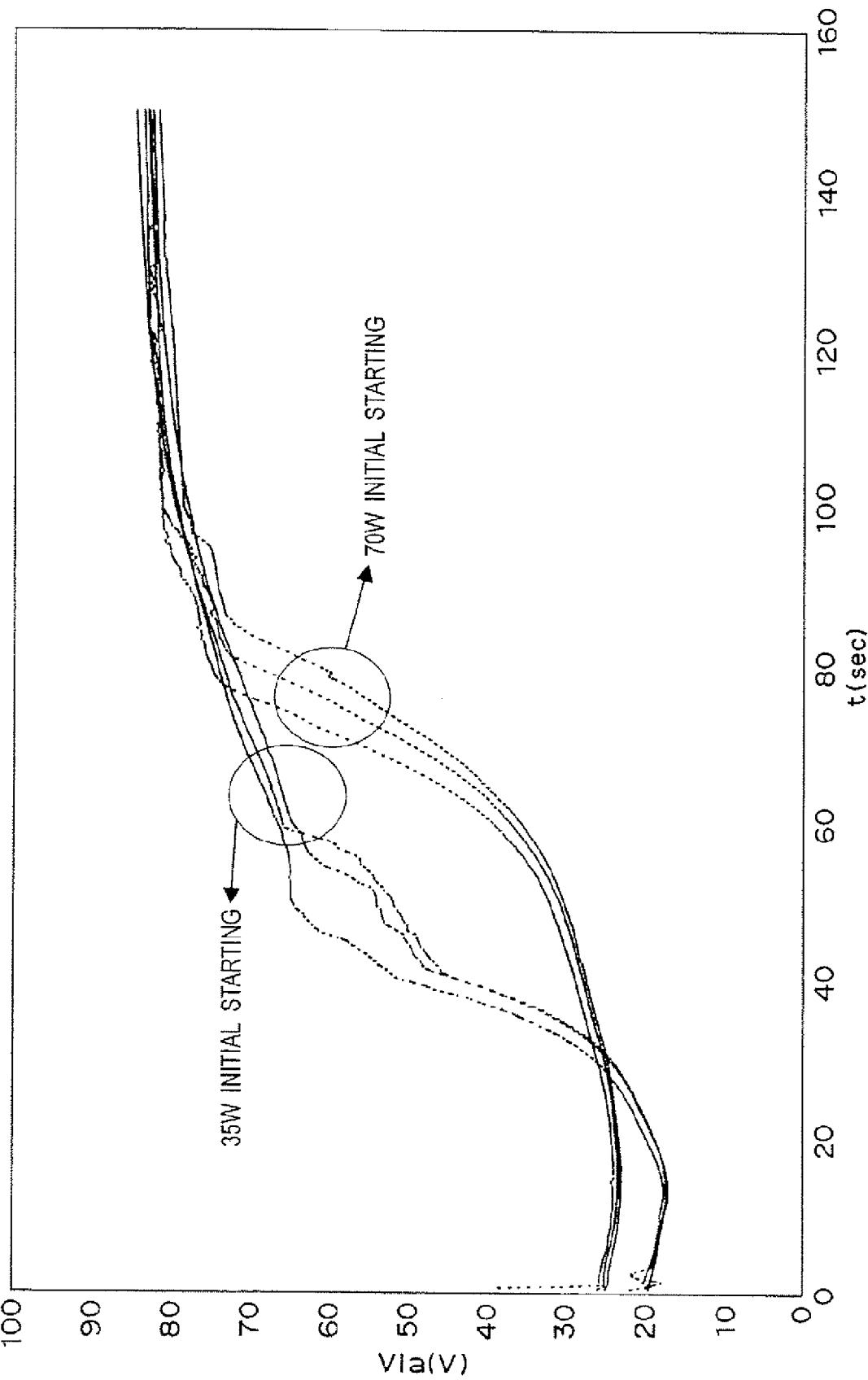
FIG. 6 is a characteristic diagram showing startup characteristics of lamp voltages in initial starting of the high-intensity discharge lamps with different rated power.
Figure 7:
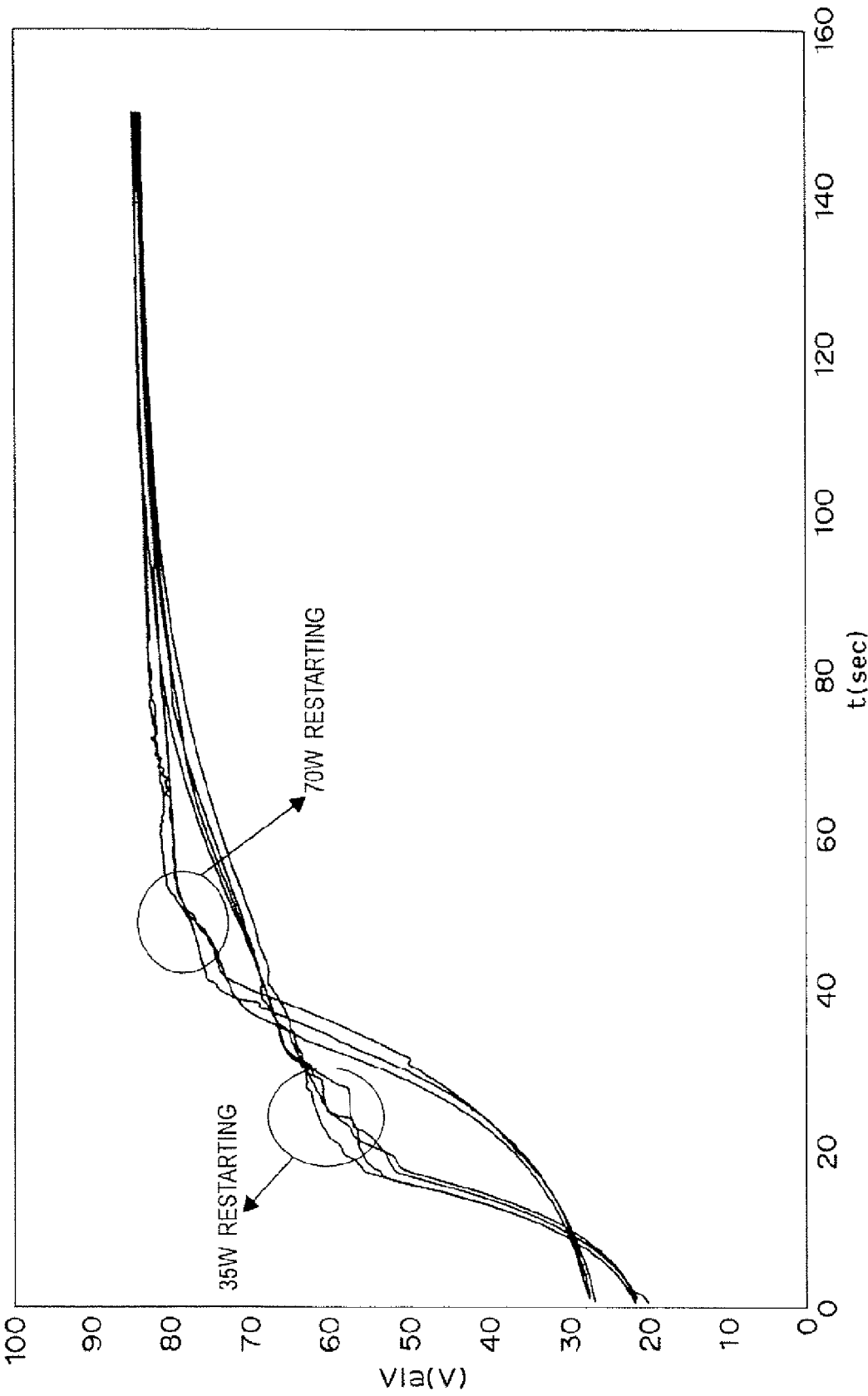
FIG. 7 is a characteristic diagram showing startup characteristics of the lamp voltages in restarting of the high-intensity discharge lamps with different rated power.

FIGS. 6 and 7 are views comparing a 35 W lamp, one type out of the variety of HID lamps in the market, with the foregoing 70 W lamp respectively in initial starting and restarting. It is found from those figures that there is a difference in inclination of the lamp voltage increase within the foregoing regions where mercury is the main emission element.

Figure 8:
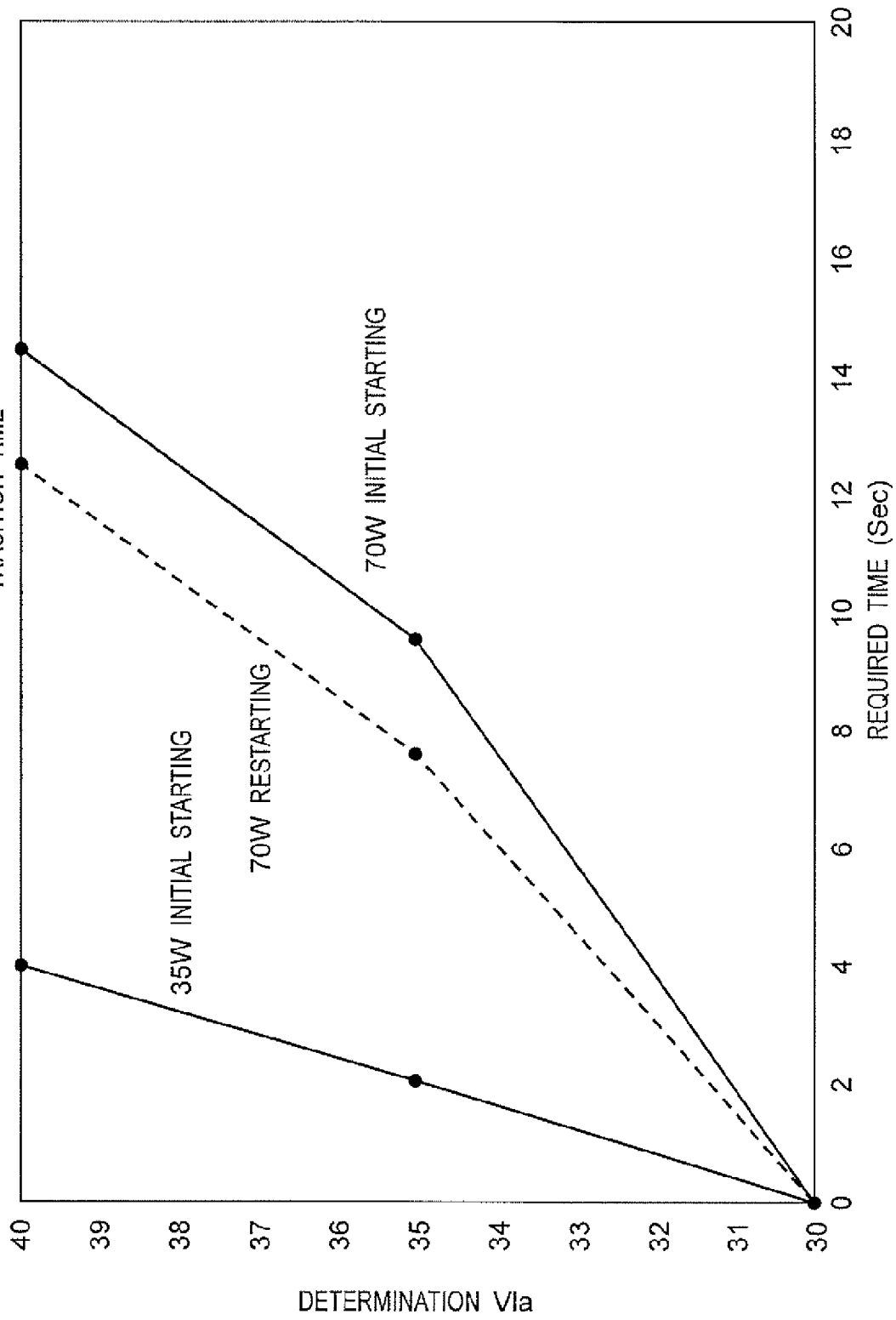
FIG. 8 is a characteristic diagram showing, by enlarging, substantially linear portions of the startup characteristics of the lamp voltages of the high-intensity discharge lamps with different rated power.

FIG. 8 is a graph showing portions of 30 to 40 V during the increase in lamp voltage, which are taken out of the startup characteristic data of the 35 W lamp and the 70 W lamp. It is found from this figure that at least the inclinations of the voltage increase of the 35 W lamp and the 70 W lamp are almost linear from 30V to around 50V, and the difference is thus clear.

While one type of each of the 35 W lamp and 70 W lamp, out of the variety of HID lamps in the market was described as the example, at least lamps of types shown in Table 1 are available in the HID lamp market of the 35 W and 70 W.

TABLE 1

Table for lamp manufacturers (ceramic arc tube): 39 W, 70 W, and 100 W

| Type | PAR30 | PAR30 | PAR38 | T-6 | ED-17 | TD-6 | TC |
|---|---|---|---|---|---|---|---|
| P Inc. | CDM35/ PAR20/ M/SP,FL/ 3K (M130) | CDM35/PAR30L/ M/SP, FL/3K (M130) | | CDM35/T6/830 (M130) | | | CDM35/TC/830 (M130) |
| | | CDM70/PAR30L/ M/SP, FL/3K, 4K (M143/M98) | CDM70/PAR38/ SP, FL FL/3K, 4K (M143/M98) | CDM70/T6/830, 942 (M139) | MHC70/C, U/M, MP/3K, 4K (M143/M98) | CDM70/ TD 830, 942 (M139) | CDM70/TC/830 (M139) |
| G Inc. | CMH39/ PAR20/ 830/SP, FL (M130) | CMH39/PAR30L/ SP, FL (M130) | | CMH39/T/U830 (M130) | | | CMH39/TC/U830 (M130) |
| | | CMH70/U/ PAR30L/SP, FL (M143/ M139/M98) | CMH70/PAR38/830 (M139/M98/M85) | CMH70/T/U830, 942 (M139/M98) | CMH70/C,/ U830/MED (M143/M98) | CMH70/ TD/830, 942 (M139/ M98/M85) | CMH70/TC/U830 (M139/M98) |
| O Inc. | MCP39PAR20/ U/830/SP FL | MPD39PAR30LN/ U/M/MED/830 MCD39PAR30LN/ U/830/SP FU (M130) | | HCl-T35W/WOL MD39/U R T6/G12/830 MC39TG/U/G12/830 | | | HCl-T35W/WOL MC39TC/U/G8/830 |
| | | MCD70PAR30LN/ U/MED/830 MCP70PAR30LN/ U/830/SP FU (M143/M98) | MCD70PAR38/ U/830/SP FL VWFL | POWERBALL HCL-770W/WDL HCL-T70W/WDL MC70T6/U/G12/830 | MCD70/U/MED830 (quartz) MCD70/U/MED (ceramic) (M143/M98) | HCL- TS70W/ WDL, NDL | HCl-TC70W/NDL MC70TC/U/G85/ 830 |

Figure 9:
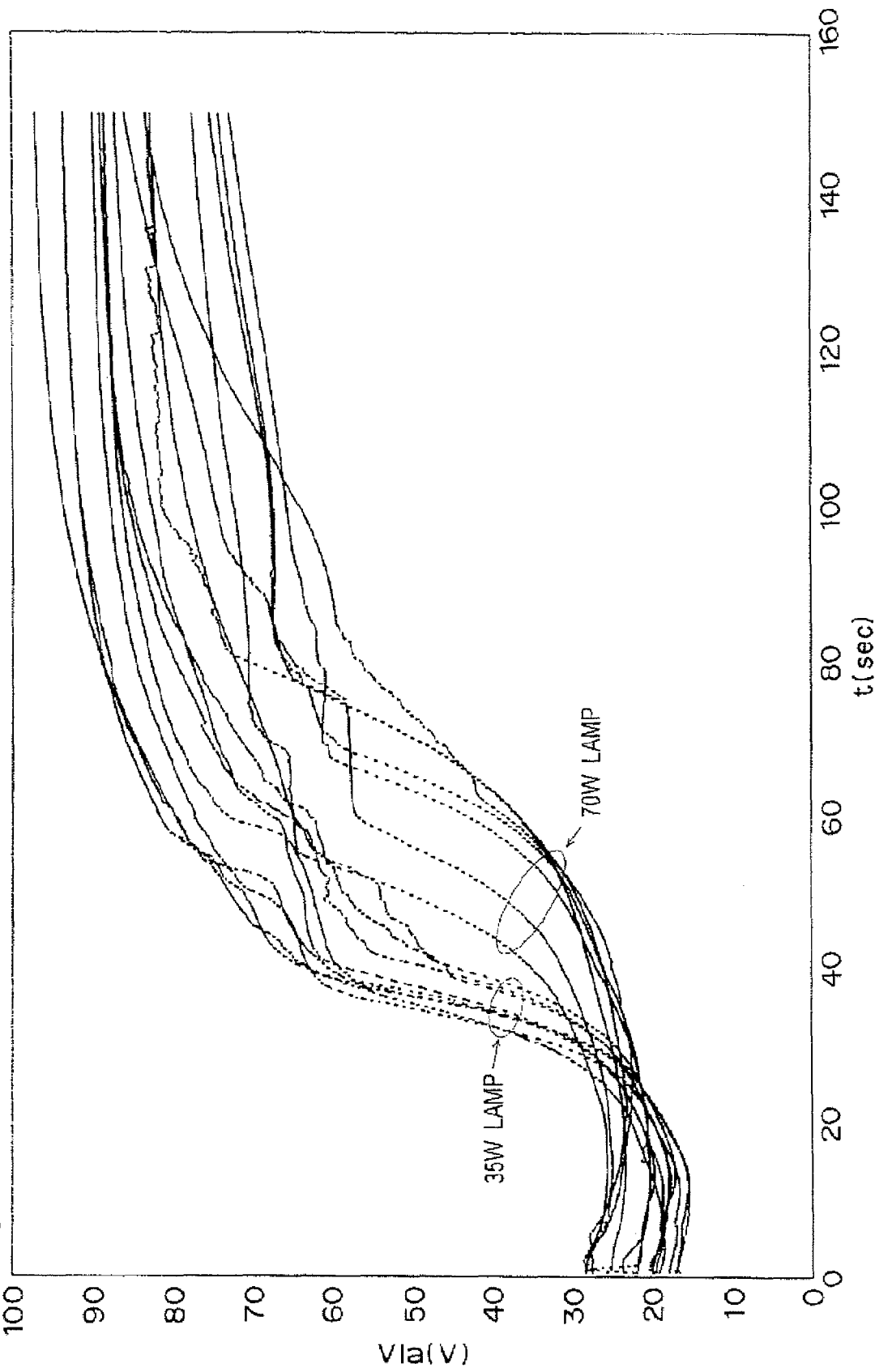
FIG. 9 is a characteristic diagram showing startup characteristics of the lamp voltages in initial starting of the high-intensity discharge lamps with different rated power.
Figure 10:
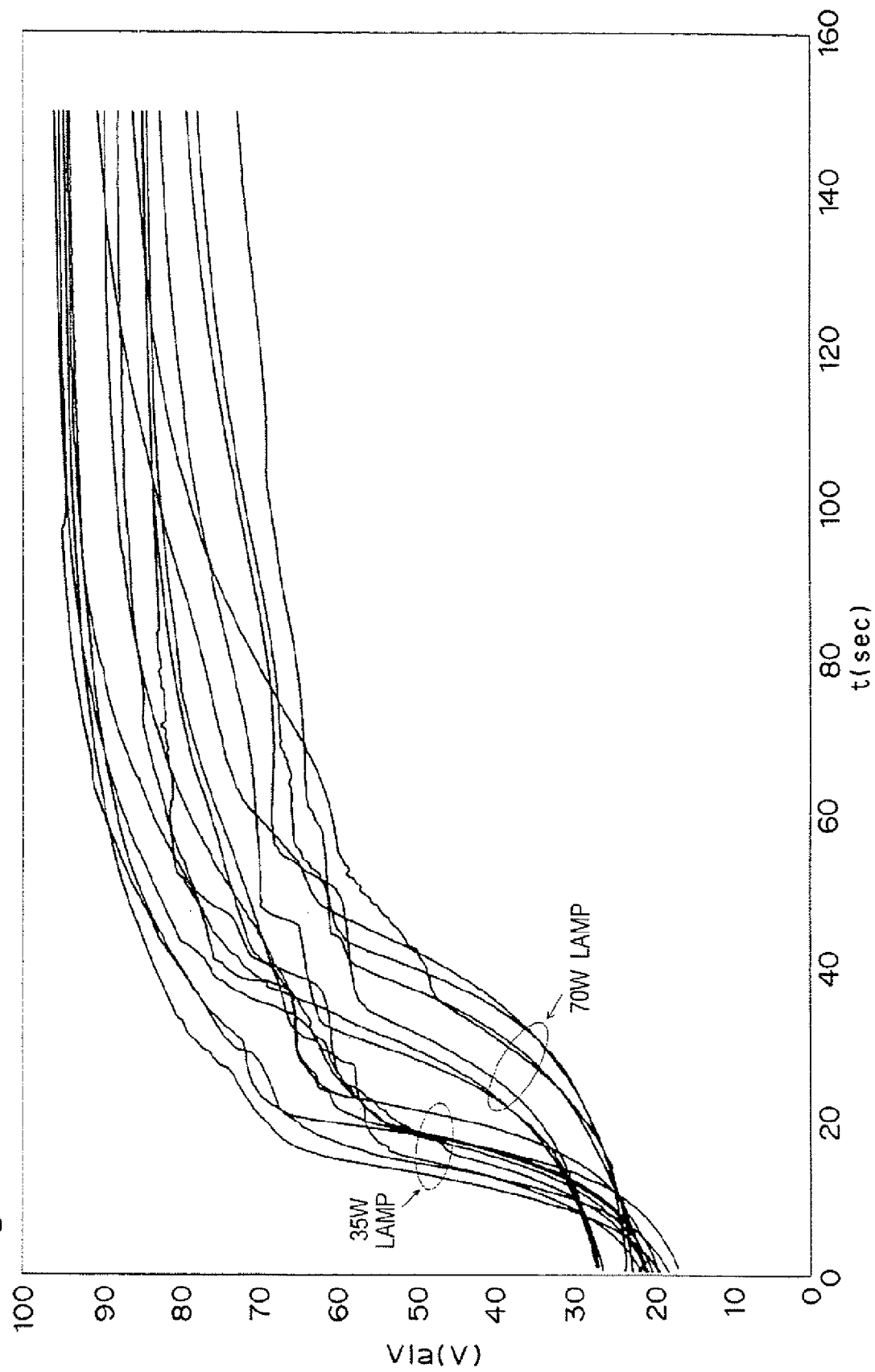
FIG. 10 is a characteristic diagram showed a startup characteristic of the lamp voltages in restarting of the high-intensity discharge lamps with different rated power.
Figure 11:
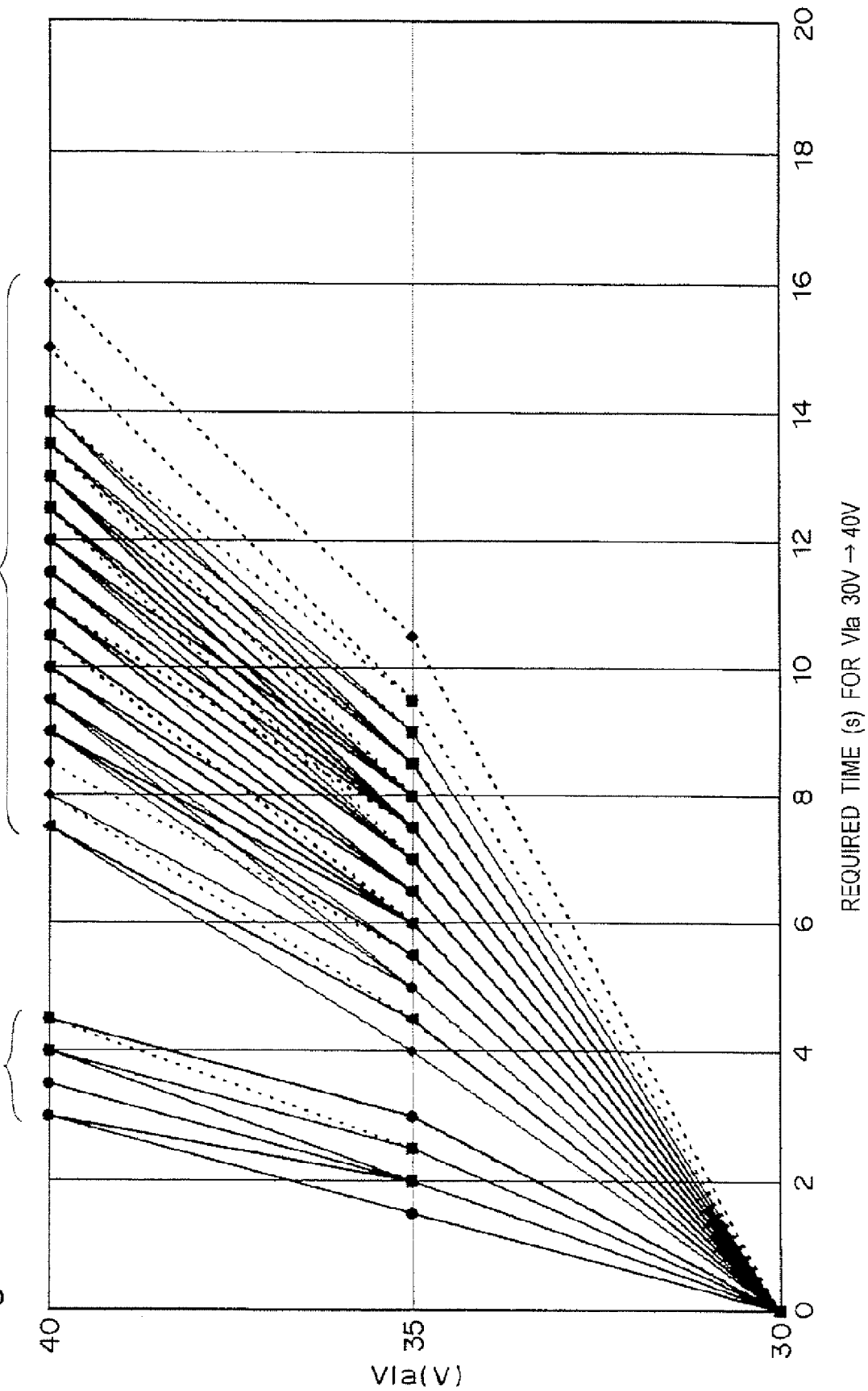
FIG. 11 is a characteristic diagram showing, by enlarging, substantially linear portions of the startup characteristics of the lamp voltages of the high-intensity discharge lamps with different rated power.

FIGS. 9 and 10 show measurement data on the lamp voltage startup characteristics in starting and restarting with respect to available 35 W and 70 W lamps. FIG. 11 shows portions of the 30 to 40 V taken out, as an example, from the result of measurement in number further increased from the results of FIGS. 9 and 10. In FIG. 11, solid lines indicate characteristics in restarting while broken lines indicate characteristics in initial starting. It is found from this result that there is at least a two-second difference between the 35 W HID lamp and the 70 W HID lamp in lamp voltage increase characteristic in the portion of 30 to 40 V.

According to the above description, by the method of obtaining the change rate in starting up of the connected HID lamp by use of the V1 detection circuit CP1 and the V2 detection circuit CP2 in FIG. 1, the HID lamp type is determined in the lamp voltage increase inclination portion where the inclination in initial starting is equivalent to that in restarting within the mercury main emission region with respect to all types of HID lamps to be connected. It is thereby possible to realize a high-intensity discharge lamp lighting apparatus capable of reliably determining a type of a loaded HID lamp, irrespective of the state (initial start, restart) of the HID lamp, to light the loaded HID lamp with a desired power characteristic.

In this Embodiment 1, the lamp voltage increase characteristic of the respective HID lamps from 30V to 40V shown in FIG. 11 are detected as the detection values V1 and V2 in FIG. 1, and the lamp type discrimination circuit section 5 is set to a value such that the lamp type is determined as 70 W when the capacitor C3 is charged for six seconds or longer.

Embodiment 2

Figure 12:
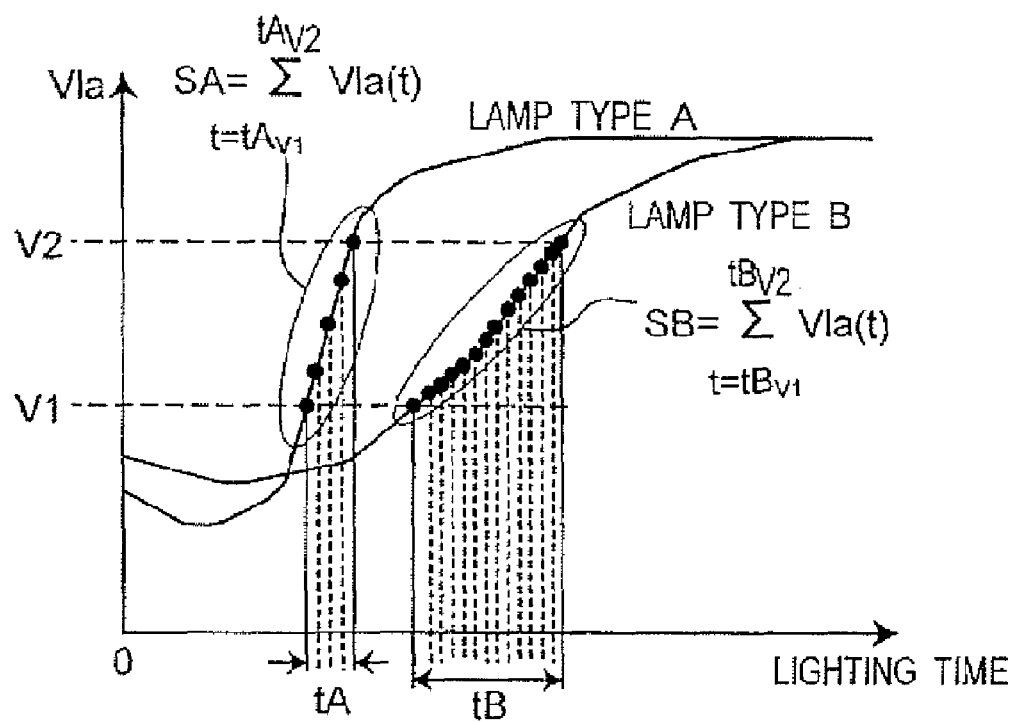
FIG. 12 is a principle explanatory diagram of HID lamp type discrimination according to Embodiment 2 of the present invention.

FIG. 12 shows a method for comparing other change rates of the lamp voltages shifting from V1 to V2 according to Embodiment 2 of the present invention. In Embodiment 1, the shifts of the lamp voltages from V1 to V2 were detected and the lapse of time t during the shifts were compared as the change rates to discriminate the lamp types. In present Embodiment 2, the other change rates aye compared using the detection of the lamp voltage shifting from V1 to V2 in the same manner.

Namely, since the expression: $dV/dt=(V2-V1)/(t2-t1)$, described in Embodiment 1, can also be expressed as: $(Vt-Vt-1)/\{t-(t_{-1})\}$, when values, each obtained such that from a lamp voltage Vt at a timing t, a lamp voltage Vt−1 at a timing just before the timing t is subtracted and then divided by the time required: $\{t-(t_{-1})\}$, are added from V1 to V2, a value reflecting the inclination dV/dt from V1 to V2 can be calculated. Naturally, when this added value is divided by the time required (t2−t1) for the lamp voltage to shift from V1 to V2, a value reflecting the inclination dV/dt from V1 to V2 can be more accurately calculated.

Further, the value reflecting the inclination dV/dt can be calculated simply by adding the lamp voltages Vt during the shift from V1 to V2, without executing the subtraction of (Vt−Vt−1) each time, and in this manner, a simpler calculation can be performed.

Here, by defining Vla(t) as a function expressing the lamp voltage Vla at the time t, a value obtained by addition of the lamp voltages with respect to the time can be expressed as $\Sigma Vla(t)$. Namely, in FIG. 12, it is possible to compare $\Sigma Vla(t)$, values obtained by addition of the lamp voltages at fixed intervals from V1 to V2, as the change rates.

It is to be noted that the lamp voltage startup characteristic is as described in Embodiment 1, and also in Embodiment 2, the change rates of the lamp voltages are obtained within the lamp voltage increase regions where mercury (Hg) is the main emission element, to thereby discriminate the lamp types.

Provision of the above-mentioned lamp type discrimination means makes it possible to realize a high-intensity discharge lamp lighting apparatus capable of reliably determining a type of a loaded lamp, irrespective of the state (initial start, restart) of the lamp, to light the loaded HID lamp with a desired power characteristic.

The lighting apparatus is configured such that, in FIG. 1, the lamp type discrimination circuit section 5 is omitted and the lamp voltages at fixed intervals from V1 to V2 are added to calculate an integrated value, followed by determination whether the value is larger or smaller than a reference value to allow discrimination between a lamp type A and a lamp type B in FIG. 12. In the example of FIG. 12, as for the lamp type A, an integrated value SA is an integrated value obtained by adding detection values Vla(t) of the lamp voltage Vla at fixed intervals from time tAV1 when the lamp voltage Vla reaches V1 to time tAV2 when the lamp voltage Vla reaches V2. Further, as for the lamp type B, all integrated value SB is an integrated value obtained by adding detection values Vla(t) of the lamp voltage Vla at fixed intervals from time tBV1 when the lamp voltage Vla reaches V1 to time tBV2 when the lamp voltage Vla reaches V2. The fixed interval for the addition may be determined by means of an interruption timer of the microcontroller MC or the like. A reference value may be previously set at the midpoint of the integrated values SA and SB, and when the calculated integrated value is smaller than the reference value, the lamp type is determined as the lamp type A, and when the calculated integrated value is larger than the reference value, the lamp type is determined as the lamp type B.

Embodiment 3

Figure 13:
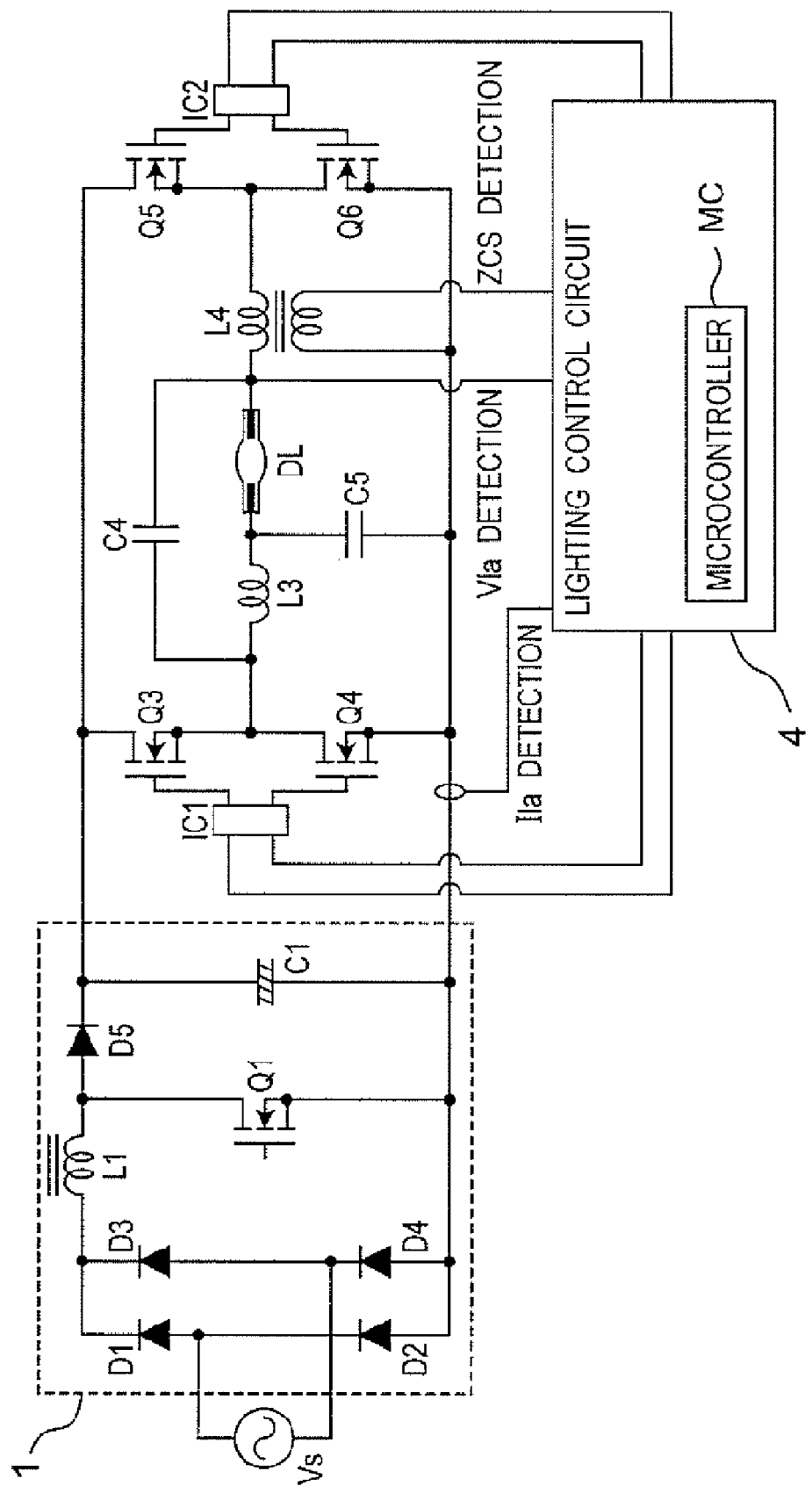
FIG. 13 is a circuit diagram of a high-intensity discharge lamp lighting apparatus according to Embodiment 3 of the present invention.

FIG. 13 shows a circuit diagram of a high-intensity discharge lamp lighting apparatus according to Embodiment 3. Compared with the lighting apparatus of FIG. 1, the following points are different. The step-down chopper circuit composed of the switching element Q2, diode D6, inductor L2, and capacitor C2 is omitted, and the function of the step-down chopper circuit is realized such that: the switching elements Q3 and Q4 are alternately switched on and off with a low frequency in stable lighting; the switching element Q6 is switched with a high frequency when the switching element Q3 is in on-state; and the switching element Q5 is switched with a high frequency when the switching element Q4 is in on-state.

A further different point is that the igniter circuit IG in the lighting apparatus of FIG. 1 is omitted, and instead a start pulse generation circuit composed of an LC series resonant circuit of an inductor L3 and a capacitor C5 is added. The igniter circuit IG in FIG. 1 is a circuit in combination of a pulse generation circuit and a pulse transformer, which generates a pulse voltage by the pulse generation circuit in starting and boosts the voltage by the pulse transformer to add the boosted voltage to the high-intensity discharge lamp DL. Meanwhile, in the lighting apparatus of FIG. 13, a high-voltage pulse for lamp start is generated by the resonant function of the inductor L3 and the capacitor C3.

When the AC power source Vs is supplied, the switching elements Q3 and Q4 are alternately turned on and off with a fixed or variable frequency of several tens of KHz to several hundreds of KHz for starting the HID lamp DL, and a lamp dielectric breakdown voltage (several KV) is generated from the resonant circuit composed of the inductor L3 and the capacitor C3, to electrically break down the HID lamp DL. Thereby, when the HID lamp DL is turned on, the microcontroller MC detects that the lamp current Ila has started flowing and shifts from the operation in starting to the operation in lighting. Since the switching elements Q3 and Q4 are alternately turned on and off with a low frequency of several tens to several hundreds of Hz in lighting, the resonant circuit composed of the inductor L3 and the capacitor C5 does not generate a dielectric breakdown voltage.

During a period when the switching element Q3 is in on-state and the switching element Q4 is in off-state in lighting, the switching element Q6 is turned on and off with a high frequency while the switching element Q5 is kept off, to allow a chopping current which is broken down with a high frequency to flow through a low pass filter composed of the inductor L4 and the capacitor C4, and the high frequency component is bypassed through the capacitor C4 to allow a DC current to flow in one direction in the HID lamp DL. Further, during a period when the switching element Q3 is off and the switching element Q4 is on, the switching element Q5 is turned on and off with high frequency while the switching element Q6 is kept off, to allow the chopping current which is broken down with high frequency to flow through the low pass filter composed of the inductor L4 and the capacitor C4, and the high frequency component is bypassed through the capacitor C4 to allow the DC current to flow in the opposite direction to the above in the discharge lamp DL. Repetition of this operation allows a rectangular wave current of a low frequency to flow in the HID lamp DL It should be noted that the function of the diode D6 for regeneration in the lighting apparatus of FIG. 1 is shared by the backward diodes of the switching elements Q5 and Q6 in the lighting apparatus of FIG. 13. Energy stored in the inductor L4 when the switching Q5 is in on-state, is discharged through the backward diode of the switching element Q6 when the switching element Q5 is in off-state, and the energy stored in the inductor L4 when the switching Q6 is in on-state, is discharged through the backward diode of the switching element Q5 when the switching element Q6 is in off-state. A current of a triangle wave flowing through the inductor L4 is detected by a secondary coil of the inductor L4. When a zero cross detection (ZCS detection in the figure) circuit detects that the regeneration current becomes zero, the switching elements Q5 and Q6 for chopper are turned on. The on-widths of the switching elements Q5 and Q6 for chopper are variably controlled by the microcontroller MC, thereby permitting control of the supply power to the high-intensity discharge lamp DL. However, the control is performed so as to output a constant current to the HID lamp DL during the lamp type discrimination.

While FIG. 13 shows a simplified diagram of the lamp voltage detection circuit (Vla detection circuit) and the lamp current detection circuit (Ila detection circuit), needless to say, the circuits are configured such that the detection value corresponding to the lamp voltage and the detection value corresponding to the lamp current are inputted to the A/D conversion input terminal of the microcontroller MC, in the same manner as the lighting apparatus of FIG. 1.

When the HID lamp DL is lighted, lamp voltage information is acquired at fixed intervals by the microcontroller MC through the lamp voltage detection circuit. Specifically, the voltage of the A/D conversion input terminal is read at fixed intervals using a timer interruption function of the microcontroller MC or the like, to acquire as lamp voltage information the detection value corresponding to the lamp voltage inputted to the A/D conversion input terminal of the microcontroller MC from the lamp voltage detection circuit.

Figure 14:
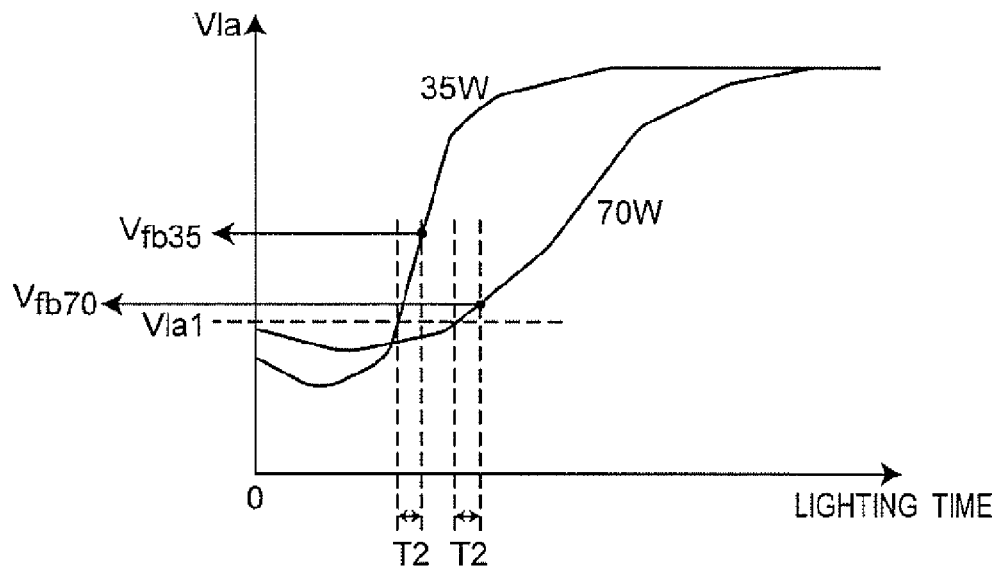
FIG. 14 is a principle explanatory diagram of HID lamp type discrimination according to Embodiment 3 of the present invention.
Figure 54:
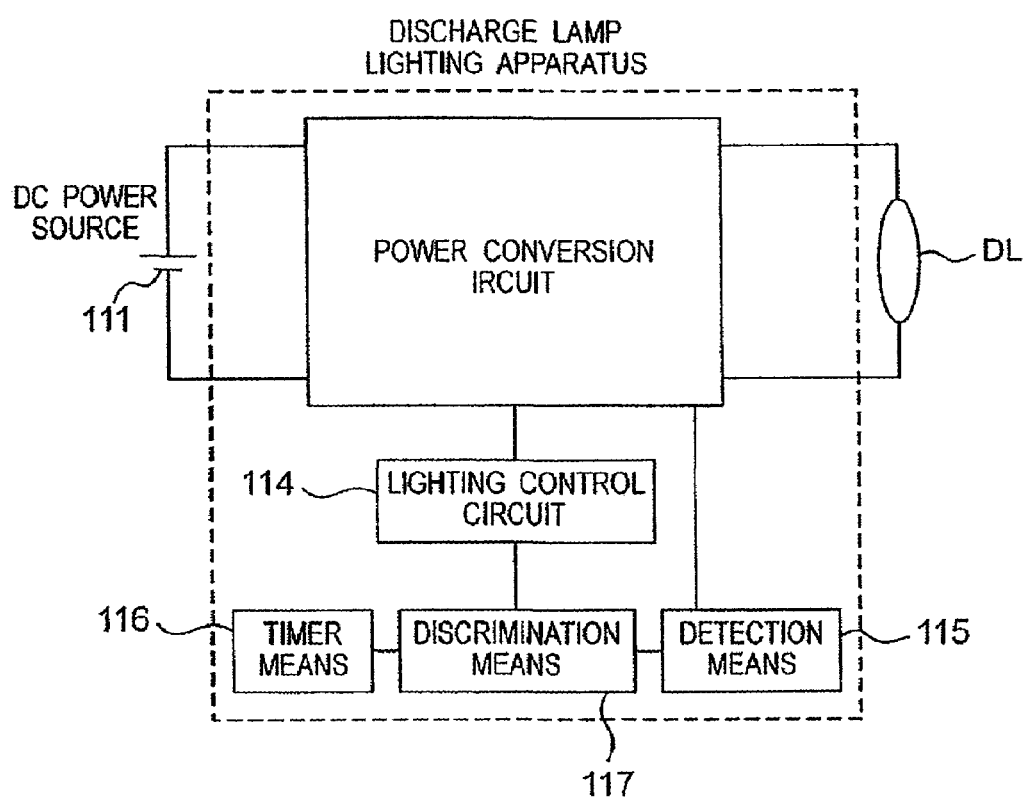
FIG. 54 is a block diagram of a conventional high-intensity discharge lamp lighting apparatus.

In the microcontroller MC, as shown in FIG. 14, when the lamp voltage Vla reaches a certain voltage Vla1, a timer (cf. FIG. 54) for counting a fixed time T2 is started, and a value of a lamp voltage V2' is read at the time point when the timer completes the counting of the fixed time T2. In FIG. 14, the lamp voltage V2' after a lapse of the fixed time T2 is Vfb35 in the case of the 35 W lamp, and is Vfb70 in the case of the 70 W lamp.

The startup characteristic of the lamp voltage is as described in Embodiment 1, and also in Embodiment 3, the change rates of the lamp voltages within the lamp voltage increase regions where mercury (Hg) is the main emission element are obtained to discriminate the lamp types.

The change rate here means a change with time lapse in lamp voltage in a relation that can be expressed by the expression: $dV/dt = (V2'-V1)/(t2-t1)$. In the present Embodiment 3, since the relations of V1=Vla1 and t2-t1=T2 are fixed, V2' is a value to be variable. In addition, t1 is the time at which the lamp voltage Vla=V1, and since being a common value among all the lamps, the time t1 can be replaced with 0. Namely, since V2'=Vfb35 or V2'=vfb70 is the only value that varies, this value serves as the change rate.

Here, FIG. 8 is used again. For example, when Vla1=30V and T2=4 sec are fixed, the lamp voltage of the 35 W lamp is V2'=40V four seconds after the point when the lamp voltage is 30V, and the lamp voltage of the 70 W lamp is V2'=32 to 33 V four seconds after the point when the lamp voltage is 30V. Thereby, the lamp types can be discriminated by determining that the lamp type is the 35 W lamp when V2'≧36V, and the lamp type is the 75 W lamp when V2'<36V.

When the lamp type is determined, the V-W table applicable to the lamp is referred from the memory of the microcontroller MC, and the on-widths of the switching elements Q5 and Q6 for chopper are variably controlled such that appropriate lamp power is supplied according to the lamp voltage. Specifically, a target value of the lamp power is read from the V-W table based upon the lamp voltage, and the target value of the lamp power is divided by the detection value of the lamp voltage to calculate a target value of the lamp current. Further, the on-widths of the switching elements Q5 and Q6 for chopper are variably controlled such that the detection value of the lamp current agrees with the target value of the lamp current.

It is to be noted that setting of the detection time T2 can be set according to the type of the lamp that applies as the load, such as the time when the lamps including the faster-startup lamp are within the Hg main emission region, the time when only the slower startup lamp is within the Hg main emission region, and the time after all the loaded lamps get out of the Hg main emission region.

Provision of the above-mentioned lamp type discrimination means makes it possible to realize a high-intensity discharge lamp lighting apparatus capable of reliably determining a type of a loaded lamp, irrespective of the state (initial start, restart) of the lamp, to light the loaded HID lamp with a desired power characteristic.

Embodiment 4

Figure 15:
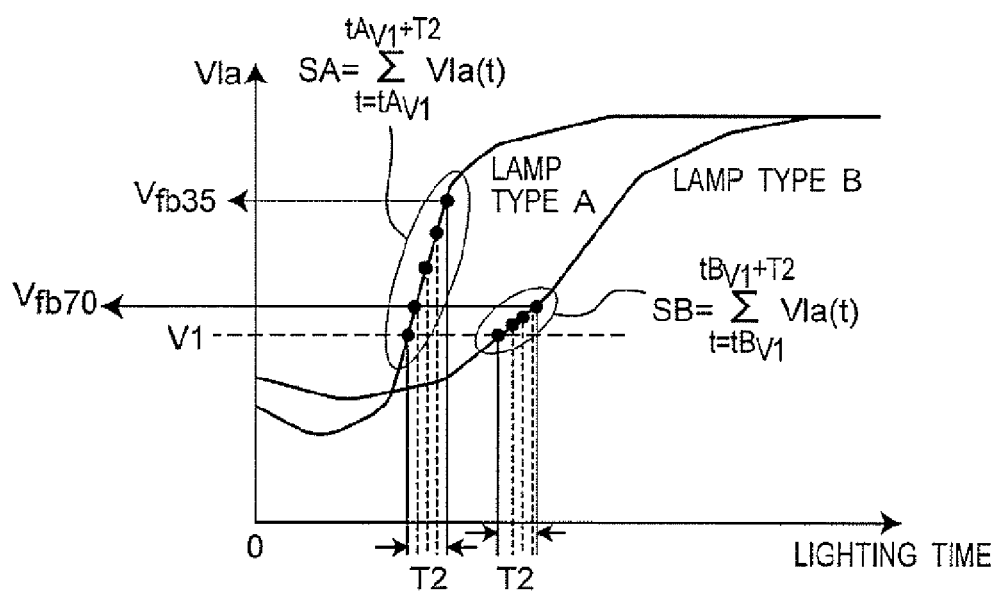
FIG. 15 is a principle explanatory diagram of HID lamp type discrimination according to Embodiment 4 of the present invention.

FIG. 15 shows a method for comparing other change rates using detection of V1 and T2 according to Embodiment 4. In Embodiment 3, the voltages V2' during a period after the lamp voltage reaches V1 until the time lapse T2 were compared as the change rates to discriminate the lamp types. In the same manner, the other change rates are compared using detection of V1 and T2 in the present Embodiment 4.

The expression described in Embodiment 3: $dV/dt=(V2'-V1)/T2$, can also be expressed as: $(Vt-Vt-1)/\{t-(t-1)\}$. Namely, from a lamp voltage Vt at a timing t, a lamp voltage Vt-1 at a timing just before the timing t is subtracted and then divided by the time required $\{t-(t_{-1})\}$, and values thus obtained during a period from V1 to V2' are added to allow calculation of a value reflecting the inclination dV/dt from V1 to V2'. Naturally, when the added value is divided by the time t2 required for the lamp voltage to shift from V1 to V2', a value of arithmetic average of the inclination dV/dt from V1 to V2' can be calculated. However, in Embodiment 4, such division is not particularly necessary since the time T2 is common among each lamp.

Further, the value reflecting the inclination dV/dt from V1 to V2' can be calculated simply by adding the lamp voltages Vt during the shift of the lamp voltage from V1 to T2, without executing the subtraction of (Vt−Vt−1) each time, and in this manner, a simpler calculation can be performed.

Here, by defining the function Vla(t) as a function expressing the lamp voltage Vla at the time t, a value obtained by addition of the lamp voltages with respect to the time can be expressed as ΣVla(t). Namely, in FIG. 15, it is possible to compare ΣVla(t) as the change rates, which are values obtained by addition of the lamp voltages at fixed intervals for the time period T2 after the lamp voltage reaches V1.

It is to be noted that the lamp voltage startup characteristic is as described in Embodiment 1, and also in Embodiment 4, the change rates of the lamp voltages within the lamp voltage increase regions where mercury (Hg) is the main emission element are obtained to discriminate the lamp types.

Provision of the above-mentioned lamp type discrimination means makes it possible to realize a high-intensity discharge lamp lighting apparatus capable of reliably determining a type of a loaded lamp, irrespective of the state (initial start, restart) of the lamp, to light the loaded HID lamp with a desired power characteristic.

The lighting apparatus is configured such that, in FIG. 13, the lamp voltages at fixed intervals for the time period T2 after the lamp voltage reaches V1 are added to calculate an integrated value using a microcontroller MC, followed by determination whether the value is larger or smaller than a reference value to allow discrimination between a lamp type A and a lamp type B in FIG. 15. In the example of FIG. 15, as for the lamp type A, an integrated value SA is an integrated value obtained by adding detection values Vla(t) of the lamp voltage Vla at fixed intervals for the time period T2 from the time tAV2 when the lamp voltage reaches V1. Further as for the lamp type B, an integrated value SB is an integrated value obtained by adding detection values Vla(t) of the lamp voltage Vla at fixed intervals for the time period T2 from the time tBV2 when the lamp voltage reaches V1. The fixed interval for the addition may be determined by means of the interruption timer of the microcontroller MC or the like. A reference value may be previously set at the midpoint of the integrated values SA and SB, and when the calculated integrated value is smaller than the reference value, the lamp type is determined as the lamp type B, and when the calculated integrated value is larger than the reference value, the lamp type is determined as the lamp type A.

Embodiment 5

Figure 16:
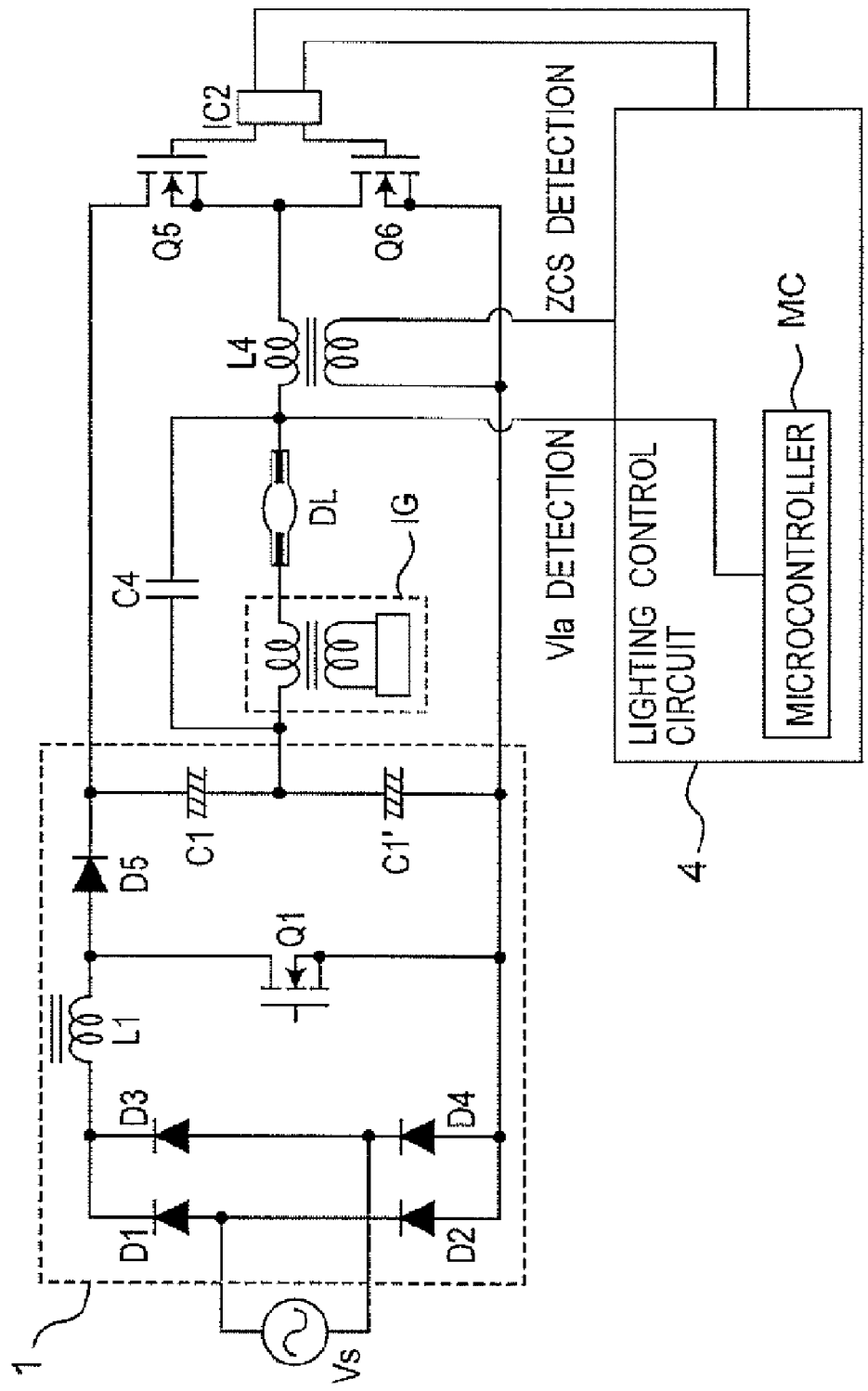
FIG. 16 is a circuit diagram of a high-intensity discharge lamp lighting apparatus according to Embodiment 5 of the present invention.

FIG. 16 shows a circuit diagram of a high-intensity discharge lamp lighting apparatus according to Embodiment 5. Compared with the lighting apparatus of FIG. 1, the following points are different. The step-down chopper circuit composed of the switching element Q2, diode D6, inductor L2, and capacitor C2 is omitted, and the function of the step-down chopper circuit is realized such that a period when the switching element Q5 is switched with a high frequency and a period when the switching element Q6 is switched with a high frequency are alternated with a low frequency in lighting the lamp. A further different point is that in place of the series circuit of the switching elements Q3 and Q4, a series circuit of the capacitors C1 and C1' for smoothing is connected to the output of the step-up chopper circuit. Namely, the inverter circuit is configured not to be a full-bridge type, but to be a half-bridge type.

The inductor L4 and the capacitor C4 constitute a low pass filter of the step-down chopper circuit. When the switching element Q5 is turned on and off with a high frequency, a chopping current which is broken down with a high frequency flows through the low pass filter composed of the inductor L4 and the capacitor C4 and the high frequency component is bypassed through the capacitor C4 to allow a DC current to flow in one direction in the discharge lamp DL. Further, when the switching element Q6 is turned on and off with a high frequency, the chopping current which is broken down with a high frequency flows through the low pass filter composed of the inductor L4 and the capacitor C4 and the high frequency component is bypassed through the capacitor C4 to allow the DC current to flow in the apposite direction to the above in the discharge lamp DL. Repetition of this operation allows a rectangular wave current with a low frequency to flow in the discharge lamp DL.

Moreover, the function of the diode D6 for regeneration in the lighting apparatus of FIG. 1 is shared by backward diodes of the switching elements Q5 and Q6 in the lighting apparatus of FIG. 16. Energy stored in the inductor L2 when the switching element Q5 is in on-state, is discharged through the backward diode of the switching element Q6 when the switching element Q5 is in off-state, and the energy stored in the inductor L2 when the switching element Q6 is in on-state, is discharged through the backward diode of the switching element Q5 when the switching element Q6 is in off-state. A current of a triangle wave flowing through the inductor L4 is detected by a secondary coil of the inductor L4. When a zero cross detection (ZCS detection in the figure) circuit detects that the regeneration current becomes zero, the switching elements Q5 and Q6 for chopper are turned on. The on-widths of the switching elements Q5 and Q6 for chopper are variably controlled by the microcontroller MC, thereby permitting the control of the supply power to the discharge lamp DL. However, the control is performed so as to output a constant current to the discharge lamp DL during the lamp type discrimination.

While FIG. 16 simplifies a diagram of the lamp voltage detection circuit (Vla detection circuit), needless to say, the circuit is configured such that a detection value corresponding to the lamp voltage can be acquired by the microcontroller MC, in the same manner as the lighting apparatus of FIG. 1. Specifically, for example, a first divided voltage resistance is connected between one end of the HID lamp DL and a ground, and a voltage at the divided voltage point is inputted to a first A/D conversion input terminal of the microcontroller MC to be A/D converted. Further, a second divided voltage resistance is connected between the other end of the HID lamp DL and a ground and a voltage at the divided voltage point is inputted to a second A/D conversion input terminal of the microcontroller MC to be A/D converted. An absolute value of a difference between two pieces of A/D converted data is calculated to obtain the detection value of the lamp voltage Vla of the discharge lamp DL.

Further, as the lamp current detection circuit (Ila detection circuit), the output of the secondary coil of the inductor L4 in the zero cross detection (ZCS detection in the figure) circuit can be used to detect the lamp current Ila. The output of the secondary coil of the inductor L4 is a triangle wave voltage, which is a voltage whose absolute value gradually increases when the switching elements Q5 and Q6 are in on-state, as welt as a voltage whose absolute value gradually decreases when the switching elements Q5 and Q6 are in off-state. The average value or the peak value of the triangle wave voltage can also be used as the detection value of the lamp current Ila.

When the power source is supplied from the commercial AC power source Vs, a dielectric breakdown voltage (several KV) for starting the HID lamp DL is applied from the igniter circuit IG to the HID lamp DL. The igniter circuit IG is a circuit in combination of a pulse generation circuit and a pulse transformer, and generates a pulse voltage by the pulse generation circuit in starting, and a high voltage pulse obtained by boosting the generated pulse voltage by the pulse transformer is applied to both ends of the HID lamp DL through the capacitor C3. When the HID lamp DL is electrically broken down and started, the igniter circuit IG stops the pulse generating operation. Thereafter, lamp voltage information is transmitted to the microcontroller MC through the foregoing lamp voltage detection circuit (Vla detection circuit).

Figure 17:
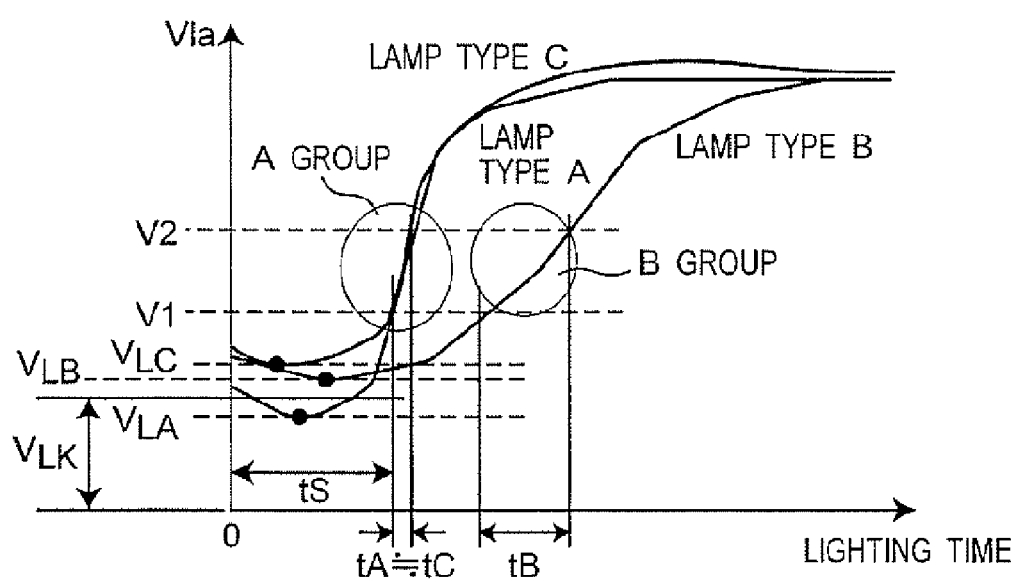
FIG. 17 is a principle explanatory diagram of HID lamp type discrimination according to Embodiment 5 of the present invention.
Figure 18:
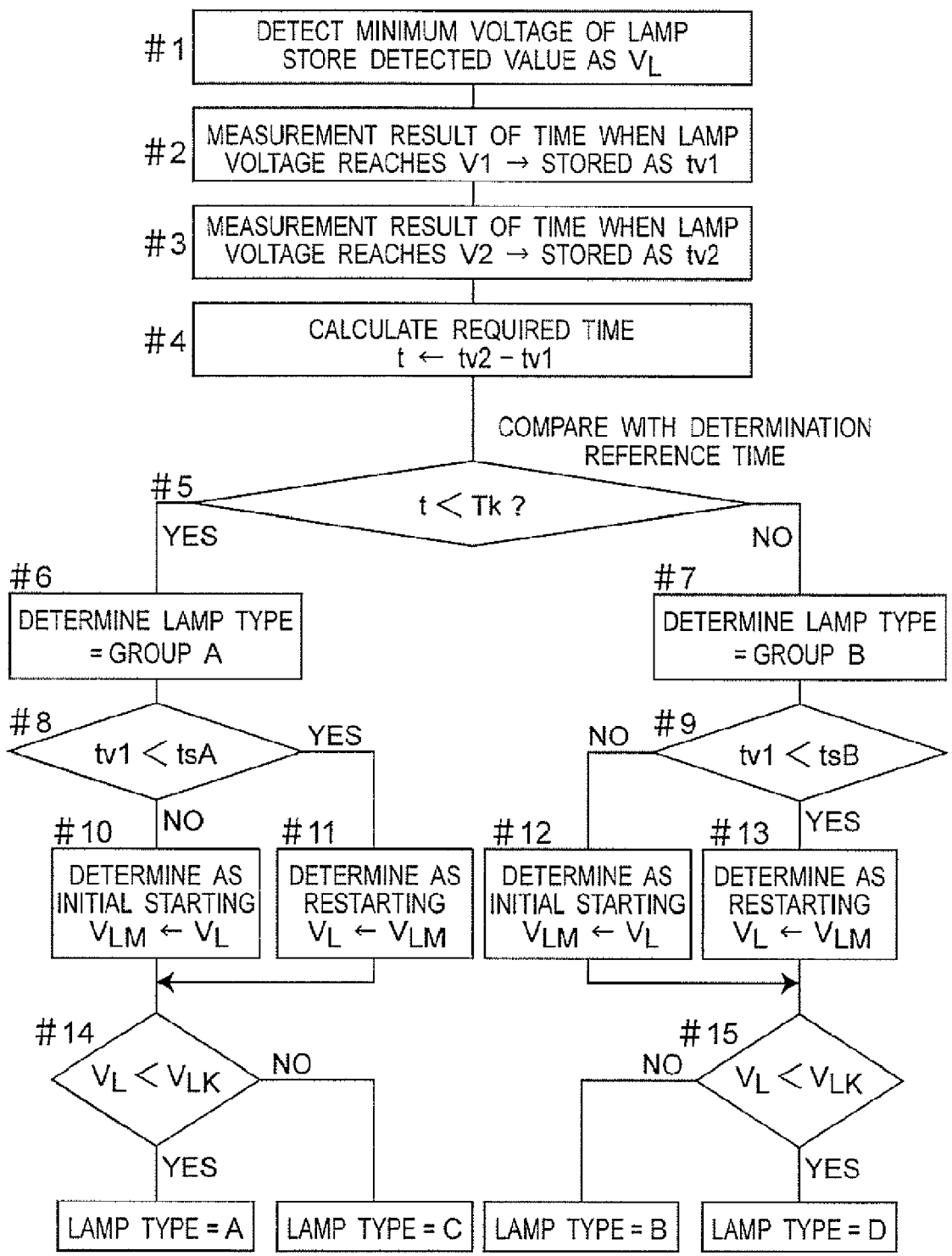
FIG. 18 is a flowchart for explaining an operation in Embodiment 5 of the present invention.

In this embodiment, the following describes a procedure for discriminating lamp types by combining the first lamp type determination using any of the change rate calculation methods described in Embodiments 1 to 4 and the second lamp type determination using a value at the lowest point of the lamp voltage that passes immediately after lighting of the lamp. FIG. 17 is a principle explanatory diagram of lamp type discrimination, and FIG. 18 is a flowchart of the lamp type discrimination.

Immediately after determining the lighting of the HID lamp DL, the microcontroller detects the minimum voltage VL before the lamp voltage increases within the fig main emission region through the Vla detection circuit. In FIG. 17, the minimum voltage of the lamp A is detected as VLA, the minimum voltage of the lamp B is detected as VLB, and the minimum voltage of the lamp C is detected as VLC. When the minimum voltage VL is detected, the detected value is stored in the microcontroller (Step #1 in FIG. 18).

Next, the lamp type discrimination is performed using any of the change rates described in Embodiments 1 to 4. For example, when the lamp type discrimination of Embodiment 1 is performed, the time at which the lamp voltage reaches the detection value V1 and the time at which the lamp voltage reaches the detection value V2 are stored respectively as tv1 and tv2 in a resistor within the microcontroller (Steps #2, #3 in FIG. 18). Subsequently, the time required for the lamp voltage to shift from V1 to V2 is calculated by: t=tv2−tv1, and the calculated time is compared with a determination reference time Tk (Steps #4, #5 in FIG. 18).

For example, when a lamp to be connected to the high-intensity discharge lamp lighting apparatus is started with the lamp voltage characteristic of the lamp types A, B or C in FIG. 17, the determination reference time Tk is set so as to satisfy: tA≅tC<Tk<tB. Here, tA is the time required for the lamp voltage of the lamp type A to shift from V1 to V2, tB is the time required for the lamp voltage of the lamp type B to shift from V1 to V2, and tC is time required for the lamp voltage of the lamp type C to shift from V1 to V2.

In a case where the type of a tentatively connected lamp is the lamp C, it is determined as YES in lamp group discrimination (Step #5 in FIG. 18). It is to be noted that the discrimination of Embodiment 3 by means of the detection value Vla1 and detection time T2 may be used for classification into a lamp group A or B. In such a case, in Step #5, the discrimination is performed based upon a value of the lamp voltage V2' at the time point when counting of the detection time T2 is completed in place of the determination reference time Tk.

Next, the time tv1 after the power source is turned on until the lamp voltage reaches the detection value V1 is compared with a determination value ts, to determine whether the lamp is initially started or restarted (Steps #8, #9 in FIG. 18). In the case of FIG. 17, since tv1=ts and the lamp is thus determined to be initially started, VLC is stored in VLM (Step #10 in FIG. 18).

Here, it is specially mentioned that the determination value ts needs to be set in sufficient consideration of variations in lamp types. In the example of FIG. 18, the determination values tsA and tsB are properly used between the lamp groups A and B. Further, when the measurement data is one in restarting, the time tv1 until the lamp voltage reaches V1 is shorter than the detection value ts, and a value obtained by copying the value already stored in the VLM back to VL is compared with a discrimination value VLK to determine the lamp type.

Finally, in the lamp type discrimination (Steps #14, #15 in FIG. 18), the minimum voltage VL detected from the lamp voltage characteristic in initial starting is compared with the discrimination value VLK. In this example, the minimum voltage VL is VLC and since VLC>VLK in FIG. 17, the type of the loaded lamp is determined to be the lamp C.

When the lamp type is determined, the V-W table applicable to the lamp is referred to from the memory of the microcontroller MC, and the on-widths of the switching elements Q5 and Q6 for chopper are variably controlled such that an appropriate lamp power is supplied according to the lamp voltage. Specifically, based upon the lamp voltage, a target value of the lamp power is read from the V-W table, and the target value of the lamp power is divided by the detection value of the lamp voltage to calculate a target value of the lamp current. The on-widths of the switching elements Q5 and Q6 for chopper are variably controlled such that the target value of the lamp current agrees with the detection value of the lamp current.

Provision of the above-mentioned lamp type discrimination means makes it possible to realize a high-intensity discharge lamp lighting apparatus capable of reliably determining a type of a loaded lamp, irrespective of the state (initial start, restart) of the lamp, to light the loaded HID lamp with a desired power characteristic.

Embodiment 6

Figure 19:
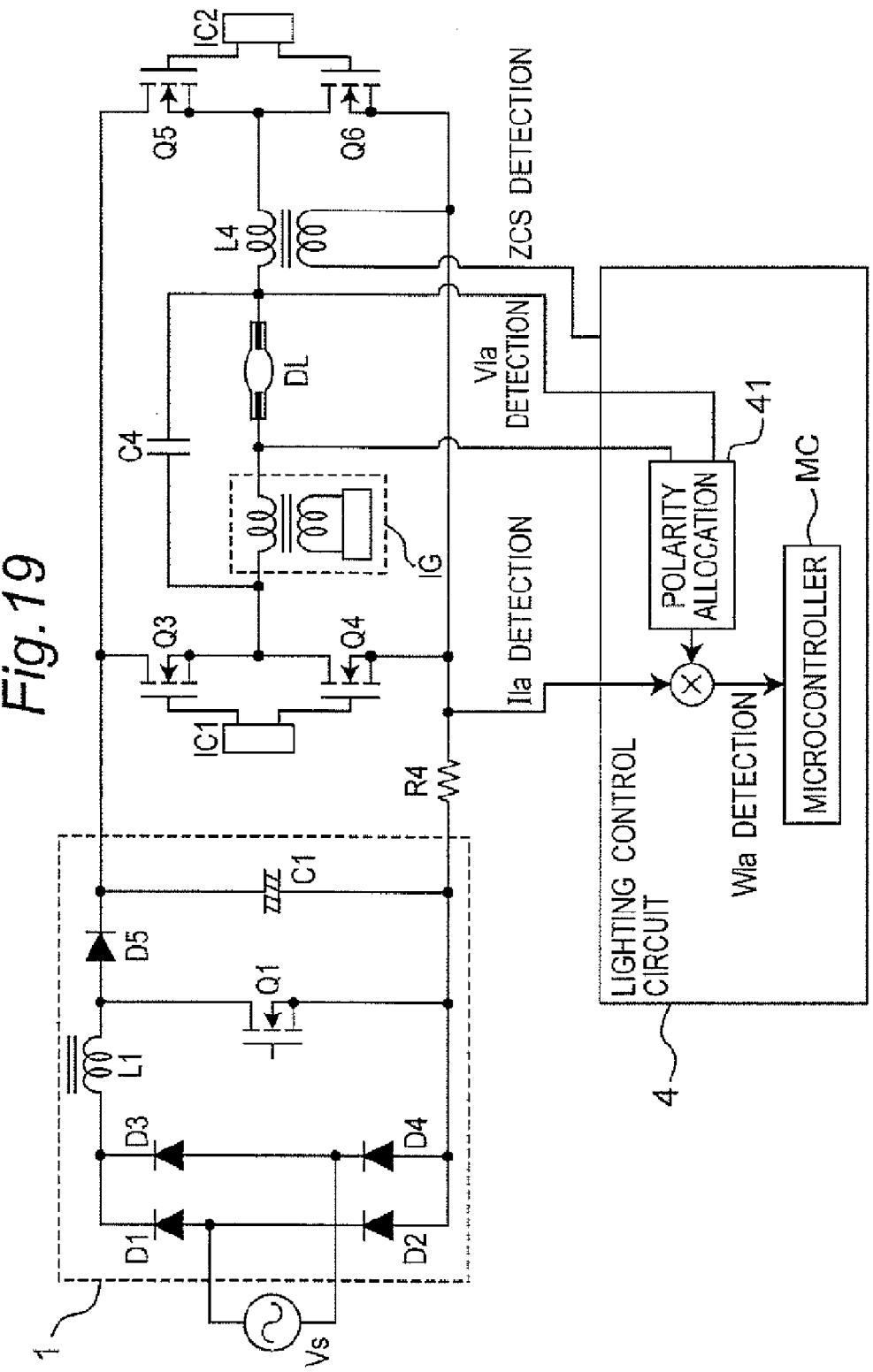
FIG. 19 is a circuit diagram of a high-intensity discharge lamp lighting apparatus according to Embodiment 6 of the present invention.

FIG. 19 shows Embodiment 6. While the circuit configuration thereof is almost the same as the circuit shown in FIG. 13, there is a difference in that, as the configuration of the igniter circuit IG that generates a high voltage (several KV) for electrically breaking down the load lamp in a non-loaded state before lighting, in place of the LC series resonance circuit of the inductor L3 and the capacitor C5 in FIG. 13, a high voltage pulse generation circuit which is a combination of a pulse transformer and a pulse generation circuit is used in FIG. 19. Further, in FIG. 19, a terminal voltage of the HID lamp DL is detected through a polarity allocation means in order to detect the lamp voltage Vla, and a voltage corresponding to the lamp voltage is detected from the non-ground-side terminal of the HID lamp DL every time the voltage polarity of the HID lamp DL is switched.

In stable lighting, the circuit of FIG. 19 is the same as that of FIG. 13 in that, while the switching elements Q3 and Q4 are alternately switched on and off with a low frequency, the switching element Q6 is switched with a high frequency when the switching element Q3 is in on-state, and the switching element Q5 is switched with a high frequency when the switching element Q4 is in on-state, thereby realizing the function of the step-down chopper circuit. However, the circuit of FIG. 19 is different in that, since the LC series resonance circuit of the inductor L3 and the capacitor C5 is not present, the switching elements Q3 and Q4 may be turned on and off with a high frequency in synchronized with the turning on and off of the switching elements Q5 and Q6. Further, as opposed to the circuit in FIG. 13, while the switching elements Q5 and Q6 are alternately turned on and off with a low frequency, the switching element Q4 may be switched with a high frequency when the switching element Q5 is in on-state, and the switching element Q3 may be switched with a high frequency when the switching element Q6 is in on-state, thereby realizing the function of the step-down chopper circuit.

It is to be noted that the circuit configurations of FIGS. 1, 13, 16 and 19 may be used as the lighting apparatus of any of Embodiments 1 to 6.

In FIG. 19, when the AC power source Vs is supplied, a dielectric breakdown voltage (several KV) for starting the discharge lamp DL is applied from the igniter circuit IG to the discharge lamp DL. When the discharge lamp DL is electrically broken down and started, the igniter circuit TG stops and lamp power information is transmitted to the microcontroller MC through a Wla detection circuit.

Next, a first change rate is calculated in the same manner as in any of Embodiments 1 to 4, though in the startup characteristic of the lamp power in place of the lamp voltage, the lamp power using a detection value of the lamp power Wla obtained by multiplying the detection value of the lamp voltage Vla by the detection value of the lamp current Ila, to determine the type of the connected lamp by using the calculated first change rate.

Further, a second change rate is calculated by using a third detection value at a timing after the lamp voltage reaches V2. The second change rate may be calculated by applying the calculation of the change rate described in Embodiment 1 or 2 to the lamp voltage range of V2 to V3, where V1<V2<V3, or the second change rate may also be calculated by applying the calculation of the change rate described in Embodiment 3 or 4 to a lamp voltage V3' after a fixed time T3 from V2. While the second change rate here is also described using the detection value Vla of the lamp power detection circuit, the detection value Vla of the lamp voltage detection circuit may be used.

Figure 20:
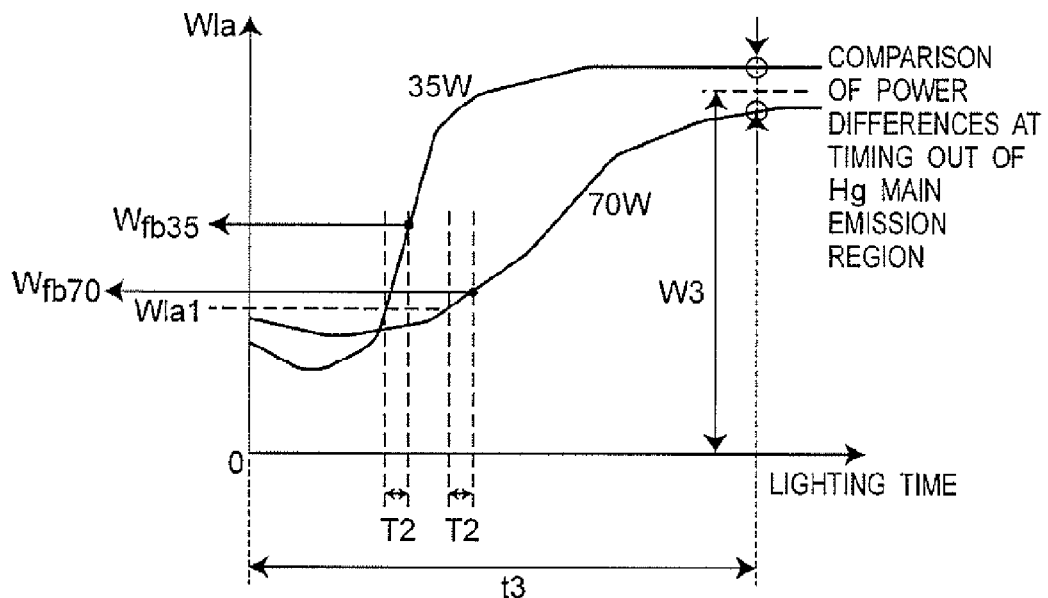
FIG. 20 is a principle explanatory diagram of HID lamp type discrimination according to Embodiment 6 of the present invention.

FIG. 20 is a principle explanatory diagram of lamp type discrimination according to Embodiment 6, where as the first change rate, the lamp power after a time lapse of a fixed time T2 after the lamp power reaches Wla1 is used to discriminate the lamp types, and as the second change rate, a power difference after a time lapse of a time t3 after turning-on of the power supply is used to confirm the lamp type discrimination result. The first change rate is detected at a timing within the Hg main emission region, and the second change rate is detected at a timing out of the Hg main emission region. In the case of a 35 W lamp, the lamp power after a time lapse of the fixed time T2 after the lamp power reaches Wla1 becomes Wfb35, and in the case of a 70 W lamp, the lamp power after a time lapse of the fixed time T2 after the lamp power reaches Wla1 becomes Wfb70, whereby it is possible to determine what watts lamp is connected. Further, it is detected whether or not the power after a time lapse of the time t3 after turning-on the power source has exceeded a determination reference power W3, to thereby confirm accuracy of the lamp type discrimination obtained by the first change rate. Subsequently, the lighting control circuit is switched from a fixed current control to a fixed power control, and lamp power is supplied according to the number of watts of the determined lamp type.

Provision of the lamp type discrimination means using the first and second change rates makes it possible to realize a high-intensity discharge lamp lighting apparatus capable of reliably determining a type of a loaded lamp, irrespective of the state (initial start, restart) of the lamp, to light the loaded HID lamp with a desired power characteristic.

Embodiment 7

Figure 21:
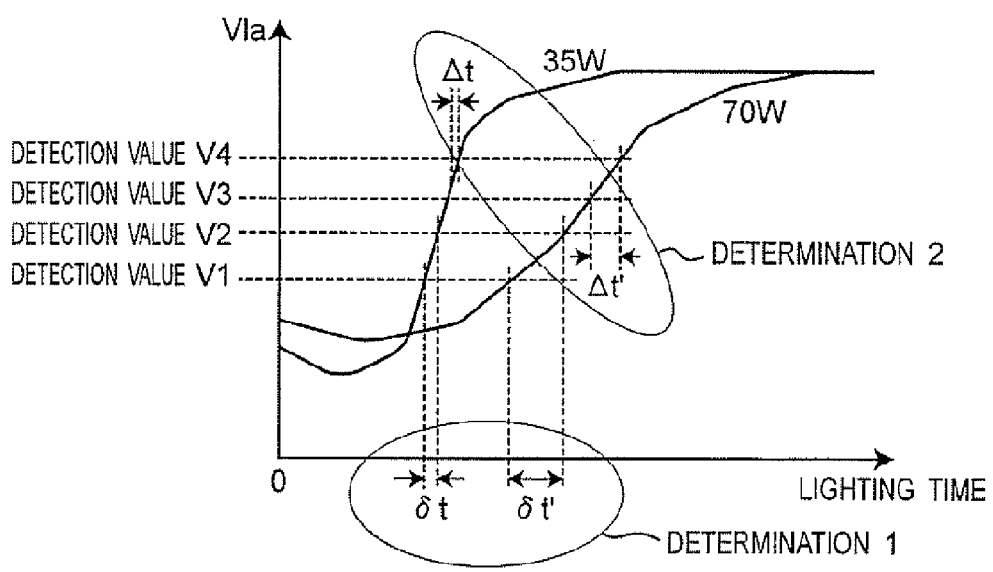
FIG. 21 is a principle explanatory diagram of HID lamp type discrimination according to Embodiment 7 of the present invention.
Figure 22:
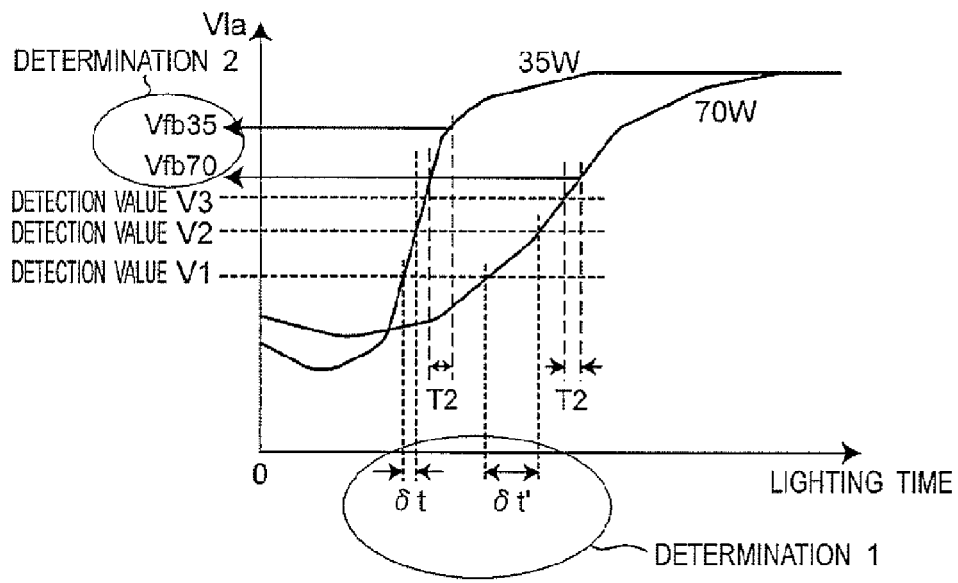
FIG. 22 is a principle explanatory diagram of HID lamp type discrimination according to Embodiment 7 of the present invention.

FIGS. 21 and 22 show principle explanatory diagrams of lamp type discrimination according to Embodiment 7 of the present invention. The means for discriminating the lamp types according to the change rates, described in Embodiments 1 to 4, may be performed in the present Embodiment 7 in a manner such that, as shown in FIG. 21, four detection values V1, V2, V3 and V4, where V1<V2<V3<V4, are set, and passage of the lamp voltage through those detection values is detected to calculate two change rates. In this case, any of the detections in Embodiments 1 to 4 may be combined for the first step and second step detections.

For example, FIG. 21 shows an example in which a time ($\delta t=t2-t1$) required for the lamp voltage to shift from V1 to V2 is regarded as the first change rate while the time ($\Delta t=t4-t3$) required for the lamp voltage to shift from V3 to V4 is regarded as the second change rate, and those first and second change rates are simultaneously used to determine the lamp type. In the figure, $\delta t$ and $\Delta t$ are the first and second change rates with respect to a 35 W lamp, and $\delta t'$ and $\Delta t'$ are the first and second change rates with respect to a 70 W lamp, and a value obtained by: $(\delta t+\delta t')/2$, is previously set as a first determination reference value, while a value obtained by: $(\Delta t+\Delta t')/2$, is previously set as a second determination reference value. Thereby, when the first change rate is smaller than the first determination reference value and the second change rate is smaller than the second determination reference value, the lamp can be reliably determined as a 35 W lamp. Further, when the first change rate is larger than the first determination reference value and the second change rate is larger than the second determination reference value, the lamp can be reliably determined as the 70 W lamp.

In addition, when the first change rate is smaller than the first determination reference value and the second change rate is larger than the second determination reference value, or when the first change rate is larger than the first determination reference value and the second change rate is smaller than the second determination reference value, it is determined that an unexpected lamp is connected and that the load is thus abnormal, whereby the power supply may be stopped or reduced.

Further, it is possible to discriminate types of high-intensity discharge lamps by using a value obtained as the second change rate, obtained by detecting at fixed time intervals that the voltage characteristic of the high-intensity discharge lamp shifts with time lapse from the third voltage to the fourth voltage and then adding the detected values, dividing the value by the time required for the shift from the third voltage to the fourth voltage.

Further, FIG. 22 shows an example of determining a lamp type in which the time ($\delta t=t2-t1$) required for the lamp voltage to shift from V1 to V2 is regarded as the first change rate, while the lamp voltage after a time lapse of the fixed time T2 after the lamp voltage reaches V3 is regarded as a second change rate, and these first and second change rates are both used to determine the lamp type. In the figure, $\delta t$ is the time required for the lamp voltage to shift from V1 to V2 with respect to a 35 W lamp, while $\delta t'$ is the time required for the lamp voltage to shift from V1 to V2 lamp with respect to a 70 W lamp. Further, Vfb35 is a value of the lamp voltage measured after a time lapse of the fixed time T2 after the voltage reaches V3 with respect to a 35 W lamp, while Vfb70 is a value of the lamp voltage measured after a time lapse of the fixed time T2 after the voltage reaches V3 with respect to a 70 W lamp. A value obtained by: $(\delta t+\delta t')/2$, is previously set as a first determination reference value while a value obtained by: $(Vfb35+Vfb70)/2$, is previously set as a second determination reference value. Thereby, when the first change rate $\delta t$ is smaller than the first determination reference value and the second change rate Vfb35 is larger than the second determination reference value, the lamp can be reliably determined as the 35 W lamp. Further, when the first change rate $\delta t'$ is larger than the first determination reference value and the second change rate Vfb70 is smaller than the second determination reference value, the lamp can be reliably determined as the 70 W lamp.

When the first change rate is smaller than the first determination reference value and the second change rate is smaller than the second determination reference value, or when the first change rate is larger than the first determination reference value and the second change rate is larger than the second determination reference value, it is determined that an unexpected lamp is connected and that the load is thus abnormal, thereby the power supply may be stopped or reduced.

It is to be noted that in the present embodiment shown in FIG. 21, as a modification thereof, the types of high-intensity discharge lamps may be discriminated, for example, by using a time lapse for the voltage characteristic of the high-intensity discharge lamp to shift from the second voltage V2 to the third voltage V3 as the second change rate in addition to the first change rate.

Further, it is also possible to discriminate types of high-intensity discharge lamps by using a value as the second change rate in addition to the first change rate, the value being obtained by detecting at fixed time intervals that the voltage characteristic of the high-intensity discharge lamp shifts from the second voltage V2 to the third voltage V3 with time lapse and then adding the detected values, or being obtained by dividing the added value by the time required for the shift from the second voltage to the third voltage.

Similarly, in the present embodiment shown in FIG. 22, as a modification thereof, the types of high-intensity discharge lamps may be discriminated by using a voltage after a time lapse of a prescribed time T2 after the voltage characteristic of the high-intensity discharge lamp reaches the second voltage V2, as the second change rate in addition to the first change rate.

Further, it is also possible to discriminate types of high-intensity discharge lamps by using a value as the second change rate in addition to the first change rate, the value being obtained by detecting at fixed time intervals that tie voltage characteristic of the high-intensity discharge lamp shifts with time lapse of a prescribed time T2 after the voltage characteristic reaches the second voltage V2 and then adding the detected values, or being obtained by dividing the added value by the prescribed time T2.

Provision of the lamp type discrimination means using the first and second change rates makes it possible to realize a high-intensity discharge lamp lighting apparatus capable of reliably determining a type of a loaded lamp, irrespective of the state (initial start, restart) of the lamp, to thereby light the loaded HID lamp with a desired power characteristic.

Embodiment 8

Figure 23:
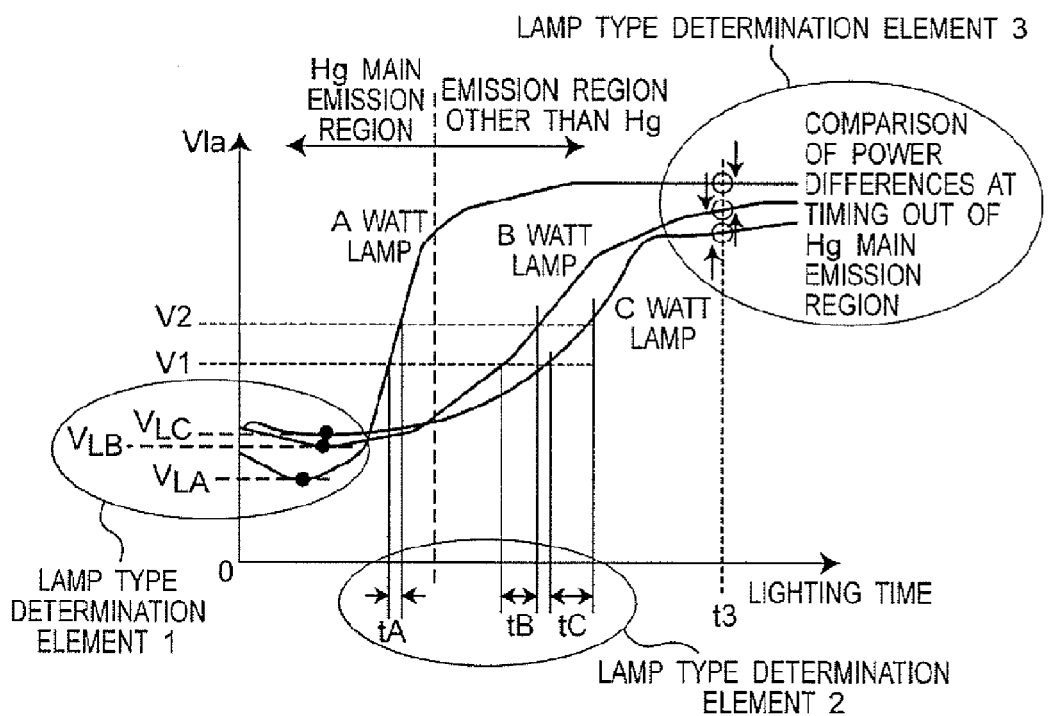
FIG. 23 is a principle explanatory diagram of HID lamp type discrimination according to Embodiment 8 of the present invention.

FIG. 23 shows a principle explanatory diagram of lamp type discrimination according to Embodiment 8. FIG. 23 is a diagram explaining three regions where the lamp voltage startup characteristic in starting the lamp is detectable. Three elements in the figure are described below.

As a lamp type discrimination element 1, the minimum voltage VL is detected through which the lamp voltage passes as described in Embodiment 5, to discriminate the lamp types. Here, the minimum voltage VLA is obtained as a detection value with respect to the lamp A, the minimum voltage VLB is obtained as a detection value with respect to the lamp B, and the minimum voltage VLC is obtained as a detection value with respect to the lamp C.

As a lamp type discrimination element 2, any of the change rates shown in Embodiments 1 to 4 is used, based upon which the lamp types are discriminated. Here, respective time tA, tB and tC required for the lamp voltage to reach V2 after reaching V1 are obtained as detection values with respect to the lamps A, B and C.

As a lamp type discrimination element 3, a measurement timing t3 (within 100 to 200 seconds after turning-on the power source) is set outside the Hg main emission region, and a voltage difference at this measurement timing t3 is detected to discriminate the lamp types.

When the types of the lamps to be connected to the high-intensity discharge lamp lighting apparatus are limited, the above three elements may be comprised of any combination thereof including at least the lamp type discrimination element 2 according to the object lamp type, thereby making it possible to realize a high-intensity discharge lamp lighting apparatus capable of reliably determining a type of a loaded lamp, irrespective of the state (initial start, restart) of the lamp, to light the loaded HID lamp with a desired power characteristic.

Embodiment 9

Figure 24:
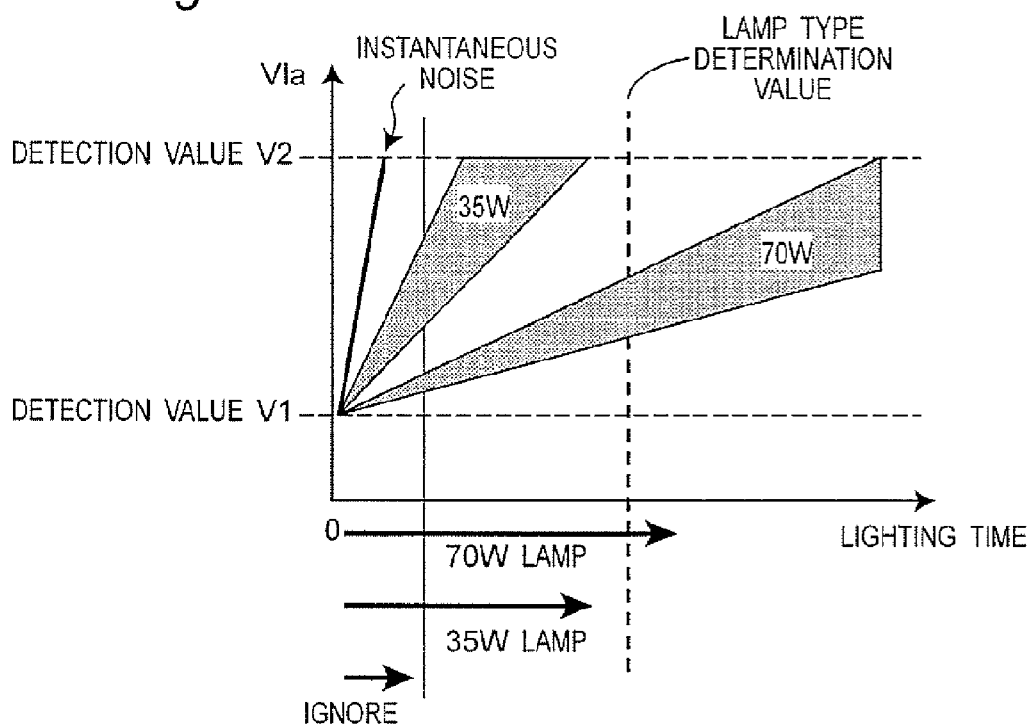
FIG. 24 is a principle explanatory diagram of HID lamp type discrimination according to Embodiment 9 of the present invention.
Figure 25:
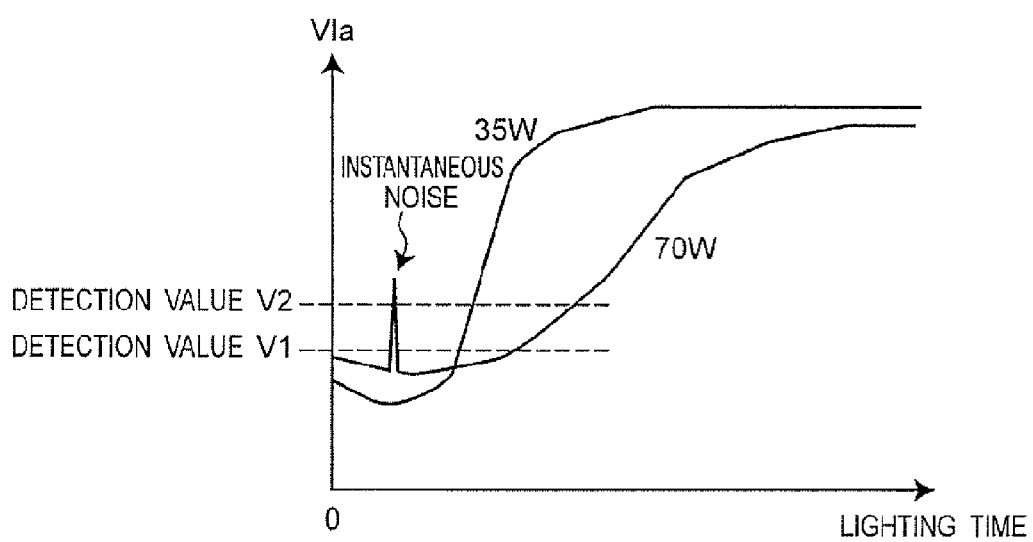
FIG. 25 is an explanatory diagram showing one example of an instantaneous noise to be detected in Embodiment 9 of the present invention.

FIG. 24 shows a principle explanatory diagram of Embodiment 9. As in Embodiments 1 to 4, in the high-intensity discharge lamp lighting apparatus which detects change rates of the lamp voltages or the lamp power to discriminate lamp types, even when a value affected by an instantaneous noise as shown in FIG. 25 is transmitted from the lamp voltage detection circuit or the lamp power detection circuit to the lighting control circuit, a means of preventing erroneous detection of the lamp type is provided. As described in Embodiment 1, when the change rate is calculated from the time point t1 when the lamp voltage reaches V1 to the time point t2 when the lamp voltage reaches V2, in the expression: $dV/dt=(V2-V1)/(t2-t1)$, t2 is a value that varies since V2, V1 and t1 are fixed values. Namely, when the lamp voltage reaches the detection value V1, the timer counting is started, and when the lamp voltage then reaches the detection value V2, the timer counting is ended, so that a counted value of the timer is detected as the change rate.

However, when an instantaneous noise as in FIG. 25 is detected, (t2−t1) becomes a very small value, and accordingly the change rate dV/dt becomes a very large value. This is illustrated in FIG. 24. Namely, even when the connected lamp is a 70 W lamp, detection of an instantaneous noise might lead to erroneous determination of the lamp as a 35 W lamp since the value (t2−t1) counted by the timer is smaller than the lamp type discrimination value (indicated by a thick broken line in FIG. 24).

Therefore, in the case where a time further shorter than the shortest time until the lamp voltage reaches V2 after reaching V1, i.e. a value further larger than the largest change rate dV/dt, is detected as the change rate among all types of lamps to be connected to the lighting apparatus, as shown in FIG. 24, the detected value is regarded as an instantaneous noise and thus ignored, and awaiting the lamp voltage to reach V1 again. It is thereby possible to prevent erroneous determination of a lamp type due to an instantaneous noise.

Figure 26:
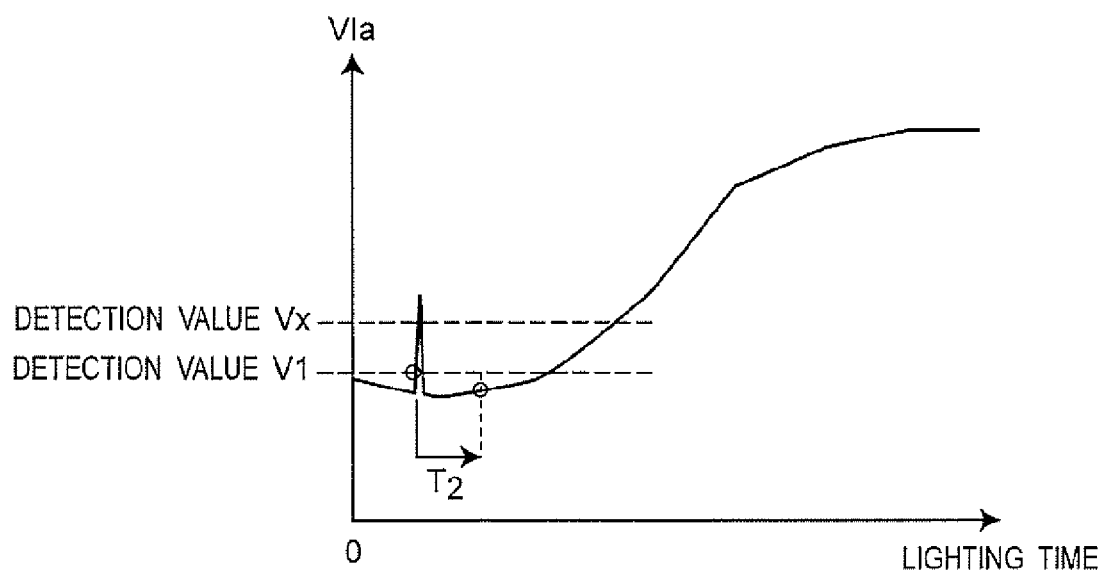
FIG. 26 is an explanatory diagram showing another example of an instantaneous noise to be detected in Embodiment 9 of the present invention.

Further, in the case where the lamp voltage after a time lapse of a fixed time T2 after the lamp voltage reaches V1 is obtained as the change rate as in Embodiment 3, when the lamp voltage exceeds the detection value V1 due to an instantaneous noise as in FIG. 26, even obtaining the lamp voltage after a lapse of the fixed time T2 from that point does not lead to correct lamp type determination. Therefore, a voltage Vx is previously set for instantaneous noise detection. When it is detected that the lamp voltage has exceeded the voltage Vx for instantaneous noise detection after the lamp voltage exceeded V1, an overlarge value of the change rate between V1 and Vx is ignored, and await the lamp voltage to reach V1 again, in the same manner as shown in FIG. 24. Thereby it is possible to prevent erroneous lamp type detection due to the instantaneous noise.

As described above, in Embodiments 1 to 9 according to the present invention, the high-intensity discharge lamp is preferably a metal halide lamp including at least mercury as an emission source. Further, the change rates are preferably discriminated within a region where the mercury in the metal halide lamp is the main emission source.

In the above configuration, the change rates are preferably discriminated within a region where the voltage of the metal halide lamp tends to increase with time lapse. The lamp types may be further preferably discriminated based upon the voltage of the high-intensity discharge lamp at a prescribed time within a region where an element other than mercury in the metal halide lamp is added as the main emission source.

Further, when the change rate of the voltage characteristic of the high-intensity discharge lamp is larger than a predetermined rate, information of the change rate can be preferably ignored to discriminate lamp types. Further, the lamp power characteristic of the high-intensity discharge lamp may be preferably used in place of the voltage characteristic of the lamp. Moreover, a microcontroller is preferably used in the lighting control circuit of the discharge lamp lighting apparatus.

Next, Embodiments 10 to 12 according to the second aspect of the present invention are described below with reference to FIGS. 27 to 42. The second aspect of the present invention is configured such that, a discharge lamp lighting apparatus is capable of lighting high-intensity discharge lamps of a plural types of rated power aid is further capable of automatically determining a rated power of a connected high-intensity discharge lamp to light the high-intensity discharge lamp with the determined rated power thereof, where load discrimination is made possible even with an improvement in characteristic of the HID lamp.

Embodiment 10

A method for discriminating initial start and restart of a lamp is disclosed in a HID lamp lighting circuit according to the present embodiment. In the conventional configuration, not only two startup states as the initial start and restart characteristics but also a variety of intermediate states can be taken depending upon a cooling condition of the HID lamp. Accordingly, the present embodiment provides a load discrimination means as a more reliable load discrimination means, particularly based upon a premise of a difference between the initial start and the restart.

Figure 27:
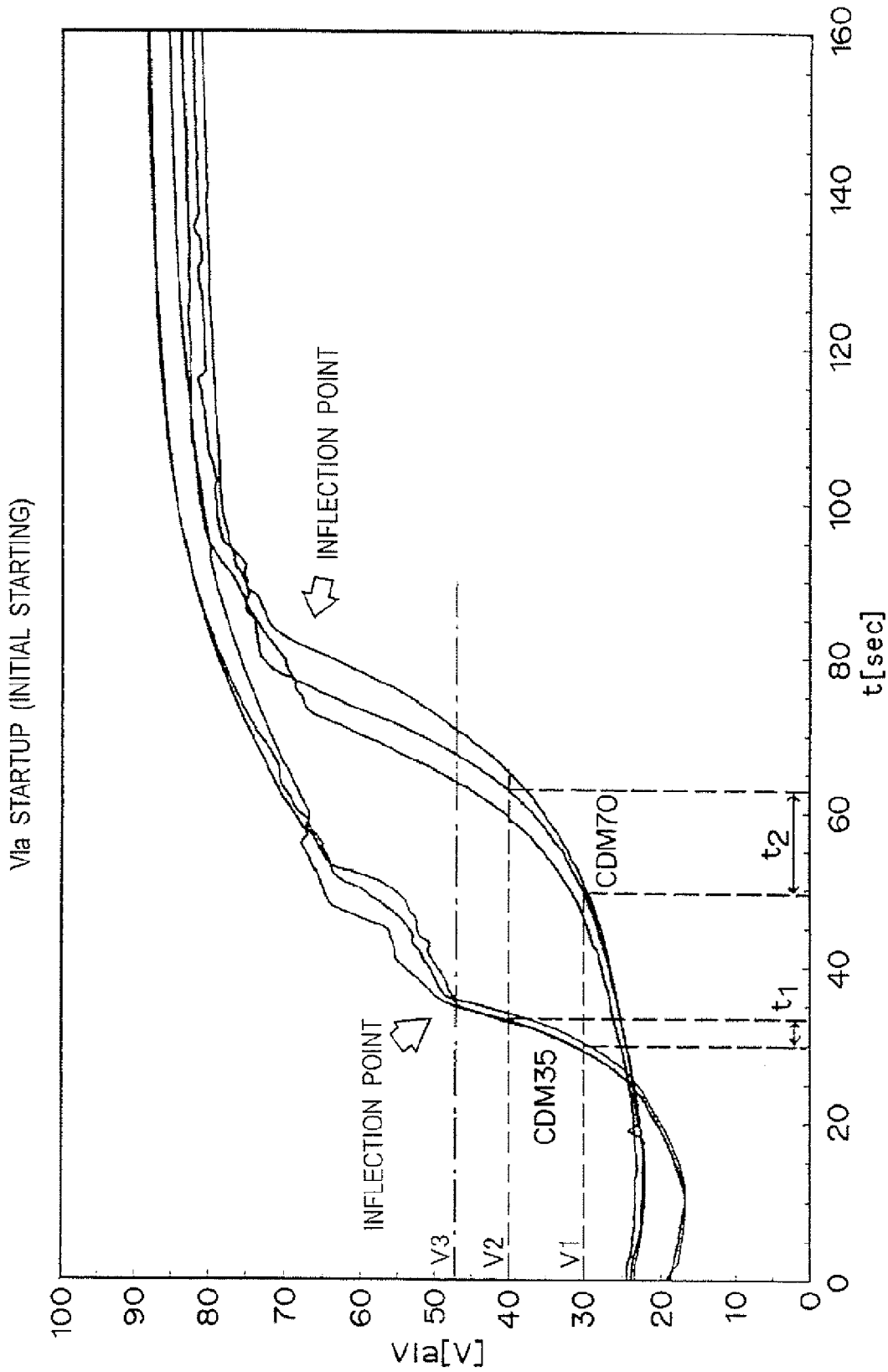
FIG. 27 is an explanatory diagram showing a principle of HID lamp type discrimination according to measurement of startup time in starting in Embodiment 10 of the present invention.

The present inventors found that, as shown in FIG. 27, a plurality of types of rated power of HID lamps can be determined based upon a difference in behavior of transient characteristics of the HID lamps in starting when HID lamps of different rated power are lighted by a ballast having specific power characteristics. FIG. 27 shows the startup characteristics of the lamp voltage Vla in starting with respect to three CDM-35 HID lamps and three CDM-70 HID lamps.

Figure 28:
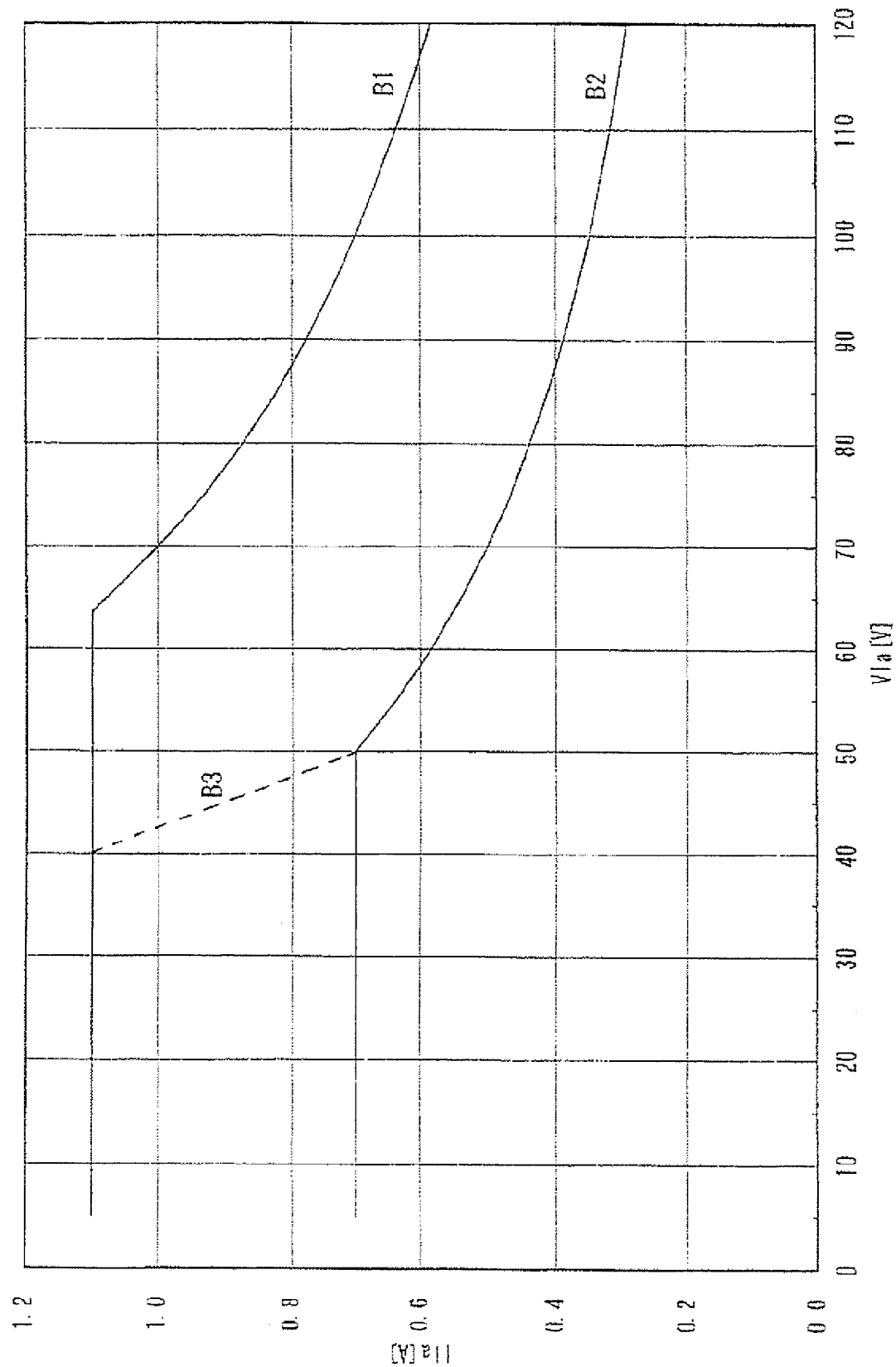
FIG. 28 is an explanatory diagram of a ballast characteristic for use in HID lamp type discrimination according to measurement of startup time in starting in Embodiment 10 of the present invention.

FIG. 28 shows a ballast characteristic of the HID lamp lighting circuit. A solid line B1 indicates one example of ballast characteristics exclusively for the rated power of 70 W, and a solid line B2 indicates one example of ballast characteristics exclusively for the rated power of 35 W. A broken line B3 indicates a ballast characteristic that shifts from the characteristic B1 to the characteristic B2. In both cases of the characteristics B1 and B2, the lamp current is controlled to be constant in a region where the lamp voltage Vla is low (hereinafter referred to as "constant lamp current control" or "constant current control"), and the power is controlled to be constant when the lamp voltage Vla exceeds a prescribed value (hereinafter referred to as "constant lamp power control" or "constant power control"). In the case of the 70 W lamp, the ballast characteristic for the load discrimination is the characteristic as shown by the solid line B1. In the case of the 35 W lamp, the lamp type is determined as the 35 W lamp at the time point of Vla=40V in the characteristic B1 of the 70 W lamp, and the characteristic shifts from the characteristic B1 to the characteristic B2 through the ballast characteristic B3. As described above, the ballast characteristic for the load discrimination according to the present embodiment is characterized by providing the ballast characteristic B3 for shifting from B1 to B2.

Thus, in both cases of the characteristics B1 and B2, a sequence from the constant lamp current control to the constant power control is followed. In the ballast control circuit, only one switching is required, and further a timing of the switching can be a time point of a specific value of the lamp voltage Vla, namely, may be a previously determined characteristic value.

According to this example, the load discrimination is possible irrespective of the difference between the initial start and the restart which was not considered in the Patent Document 1 (Japanese Patent Laid-Open No. 2003-229289). While the use of this example is thought to allow discrimination of almost all HID lamps, there are some cases where a lamp manufacturer improves a characteristic of a HID lamp, resulting in a change in behavior of the transient characteristic of the HID lamp in starting. Hence it is necessary to further consider the case where the behavior of the transient characteristic changes.

Specifically speaking, a HID lamp has a characteristic of being slow in startup of light pencils, and thus being unable to obtain sufficient light at the initial stage of lighting. It is naturally considered that the manufacturer may improve the slow startup of light pencils. In this case, the characteristic is improved so as to reduce the time for startup of the lamp voltage Vla in FIG. 27, and with such improvement, the lamp, though being the 70 W lamp, becomes able to start up as quickly as the 35 W lamp before improvement.

If all lamp manufacturers improve lamp characteristics all at once, it is possible to deal with the improvement by changing thresholds for load discrimination, but practically, the manufacturers perform characteristic improvement in different manners. If only one manufacturer performs the above-mentioned improvement, HID lamps which are equivalent rated lamps but have significantly different startup characteristics in initial starting are present in a mixed state in the market. What is troublesome is that, when a ballast for load discrimination is designed based upon the characteristics shown in FIG. 27, a fresh 70 W lamp with its characteristic improved may be erroneously determined as the rated 35 W lamp, and hence the discrimination by means of the transient characteristics alone cannot deal with the change in behavior of the HID lamp due to the improvement in characteristic of the HID lamp.

Figure 29A:
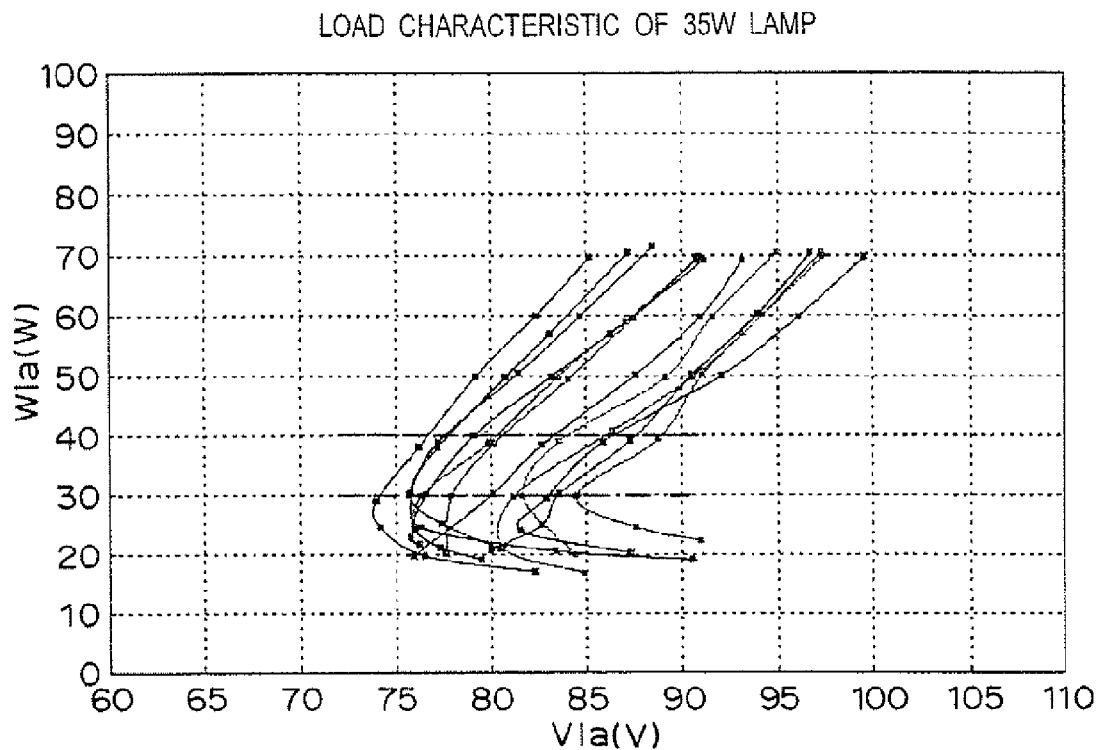
FIG. 29A is a characteristic diagram showing a relation between a lamp voltage and lamp power when a 35 W lamp is stable in Embodiment 10 of the present invention.
Figure 29B:
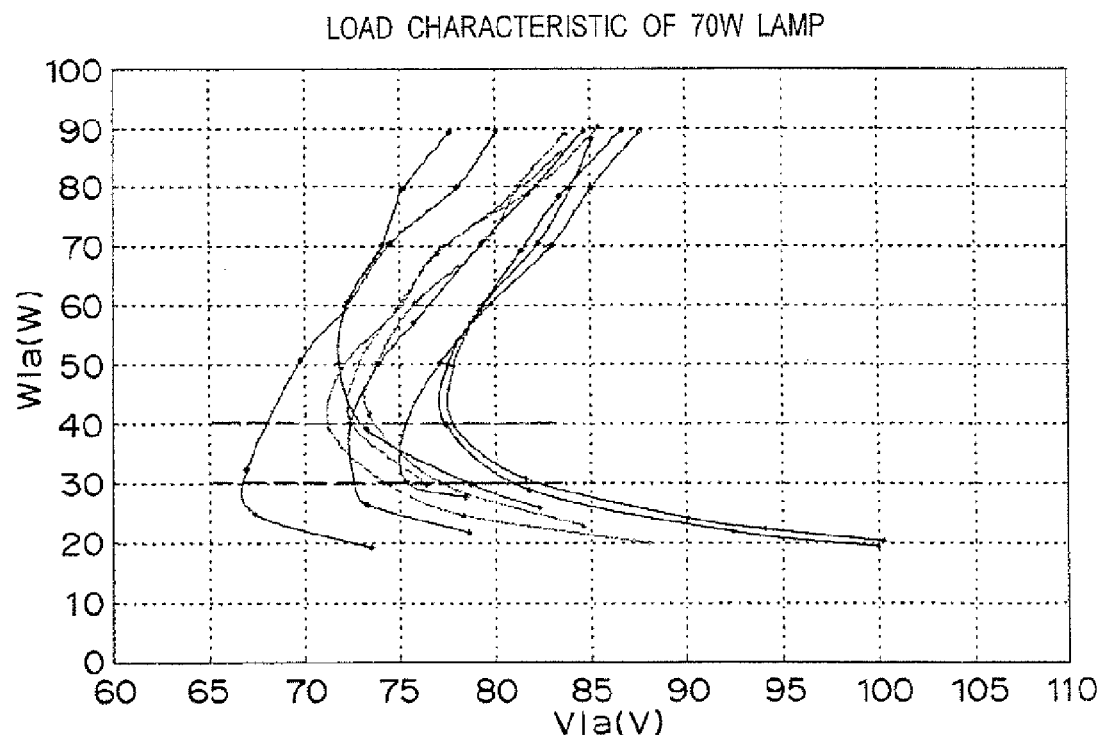
FIG. 29B is a characteristic diagram showing a relation between a lamp voltage and lamp power when a 70 W lamp is stable in Embodiment 10 of the present invention.

In order to make load discrimination possible even with the characteristic of the HID lamp improved in the discharge lamp lighting apparatus, the present inventors performed close observation of characteristics in stable lighting of the high-intensity discharge lamp with respect a variety of power values. FIGS. 29A and 29B respectively show results of measuring relations between the power and the voltage in the 35 W lamp and the 70 W lamp in stable lighting with a variety of powers.

Here, when attention is focused on data between 30 W and 35 W of the lamp power Wla, it is found from FIG. 29A that the lamp voltage Vla decreases with decrease of power from 35 W to 30 W in the 35 W lamp. Meanwhile, it is found from FIGS. 29A and 29B that 70 W lamps with lamp voltages lower than 75V when lighted at a power of 35 W are present whereas such a 35 W lamp is not present. Further, it is found from FIG. 29B that in 75 W HID lamps with power not lower than 75V in lighting with the power of 35 W, the lamp voltages increase or hardly change when the power is decreased to 30 W.

As described above, it was discovered that the 35 W lamp and the 70 W lamp are different in characteristic value when lighted with a certain fixed power value. Combining the two characteristic values (FIGS. 29A, 29B) in the steady state shown above with the load discrimination (FIGS. 27, 28) by means of the startup characteristics in starting makes it possible to deal with a change in characteristic value due to improvement in characteristic of the lamp, so as to realize a discharge lamp lighting apparatus with higher reliability.

Figure 30:
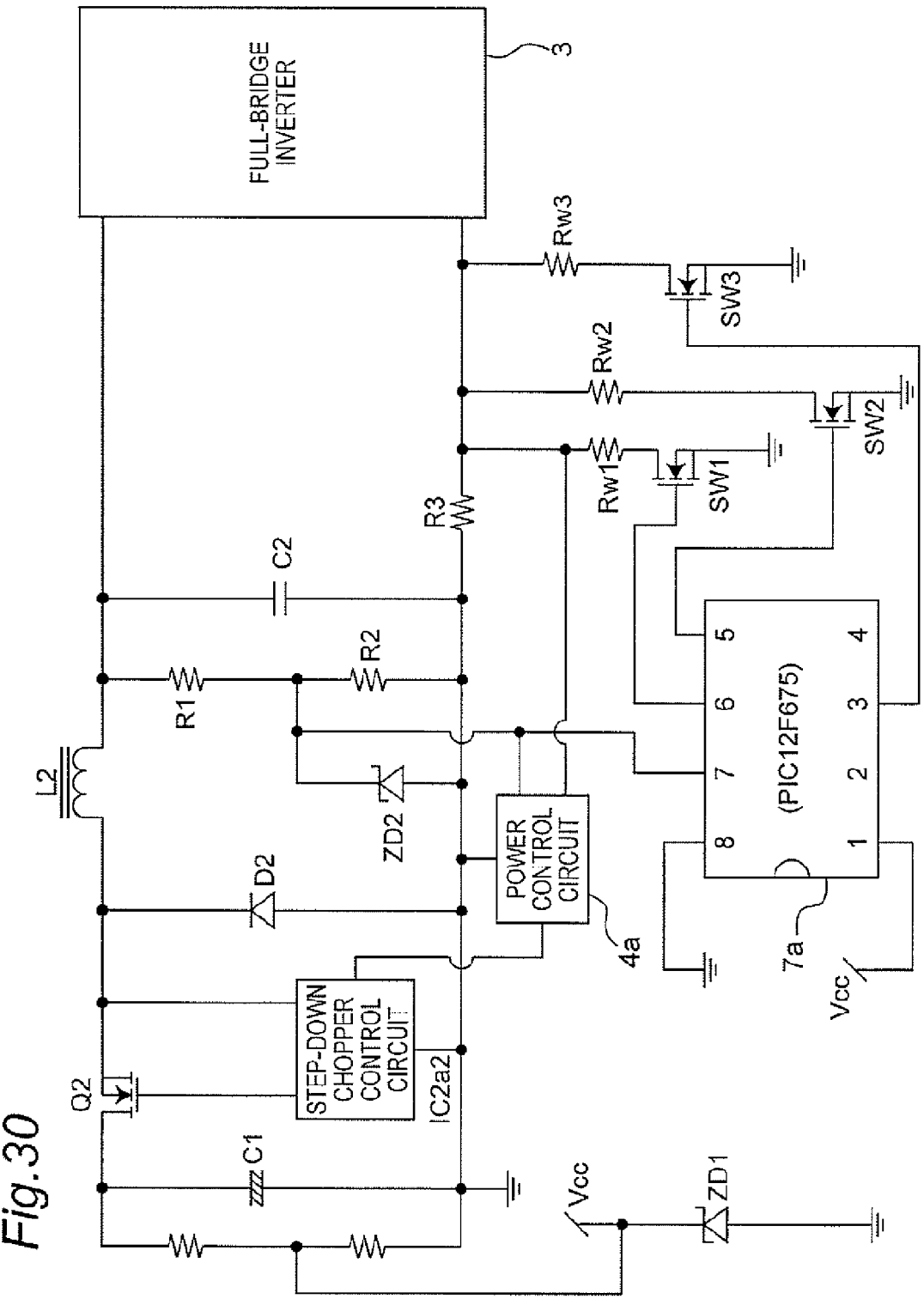
FIG. 30 is a circuit diagram showing a main part circuit configuration of Embodiment 10 of the present invention.

FIG. 30 is a diagram showing a circuit configuration of a discharge lamp lighting apparatus according to Embodiment 10. In the figure, the power conversion circuit section comprises a step-up chopper circuit, a step-down chopper circuit, and a full-bridge type inverter circuit. Although not shown in the figure, as shown in FIG. 1 of Embodiment 1, the step-up chopper circuit for improvement in power factor is comprised of the switching element Q1, diode D5, inductor L1, and capacitor C1, and is adapted to convert a DC voltage in a form of pulsating flow from a diode bridge DB to a desired DC voltage and output the voltage in the same manner as in FIG. 1. Here, the switching operation of the switching element Q1 is controlled, for example, by connecting a first pin of an integrated circuit MC34261, manufactured by Motorola, Inc. as a control circuit for the step-up chopper circuit to a gate of the switching element Q1. The first pin of MC 34261 is a pin for determining a driving frequency of the switching element Q1.

It is to be noted that the step-up chopper circuit may be a step-down chopper circuit, a step-up/down chopper circuit or the like. In short, any circuit configuration may be formed so long as being capable of converting a certain DC voltage into another DC voltage.

In FIG. 30, the step-down chopper circuit controls supply power to the high-intensity discharge lamp DL, and composed of the switching element Q2, diode DG, inductor L2 and the capacitor C2. The switching element Q2 is controlled, for example, by an integrated circuit μPC1094, manufactured by NEC Corporation shown as a control circuit IC2a2 for the step-down chopper circuit.

It is to be noted that the step-down chopper circuit nay be a step-up chopper circuit, a step-up/down chopper circuit or the like. As in the case of the step-up chopper circuit any circuit configuration may be formed so long as being capable of converting a certain DC voltage into another DC voltage.

Figure 42A:
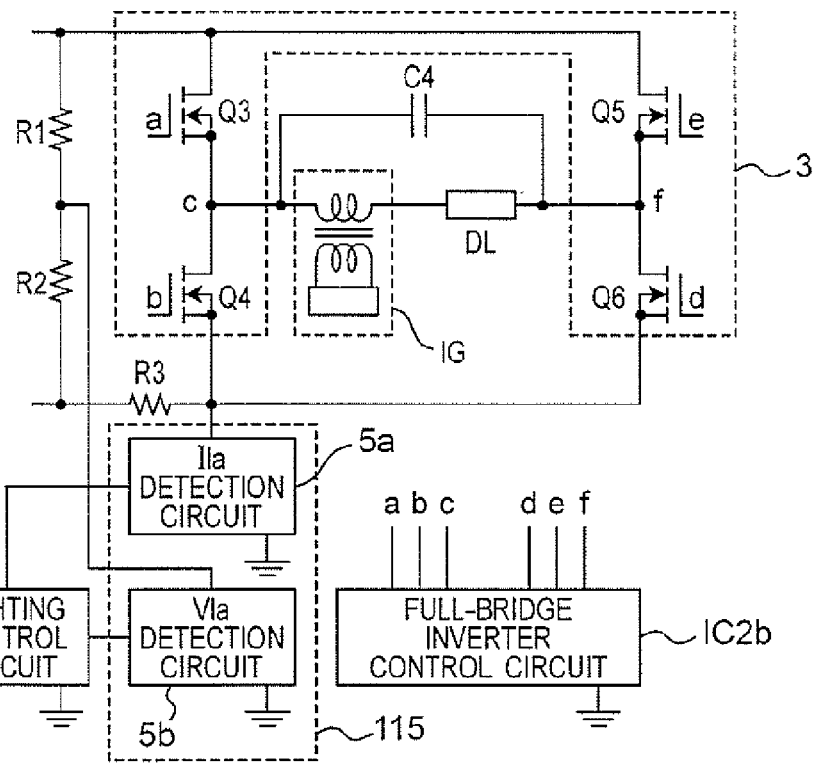
FIG. 42A is a circuit diagram showing a configuration of an inverter circuit section of Embodiment 10 of the present invention.

A full-bridge type inverter circuit section 3 according to the present embodiment has the same configuration as the conventional one. As shown in FIG. 42A, the inverter circuit section 3 converts a DC voltage from the step-down chopper circuit into a rectangular wave voltage by on/off operations of the switching elements Q3 to Q6, wherein the switching elements Q3 to Q6 are, for example, field-effect transistors. While the full-bridge type inverter circuit is adopted here, the inverter circuit may be a half-bridge type, a single chip type, or a push-pull type. In short, any circuit configuration may be formed so long as being capable of converting a certain DC voltage into an AC rectangular wave voltage. A control circuit IC2b of the full-bridge inverter circuit section 3 is connected to gates of the switching elements Q3 to Q6, to perform the switching control (on/off operation). For example, an integrated circuit M63991FP, manufactured by Mitsubishi Electric Corporation, is usable as the control circuit IC2b.

Figure 42B:
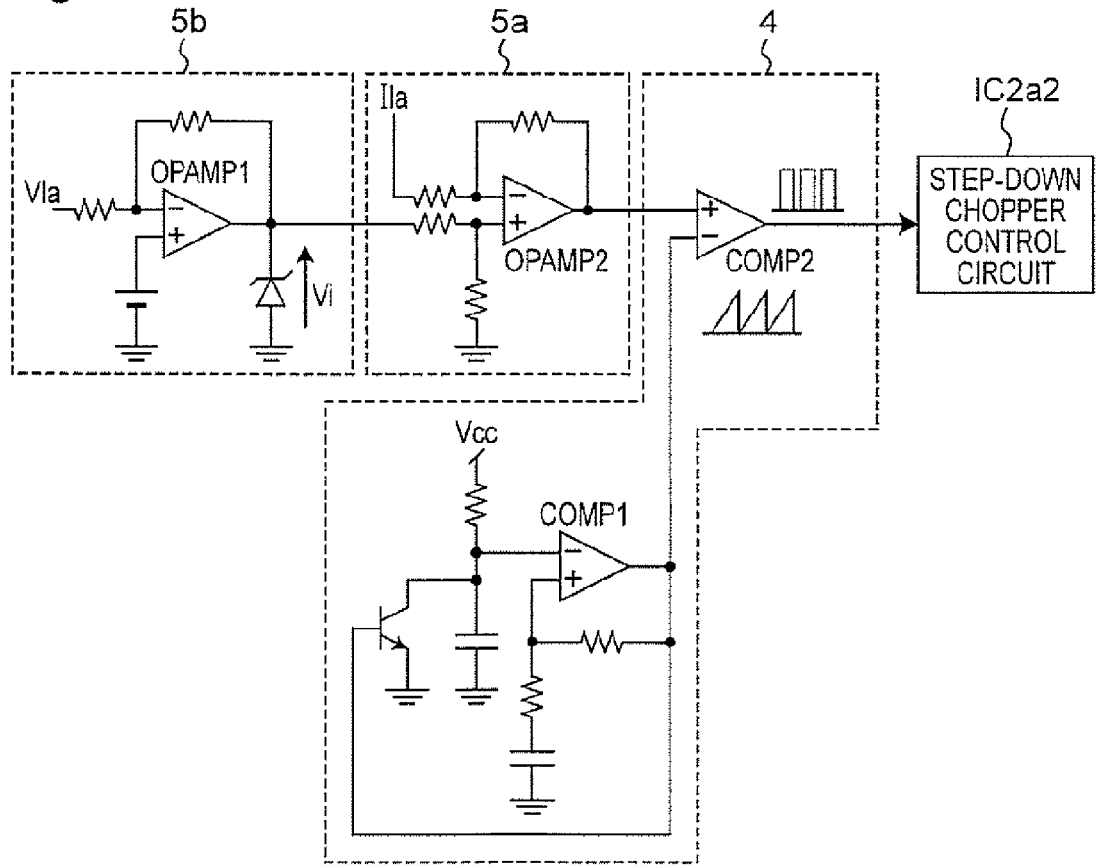
FIG. 42B is a circuit diagram showing a configuration of a lighting control circuit, a lamp current detection circuit and a lamp voltage detection circuit in Embodiment 10 of the present invention.

In regard to configuration of a power control circuit 4a of the present embodiment shown in FIG. 30, the same configuration as the conventional one of a lamp current Ila detection circuit 5a, a lamp voltage Vla detection circuit 5b and a lighting control circuit 4 can be applied. Further, the lighting control circuit 4 may be configured to include the lamp type discrimination circuit section 5 (cf. FIG. 1 of Embodiment 1). As shown in FIG. 42B, the lighting control circuit 4 is composed of a comparator COMP1, a comparator COMP2 and the like, and compares a described signal from the Ila detection circuit 5a to be described later with a reference output signal of an oscillation circuit composed of the comparator COMP1 and the like, to control the switching element Q2 through a step-down chopper control circuit ICa2a2.

As shown in FIG. 42A, a detection means 115 is composed of the Ila detection circuit 5a for detecting the lamp current and the Vla detection circuit 5b for detecting the lamp voltage, which collaborate with a later-described microcontroller 7a. The Vla detection circuit 5b is composed of an amplifier OPAMP 1 and the like, and a divided voltage Vla of the resistance R1 and the resistance R2 which is proportional to the lamp voltage is inputted to an inverting input terminal of the amplifier OPAMP 1 through a resistance. The Vla detection circuit 5b then generates a target value voltage V1 of the lamp current as a voltage value according to the lamp voltage.

The Ila detection circuit 5a is composed of an ampler OPEN 2 and the like, and amplifies a voltage based upon a difference between the target value voltage Vi and the lamp current Ila flowing through a resistance R3, and inputs the voltage to a non-inverting input terminal of the comparator COMP2 of the lighting control circuit 4. The inputted voltage is compared with a triangle wave voltage inputted to an inverting input terminal of the comparator COMP2, to thereby generate a pulse voltage for performing on/off control of the switching element Q2, and the generated pulse voltage is inputted to the step-down chopper control circuit IC2a2.

Returning to FIG. 30, the divided voltage corresponding to the lamp voltage Vla obtained by the resistances R1 and R2 is inputted to an analog port (7th pin) of the microcontroller 7a. As the microcontroller 7a, for example, used is PIC12F675 manufactured by Microchip Technology Inc. This microcontroller is an 8-bit microcontroller with an A/D converting function and a flash memory, and has an internal clock circuit in a package of an 8th pin, thereby hardly requiring an external component, to be advantageous in configuration of the control circuit.

In the present embodiment, a current detection resistance is switched as a means of switching target power by use of the microcontroller. The 3rd, 5th and 6th pins of the microcontroller are set to be output ports, and the switching of the current detection resistances Rw1, Rw2 and Rw3 as the components of the Ila detection circuit axe respectively realized for switching the target power to 30 W, 35 W and 70 W. When the 6th pin is H level, a switching element SW1 is turned on and the current detection resistances Rw1 is connected in parallel with the resistance R3. When the 5th pin is H level, a switching element SW2 is turned on and the current detection resistances Rw2 is connected in parallel with the resistance R3. When the 3rd pin is H level, a switching element SW3 is turned on and the current detection resistances Rw3 is connected in parallel with the resistance R3. This allows the switching of the target power at three stages without changing the configuration of the power control circuit 4a. It should be noted that a 1st pin of the microcontroller 7a is a power source terminal, and the 8th pin thereof is a ground terminal.

Figure 31:
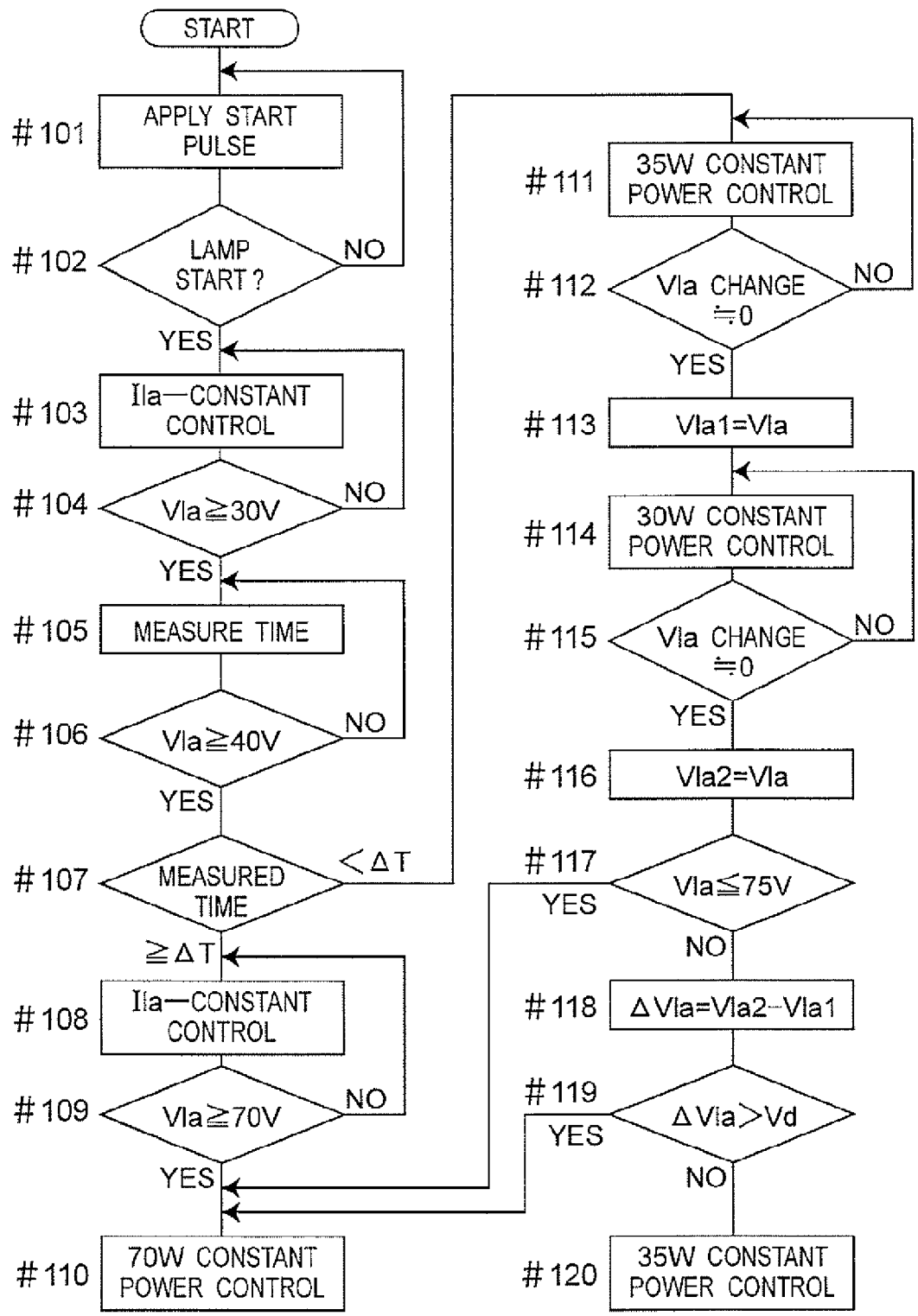
FIG. 31 is a flowchart showing an operation of the main part in Embodiment 10 of the present invention.

In the following, the operation of the microcontroller is described with reference to an operational flowchart of the microcontroller shown in FIG. 31. Before lighting of the lamp, the detection voltage of the lamp voltage Vla is almost clamped by a Zener diode ZD2 so as to set Vcc=5V. When the HID lamp is turned on by application of a start pulse, the detection voltage of the lamp voltage Vla falls down to the low level. This shift to the low level is monitored by an input of an analog port P7 (7th pin) of the microcontroller 7a to determine the lighting (#101; #102).

Next, the process is shifted to a constant current control and the lamp voltage Vla is monitored until reaching a detection voltage corresponding to 30V (#103, #104). Then, the microcontroller calculates the times t1 and t2 after the lamp voltage reaches the detection voltage corresponding to 30V until the lamp voltage reaches a detection voltage corresponding to 40V (cf. FIG. 27) (#105, #106).

While a specific measurement means depends upon a program, for example, a value of the detected voltage of the analog port (7th pin) is read by an A/D converter at fixed intervals to count the number of the value read by the A/D converter until the detection voltage shifts from the lamp voltage Vla corresponding to 30V to the voltage corresponding to 40V, whereby a measurement value corresponding to the lapse of time is obtained. Naturally, actual time may be measured from intervals at which the clock frequency of the microcontroller and the A/D converter are operated.

The measured time is compared with a previously programmed value (ΔT), and the lamp is determined as the 35 W lamp when the measured value is smaller and the lamp is determined as the 70 W lamp when the measured value is larger (#107). When the lamp is determined to be the 70 W lamp, the constant current control is continued until the lamp voltage reaches a detection voltage corresponding to 70V (#108, #109). Subsequently, the control is switched to the constant power control of 70 W (#110) (cf. B1 in FIG. 28).

Here, the above-mentioned programmed value (ΔT) is determined in consideration of values of t1 and t2 in FIG. 27 indicating the startup characteristic of the lamp voltage Vla in initial starting with respect to three samples of CDM-35 and CDM-70, respectively.

The principle of primary determination (#103 to #107) of a lamp type according to the present invention is described with reference to FIG. 27. According to FIG. 27, since the lamp voltage Vla as an inflection point of CDM-35 is V3≅47V, and the lamp voltage Vla as an inflection point of CDM-70 is almost 70V, the lamp type is determined based upon the startup characteristic of the lamp voltage Vla not higher than 47V.

Specifically, the time required for the lamp voltage Vla to shift from V1=30V to V2=40V is measured. The time t1 and t2 are apparently different between CDM-35 and CDM-70, thereby enabling determination of the rated power.

It is to be noted that, also in the case of measuring the characteristic of the same lamp in restarting, the characteristic is one shifted leftward in the time axis direction from the characteristic in initial starting (FIG. 27), and times t'1 and t'2, which are required for the lamp voltage Vla to shift from V1=30V to V2=40V, are almost the same as t1 and t2 in FIG. 27, and also, the value of the lamp voltage Vla at the inflection point is almost the same as the lamp voltage Vla. It is thereby possible to perform the primary determination of the lamp type in the same technique as above.

As described above, the time required for the startup characteristic to shift, for example, from a certain prescribed value to another prescribed value below an inflection point is measured and the measured value is compared with a previously set value, to thereby allow the primary determination of the type of the lamp currently in operation, irrespective of the initial start and the restart.

Incidentally, as described above, there are some cases where the characteristic of the 70 W lamp is improved so as to shorten the Vla startup time of FIG. 27, and the improved 70 W lamp may exhibit the startup characteristic as that of the 35 W lamp before improvement. As for such a lamp, it is determined by secondary determination of #111 to #119 whether the lamp is the 35 W lamp or the 70 W lamp having its startup characteristic improved.

Figure 32:
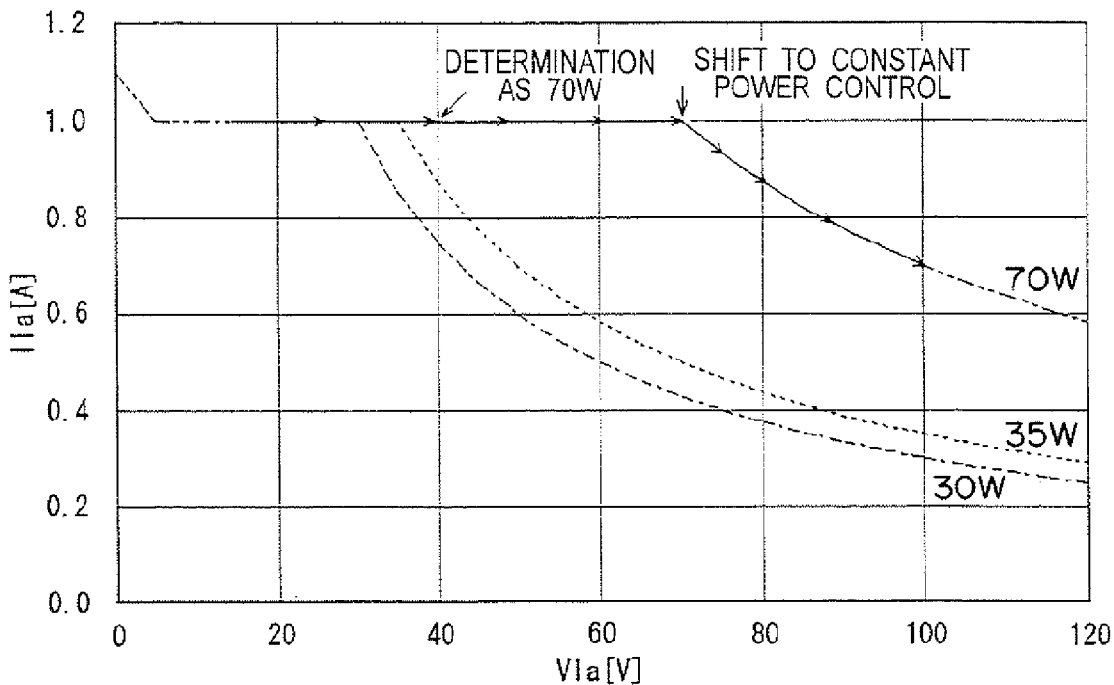
FIG. 32 is an explanatory diagram of a ballast characteristic for use in HID lamp type discrimination in Embodiment 10 of the present invention.

FIG. 32 shows a change in ballast characteristic in the case of installing a lamp which can be determined as the 70 W lamp based upon the startup characteristic in initial starting as shown in FIG. 27. During a period immediately after starting of the lamp when the lamp voltage Vla is low, the lamp is lighted by a constant current. When the lamp is determined as the 70 W lamp by the primary determination shown in Steps #101 to #110 in FIG. 27 and FIG. 31 during a period when the lamp voltage Vla shifts from 30 to 40 V, the constant current control is further performed until the lamp voltage Vla reaches about 70V. Thereafter, the control is switched to the constant power control for the 70 W lamp.

Figure 33:
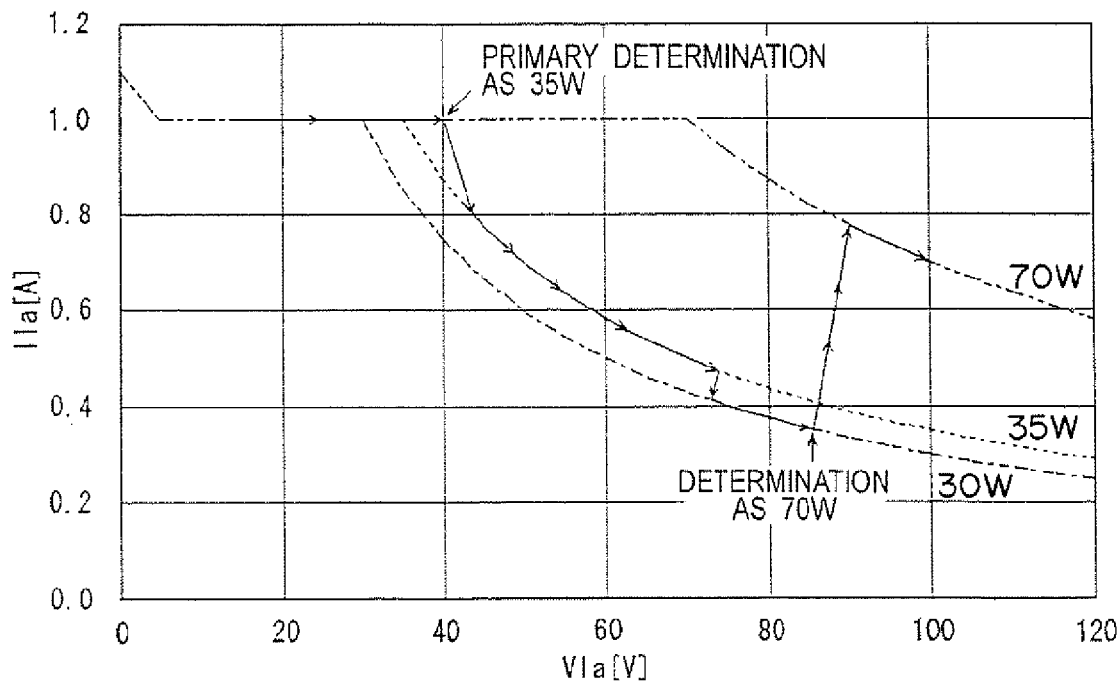
FIG. 33 is an explanatory diagram of a ballast characteristic for use in HID lamp type discrimination in Embodiment 10 of the present invention.

FIG. 33 shows a change in ballast characteristic in the case of installing a lamp which is also the 70 W lamp as above but has an improved startup characteristic in starting. During the period immediately after starting of the lamp when the lamp voltage Vla is low, the amp is lighted by a constant current as above. In the case where the lamp is not determined as the 70 W lamp during the period when the lamp voltage Vla shifts from 30 to 40 V, the control is once switched to the constant power control for the 35 W lamp having a lower lamp rated power (#111). Thereafter, it is detected that the change in lamp voltage Vla becomes almost zero (#112), and a value Vla1 of the lamp voltage Vla at that time is stored (#113), followed by switching of the lamp power to the constant power control for the 30 W lamp (#114). Subsequently, it is detected that the change in lamp voltage Vla becomes almost zero (#115), and a value Vla2 of the lamp voltage Vla at that time is stored (#116). In addition, in Step #112 or #115, it may be possible to detect the emission luminance of the discharge lamp and determine that the characteristic value becomes almost stable since the change in luminance with time has fallen on or below a prescribed value.

When the lamp voltage Vla1 is not higher than a prescribed value (e.g. 75V), the lamp is determined to be a 70 W lamp (70 W lamp having an improved startup characteristic in starting) (#117). When the lamp voltage Vla1 is larger than the above prescribed value, the expression: ΔVla=Vla2−Vla1, is calculated (#118). When ΔVla is larger than a prescribed value Vd, the lamp is determined to be a 70 W lamp (#119). When the lamp is determined as the 70 W lamp, the output control is switched to the constant power control for the 70 W lamp (#110), and the rated lighting is performed.

Figure 34:
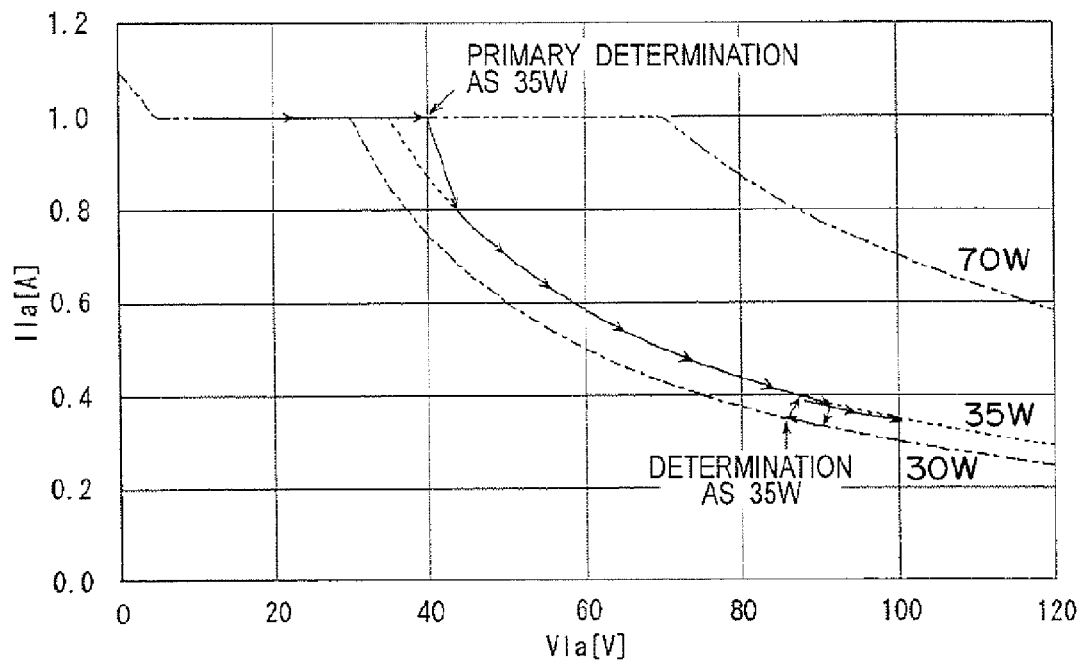
FIG. 34 is an explanatory diagram of a ballast characteristic for use in HID lamp type discrimination in Embodiment 10 of the present invention.

FIG. 34 shows a change in ballast characteristic in the case of installing a 35 W lamp. During a period immediately after starting of the lamp when the lamp voltage Vla is low, the lamp is lighted by a constant current as above. Since the lamp is not determined to be 70 W lamp during the period when the lamp voltage Vla shifts from 30 to 40 V, the control is switched to the constant power control for the 35 W lamp (#111). Thereafter, it is detected that the change in lamp voltage Vla becomes almost zero, and a value Vla1 of the lamp voltage Vla at that time is stored, followed by switching of the lamp power to the constant power control for the 30 W lamp (#112 to #114). Subsequently, it is detected that the change in lamp voltage Vla becomes almost zero, and a value Vla2 of the lamp voltage Vla at that time is stored (#115, #116).

Since Vla1 is larger than a prescribed value (e.g. 75V), the lamp is not determined as the 70 W lamp also in this case (#117). Next, the expression, ΔVla=Vla2−Vla1, is calculated (#118), and since ΔVla is not larger than a prescribed value Vd again, the lamp is determined as a 35 W lamp (#119). The output control is switched to the constant power control for the 35 W lamp (#120), and the rated lighting is performed.

Here, from FIGS. 29A and 29B, the lamp is found to be the 70 W lamp when ΔVla is almost zero or a positive numeral value, while the lamp is found to be the 35 W lamp when ΔVla is a negative value. It is therefore possible to determine the 70 W lamp and the 35 W lamp by taking a negative fixed value Vd as a threshold which serves as a prescribed value to be compared with ΔVla.

Figure 35:
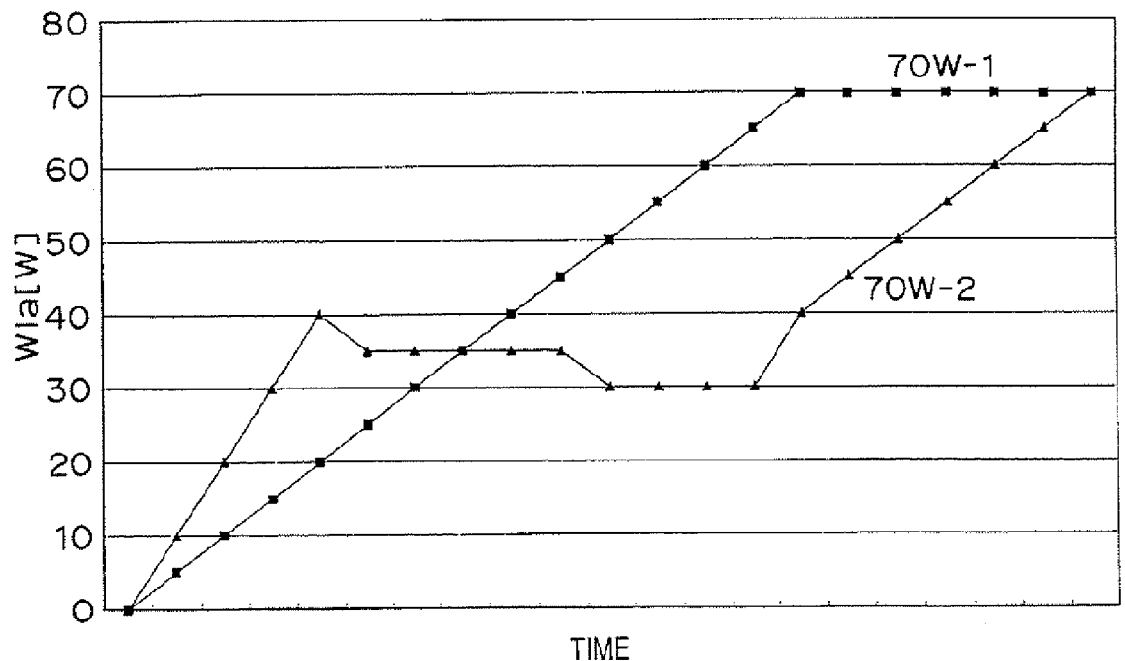
FIG. 35 is an explanatory diagram showing a change with time in lamp power in Embodiment 10 of the present invention.
Figure 36:
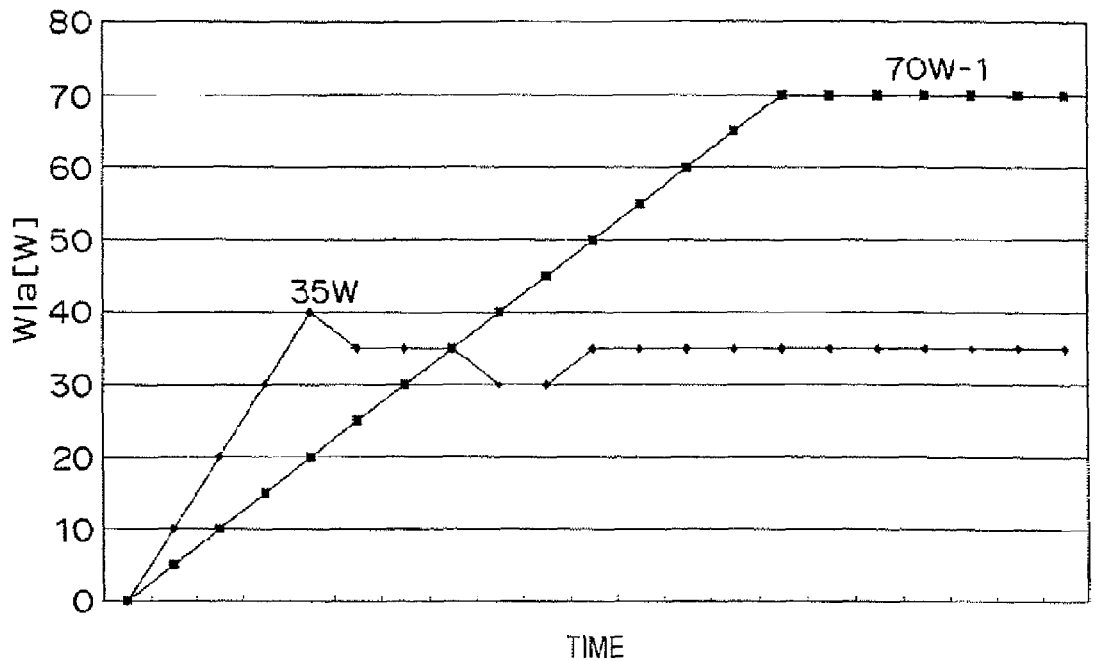
FIG. 36 is an explanatory diagram showing a change with time in lamp power in Embodiment 10 of the present invention.

FIGS. 35 and 36 show the changes in power applied to the HID lamp from start of lighting. FIG. 35 shows the changes with time lapse in power applied to the lamp in the case of installing the 70 W lamp. The change shown by ■ in the fire corresponds to the 70 W lamp (70 W−1) in FIG. 32, and the change shown by ▲ in the figure corresponds to the 70 W lamp (70 W−2) having an improved startup characteristic in starting in FIG. 33. FIG. 36 show the changes with time lapse in power applied to the lamp in the cases of the 70 W lamp (70 W−1) in FIG. 32 and the 35 W lamp in FIG. 34. The change shown by ■ in the fire corresponds to the 70 W lamp (70 W−1) in FIG. 32, and the change shown by ♦ in the figure corresponds to the 35 W lamp in FIG. 34. It is determined from FIGS. 35 and 36 that the characteristic value becomes almost stable since the change with time lapse in characteristic value of the discharge lamp has fallen on or below the prescribed value. Also from the differences in change with time lapse as described above, it is possible to determine the 70 W lamp (70 W−1), 70 W lamp (70 W−2) and 35 W lamp.

Embodiment 11

Figure 37:
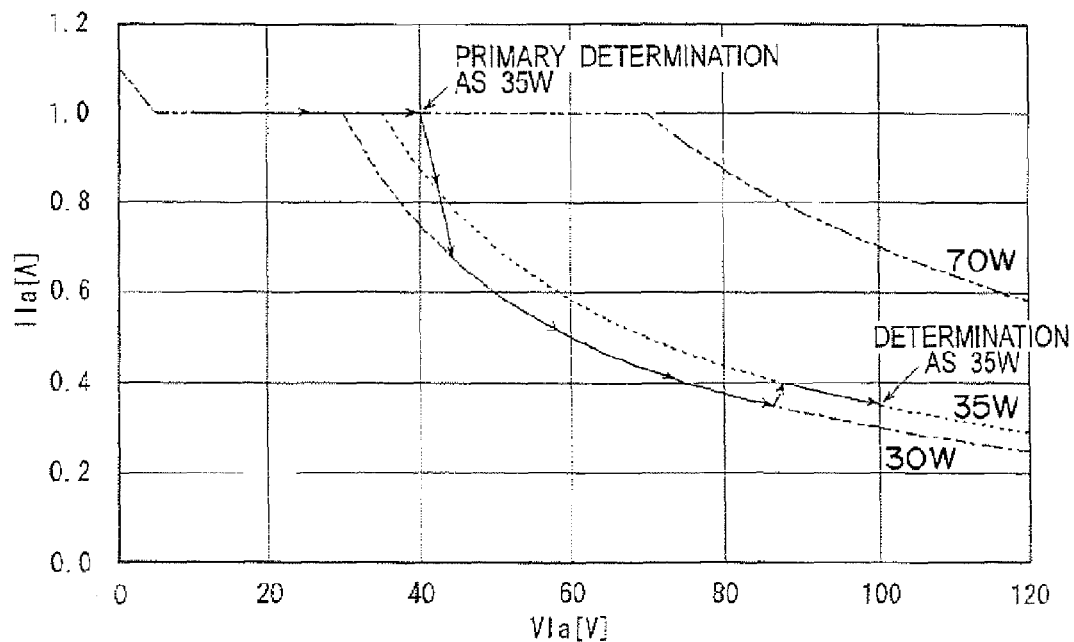
FIG. 37 is an explanatory diagram of a ballast characteristic for use in HID lamp type discrimination in Embodiment 11 of the present invention.
Figure 38:
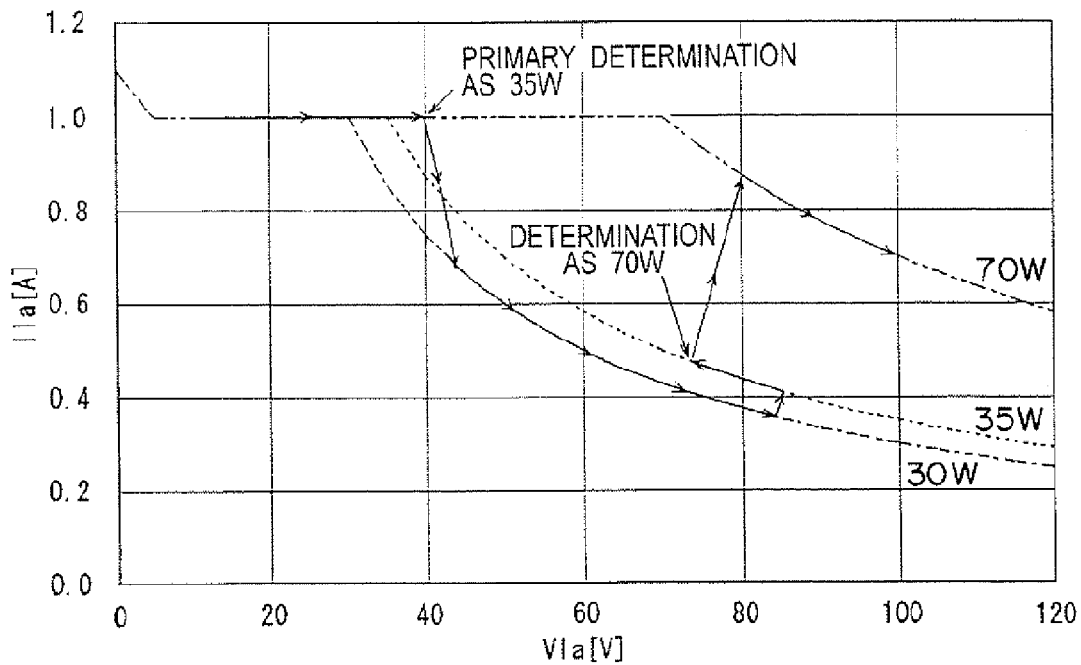
FIG. 38 is an explanatory diagram of a ballast characteristic for use in lamp type discrimination in Embodiment 11 of the present invention.

Embodiment 11 of the present invention is described with reference to FIGS. 37 and 38. Present Embodiment 11 differs from foregoing Embodiment 10 in the following point. In Embodiment 10, as shown in FIGS. 33 and 34, the ballast characteristic is switched in the order of "constant current control, constant power control with 35 W, and constant power control with 30 W", whereas in Embodiment 11, the ballast characteristic is switched in the order of "constant current control, constant power control with 30 W, and constant power control with 35 W". Namely, when the lamp is not determined as the 70 W lamp at a stage where the lamp voltage Vla reaches 40V, first, the constant power control is performed for allowing the lamp power to be 30 W in order to determine whether the lamp is the 35 W lamp or the 70 W lamp having an improved startup characteristic in starting. Subsequently, the constant power control is performed for allowing the lamp power to be 35 W. When the lamp is determined as the 35 W lamp, the constant power control for allowing the lamp power to be 35 W is continued as shown in FIG. 37. When the lamp is determined not as the 35 W lamp but as the 70 W lamp having an improved startup characteristic in starting, the control is switched to the constant power control for the lamp power of 70 W as shown in FIG. 38.

FIG. 37 shows a change in ballast characteristic in the case of installing the 35 W lamp. FIG. 38 shows a change in ballast characteristic in the case of installing the 70 W lamp whose startup characteristic in starting becomes faster due to improvement in characteristic, out of the 70 W lamps. It is to be noted that the change in ballast characteristic in the case of installing the HID lamp before improvement in characteristic, i.e. the HID lamp with a slow startup characteristic in starting, out of the 70 W lamps, is the same as in FIG. 32 described in Embodiment 10.

After the example of Embodiment 10, the operation of present Embodiment 11 is specifically described below. FIG. 32 shows a change in ballast characteristic in the case of installing the lamp that can be determined as the 70 W lamp based upon the startup characteristic in starting shown in FIG. 27. During the period immediately after starting of the lamp when the lamp voltage Vla is low, the lamp is lighted by a constant current. In the case where the lamp is determined as the 70 W lamp during the period when the lamp voltage Vla shifts from 30 to 40 V, the constant current control is further performed until the lamp voltage Vla reaches about 70V. Subsequently, the control is switched to the constant power control for the 70 W lamp.

FIG. 37 shows a change in ballast characteristic in the case of installing the 35 W lamp. During the period immediately after starting of the lamp when the lamp voltage Vla is low, the lamp is lighted by a constant current as above. Since the lamp is not determined as the 70 W lamp during the period when the lamp voltage Vla shifts from 30 to 40 V, the control is switched to the constant power control for allowing the lamp power to be 30 W. Thereafter, it is detected that the change in lamp voltage Vla becomes almost zero, and a value Vla1 of the lamp voltage Vla at that time is stored, followed by switching of the control to the constant power control for allowing the lamp power to be 35 W. Subsequently, it is detected that the lamp voltage Vla has been changed either upward or downward, and a value Vla2 of the lamp voltage Vla at that time is stored. The expression: ΔVla=Vla2−Vla1, is calculated, and when ΔVla is not smaller than a prescribed value, the lamp is determined as the 35 W lamp, and the operation is switched to the rated lighting while the constant power control for allowing the output to be 35 W is maintained.

FIG. 38 shows a change in ballast characteristic in the case of installing the HID lamp which is the 70 W lamp having an improved startup characteristic in starting. During the period immediately after starting of the lamp when the lamp voltage Vla is low, the lamp is lighted by a constant current as above. In the case where the lamp is not determined as the 70 W lamp during the period when the lamp voltage Vla shifts from 30 to 40 V, the control is switched to the constant power control for allowing the lamp power to be 30 W. Thereafter, it is detected that the change in lamp voltage Vla becomes almost zero, and a value Vla1 of the lamp voltage Vla at that time is stored, followed by switching of the control to the constant power control for allowing the lamp power to be 35 W. Subsequently, it is detected that the lamp voltage Vla has been changed either upward or downward, and a value Vla2 of the lamp voltage Vla at that time is stored. The expression: ΔVla=Vla2−Vla1, is calculated, and when ΔVla is not larger than a prescribed value, the lamp is determined as the 70 W lamp. When the lamp is determined as the 70 W lamp, the output control is switched to the constant power control for the 70 W lamp, and the rated lighting is performed.

The present embodiment is the same as Embodiment 10 in that the load is determined based upon a transient characteristic in starting (time lapse while Vla=30 to 40 V) and two characteristic values in steady lighting, and that a lighting apparatus with high reliability can be realized. A specific circuit configuration of the present embodiment is similar to that shown in the circuit diagram of FIG. 30 described in Embodiment 10. A change is made only in a program of the microcontroller (constant of the flowchart in FIG. 31), and no change is required in the circuit configuration. This is one of advantages in applying the microcontroller to the control circuit.

Embodiment 12

Figure 39:
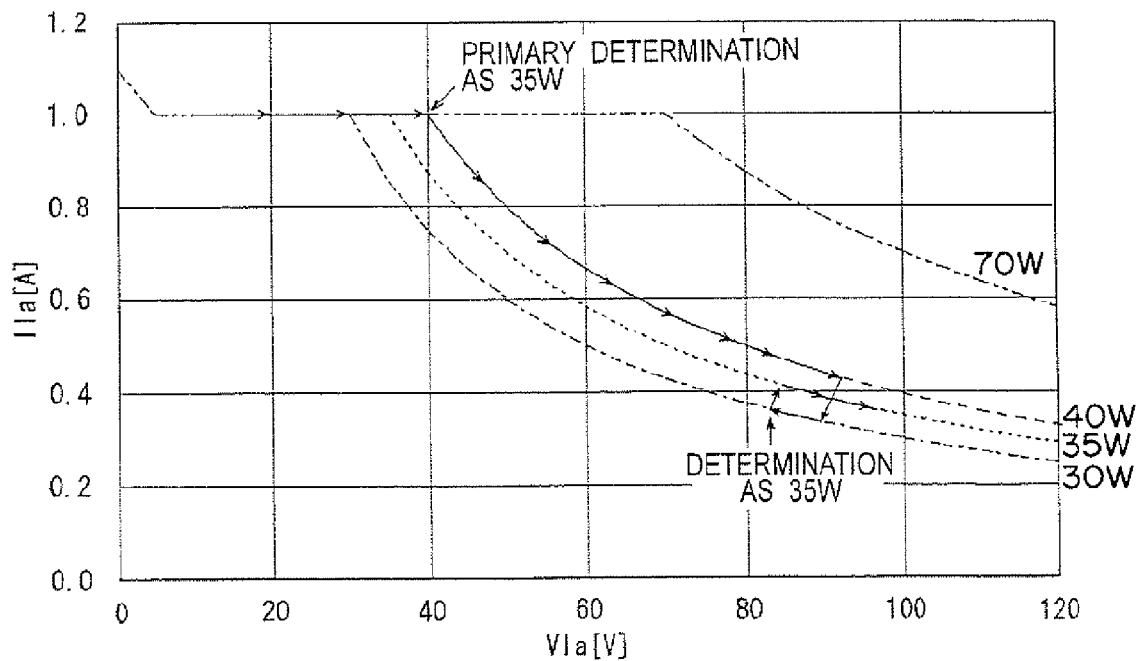
FIG. 39 is an explanatory diagram of a ballast characteristic for use in HID lamp type discrimination in Embodiment 12 of the present invention.
Figure 40:
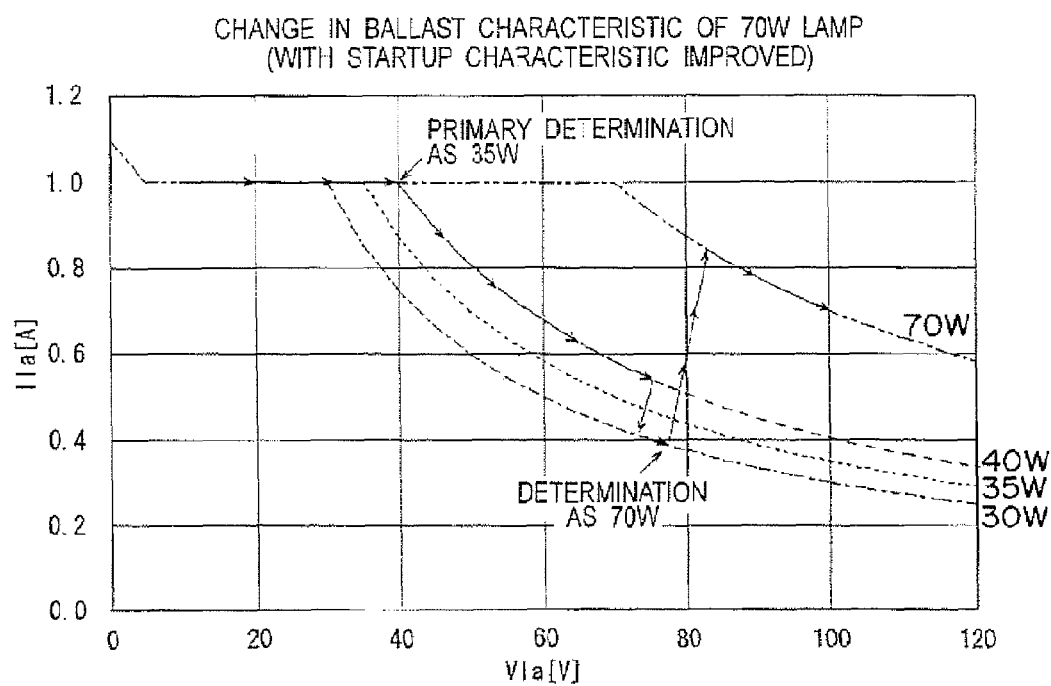
FIG. 40 is an explanatory diagram of a ballast characteristic for use in HID lamp type discrimination in Embodiment 12 of the present invention.

In the foregoing embodiments 10 and 11, the load was determined by stably lighting the lamp by a power not larger than the smaller rated power of the object lamps (35 W, 70 W). However, the lamp may be lighted by a power not smaller than the smaller rated power. For example, in FIGS. 39 and 40, after the lamp voltage Vla reaches 40V in the constant current control, the lamp is lighted with 40 W first, and then lighted with 30 W. FIG. 39 shows a change in ballast characteristic in the case of installing the 35 W lamp. FIG. 40 shows a change in ballast characteristic in the case of installing the 70 W lamp whose startup characteristic in starting becomes faster due to improvement in characteristic.

Here, when the lamp is lighted in the constant power control of 30 W, the lamp voltage Vla can be detected even before sufficient stable lighting. This is because, when the change in lamp voltage Vla is observed at the time of switching the control power, the lamp voltage Vla decreases as shown in FIG. 39 in the case of the 35 W lamp whereas the lamp voltage Vla remains unchanged or increases in the case of the 70 W lamp, and therefore, it is not necessary to wait for the lighting to become sufficiently stable. As described above, the period of the second constant power control is shortened to thereby obtain an effect of shortening the time until the lighting is shifted to the rated lighting of the lamp. It goes without saying that the shortening of the period of the second constant power control can be applied to the cases of Embodiments 10 and 11.

It should be noted that in the present embodiment, the advantage in lighting with 40 W as the first constant power control is that such lighting is at any rate in a dimming lighting state with respect to the 70 W lamp, and the larger power the lamp is lighted with, the more advantageous in the viewpoint of the lamp life and in terms of prevention of going-out of the lamp. On the other hand, since the lighting with a power larger than 35 W is excess lighting for the 35 W lamp, it is advantageous in the viewpoint of the lamp life not to light the lamp with a highly large power. Accordingly, 40 W was selected in view of the characteristics shown in FIGS. 29A and 29B.

Figure 41:
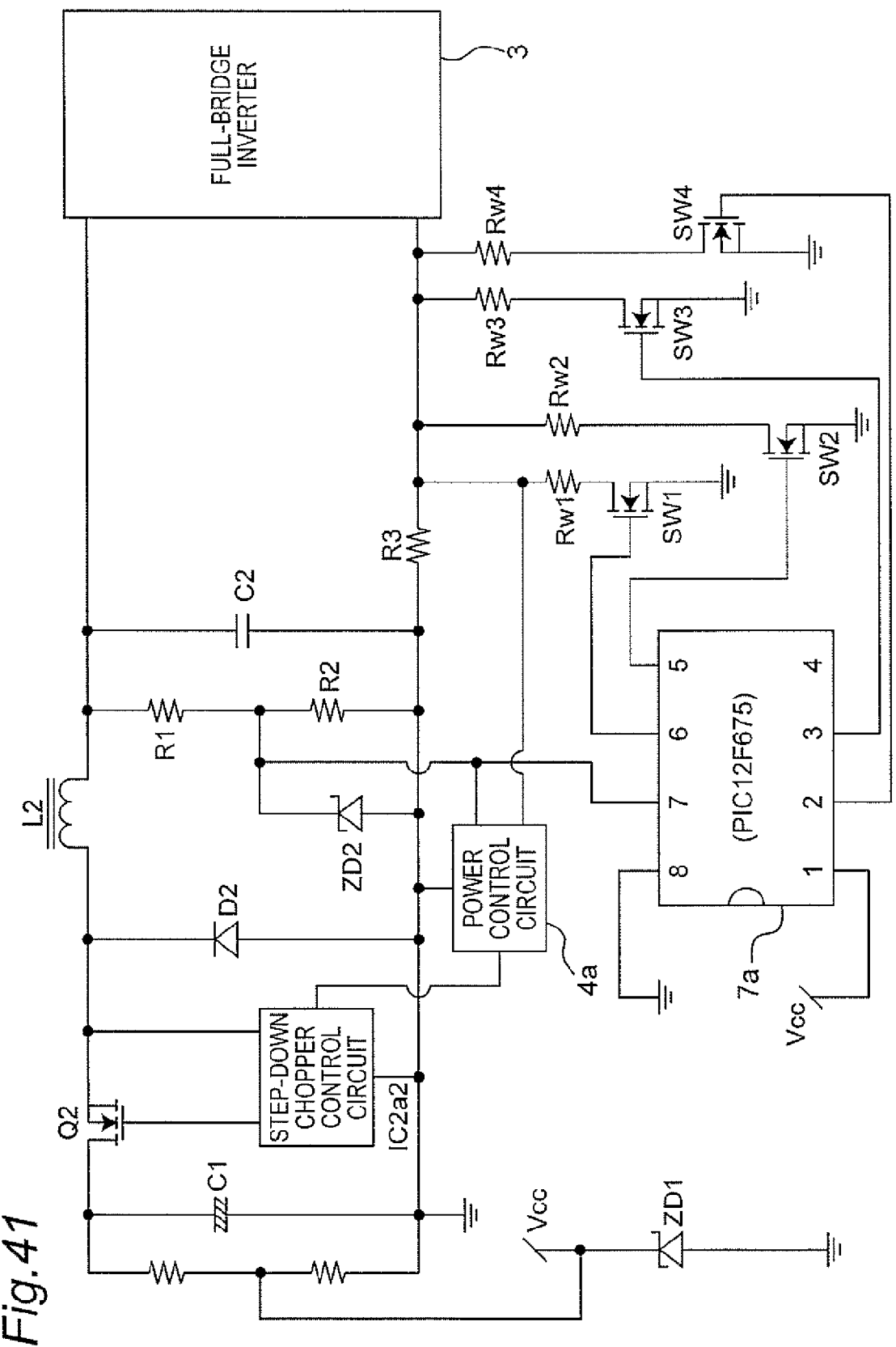
FIG. 41 is a circuit diagram showing a main part circuit configuration of Embodiment 12 of the present invention.

In order to realize the operation described above, in the circuit configuration of the present embodiment, a detection resistance Rw4 is added to the Ila detection circuit and a switch element SW4 is added to the switching means as shown ha FIG. 41 in order to realize the lighting by the constant power control of 40 W.

Further, while the 35 W lamp and the 70 W lamp are set as the load objects and the rated power lighting control is limited to 30 W, 35 W and 40 W in the foregoing Embodiments 10 and 11, it can be understood with ease that a value of the rated power lighting control may be changed as appropriate when the object lamp changes, and the value may be selected from the characteristics as shown in FIGS. 29A and 29B.

Next, Embodiments 13 to 18 according to the third aspect of the present invention are described with reference to FIGS. 43 to 53.

Embodiment 13

Figure 43:
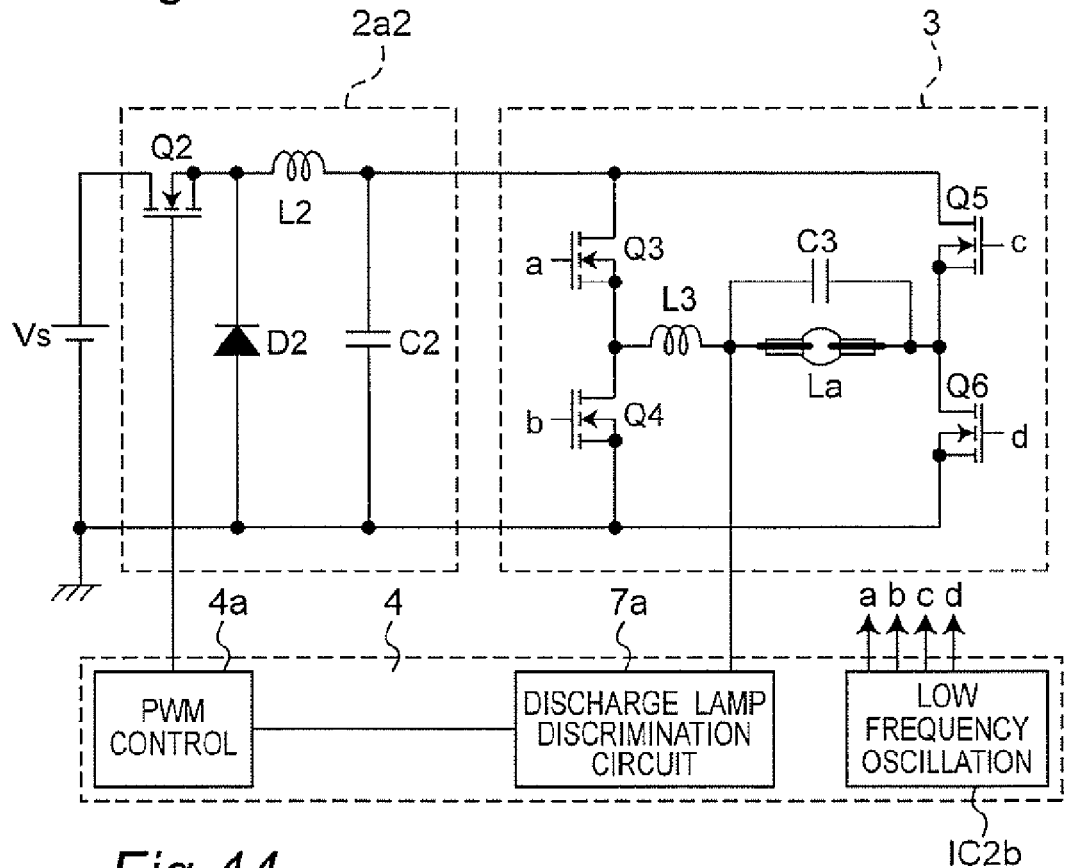
FIG. 43 is a specific circuit diagram of a discharge lamp lighting apparatus of Embodiment 13 of the present invention.

FIG. 43 shows a specific circuit diagram of the discharge lamp lighting apparatus of the present invention. This lighting apparatus comprises: a DC power source 1; power conversion circuit section 2 for converting a power from the DC power source 1 to supply the power to a high-intensity discharge lamp La; and the control circuit section 4 for controlling the supply power of the power conversion circuit section and also discriminating a plurality of types of high-intensity discharge lamps La to appropriately control the lighting of the discharge lamps La, wherein a voltage-current characteristic as an output characteristic of the lighting apparatus is composed of a substantially constant lamp current characteristic and a substantially constant lamp power characteristic. The power conversion circuit section 2 comprises a step-down chopper circuit 2a2 and a polarity inversion circuit (inverter circuit section 3) for converting the power-converted voltage and current into an AC waveform of several tens of Hz to several hundreds of Hz.

In the substantially constant lamp power characteristic, the lamp current is controlled according to an arithmetic expression of: (rated lamp power) divided by (lamp voltage). In the control circuit section 4, a discharge lamp discrimination circuit 7a includes the functions of the Ila detection circuit and the Vla detection circuit of the conventional example, and determines an output characteristic of the lighting apparatus before and after determination of the rated lamp power. The PWM control circuit 4a variably controls the on-period of the switching element Q2, and appropriately controls the respective supply power before and after determination of the rated lamp power such that the output characteristic of the lighting apparatus becomes an output characteristic indicated by the discharge lamp discrimination circuit 7a.

Figure 44:
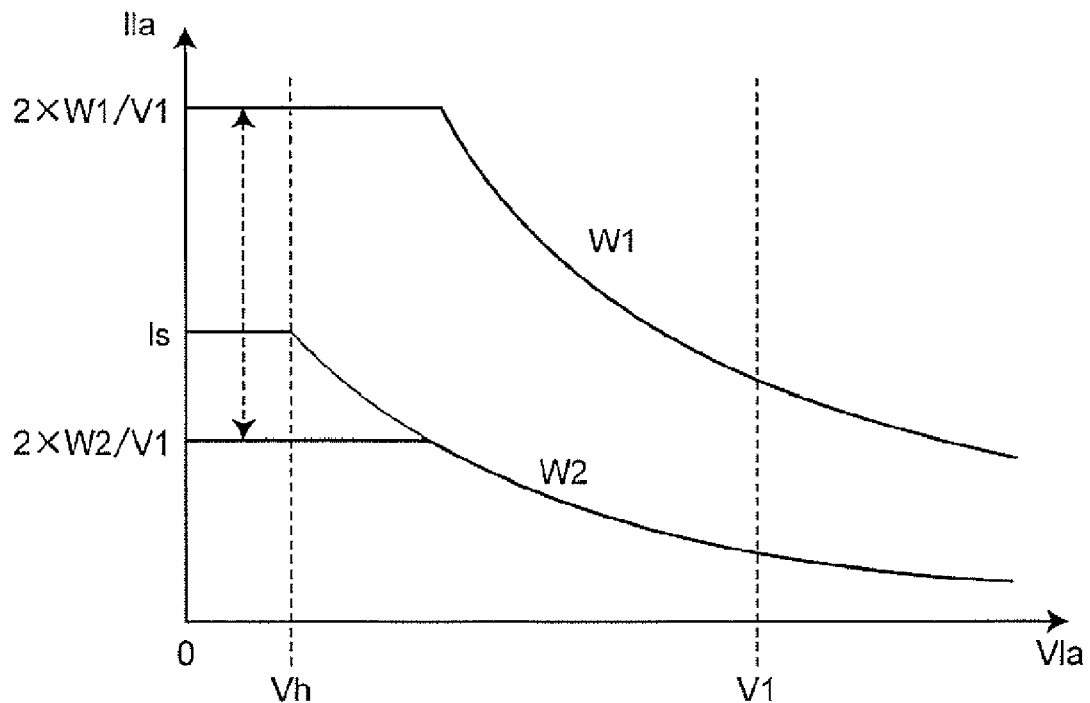
FIG. 44 is an operation explanatory diagram of Embodiment 13 of the present invention.

FIG. 44 shows an output characteristic (voltage-current characteristic) of the high-intensity discharge lamp lighting apparatus having different types of rated lamp power W1 and W2. The horizontal axis indicates the lamp voltage Vla, and the longitudinal axis indicates the lamp current Ila. The substantially constant lamp current characteristic is shown in a low lamp voltage region immediately after starting of the discharge lamp, and the substantially constant lamp power characteristic is shown from a time point when the lamp power becomes the rated lamp power. Moreover, the substantially constant lamp current values in the low lamp voltage region are set to twice the rated lamp current values (W1/V1; W2/V1).

Here described, for example, is an output characteristic of a lighting apparatus for discriminating two different types of discharge lamps, CDM35/TC/830 and CDM70/TC/830 of CDM series, manufactured by Philips Electronics. The rated lamp power and the rated lamp current of CDM35/TC/830 are 39 W and 0.53 A, respectively. The rated lamp power and the rated lamp current of CDM70/TC/830 are 70 W and 0.98 A, respectively.

Namely, the substantially constant lamp power characteristic of W1=70 W in FIG. 44 is the output characteristic for the rated lighting of CDM70/TC/830, and the substantially constant lamp power characteristic of W2=39 W in FIG. 44 is the output characteristic for the rated lighting of CDM35/TC/830. Further, since the substantially constant lamp current characteristic in the low lamp voltage region is determined by twice the rated lamp current value, it is obtained by the expression: 0.98×2=1.96 A in the case of 70 W, and by the expression: 0.53×2=1.06 A in the case of 39 W.

Namely, as the output characteristic of the lighting apparatus for discriminating two types of discharge lamps of 39 W and 70 W, the current value of the substantially constant lamp current characteristic is set in the range of 1.06 A to 1.96 A, and the substantially constant lamp power characteristic is set in the range of 39 W to 70 W.

Here, a current value of the substantially constant lamp current characteristic in the low lamp voltage region set in the range of 1.06 A to 1.96 A is denoted as "Is", and a lamp voltage value at which the current value Is and the substantially constant lamp power characteristic W2 of the discharge lamp having a smaller rated lamp power cross each other is denoted as "Vh". When the rated lamp power of the discharge lamp is determined in a region until Vh, the discharge lamp is not lighted with power not smaller than the rated lamp power, thereby not significantly deteriorating the lamp life and further allowing prevention of damage of an arc tube. As described above, setting of the output characteristic of the lighting apparatus leads to prevention of deterioration in lamp life of the two types of discharge lamps.

Embodiment 14

Figure 45:
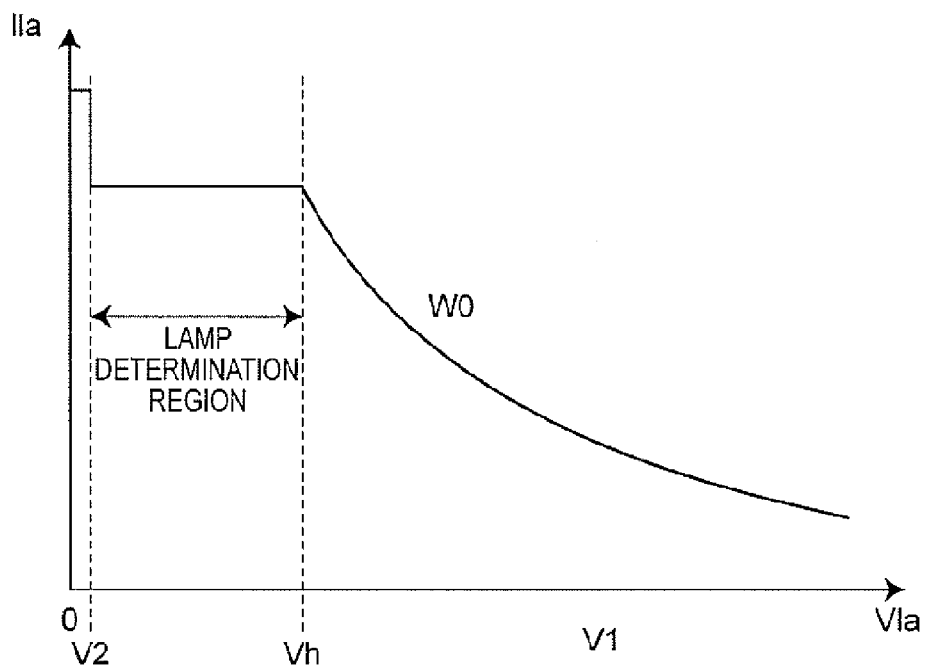
FIG. 45 is an operation explanatory diagram of Embodiment 14 of the present invention.

Embodiment 14 of the present invention is described with reference to FIG. 45. FIG. 45 shows an output characteristic (voltage-current characteristic) of a high-intensity discharge lamp lighting apparatus. While the output characteristic of the lighting apparatus is set as described in Embodiment 13, for example, in the apparatus which lights two types of lamps with the respective rated lamp power, a current in starting (current Is in the low lamp voltage region) is excessively supplied to the lamp of the smaller rated lamp power, as shown in Embodiment 13. Generally, excessive current supply in starting of the lamp brings about over-consumption of the lamp electrode to cause deterioration in lamp life.

Then, for the purpose of suppressing consumption of the lamp electrode, a current value in starting of the lamp is set to a current value (corresponding to 2×W2/V1 in FIG. 44) obtained from the lamp of the smaller rated lamp power. Consequently, the lamp of the larger rated lamp power is started with a current value smaller than a normal current value (corresponding to 2×W1/V1 in FIG. 44) in starting, which may cause start failure such as a destabilized discharge state of the discharge lamp.

Therefore, in the present Embodiment 14, the current value is set larger than a normally set substantially constant lamp current value until a prescribed lamp voltage V2 in the low lamp voltage region (Vla<Vh) of the substantially constant lamp current characteristic, to improve the start property. Needless to say, minimization of the lamp voltage V2 which increases the current in starting leads to small consumption of the lamp electrode.

Here, for example, V2 is set using the example of 35 W and 70 W of the CDM series manufactured by Phillps Electronics in Embodiment 13. The rated lamp power and the rated lamp current of the CDM35/TC/830 are 39 W and 0.53 A, respectively, and the rated lamp power and the rated lamp current of the CDM70/TC/830 are 70 W and 0.98 A, respectively. Therefore, when the current in starting in the range of 0≦Vla≦V2 is set to: 0.98×2=1.96 A, a lamp voltage at the crossing point of the constant lamp current characteristic and the constant lamp power characteristic of 39 W is obtained by: 39W/1.96A=19.9V, and this obtained value may be set as V2.

In the above manner, a normal start current value is held also in the case of the 70 W lamp, and for the 39 W lamp, the period of supplying a current larger than the normal current value in starting can be made as short as possible.

Embodiment 15

In the present embodiment, a current waveform in starting is described. Typically, in the case of the high-intensity discharge lamp, one of causes for going-out of the lamp in starting is considered to be alternation of the lamp current caused by low frequency polarity inversion. Naturally, the lamp current certainly passes through a zero current point since the current polarity alternates to positive and negative. Upon the passage, discharge becomes unstable to cause occurrence of going-out of the lamp. In the present embodiment, there is provided a means for minimizing the going-out of the lamp due to alternation.

Figure 46:
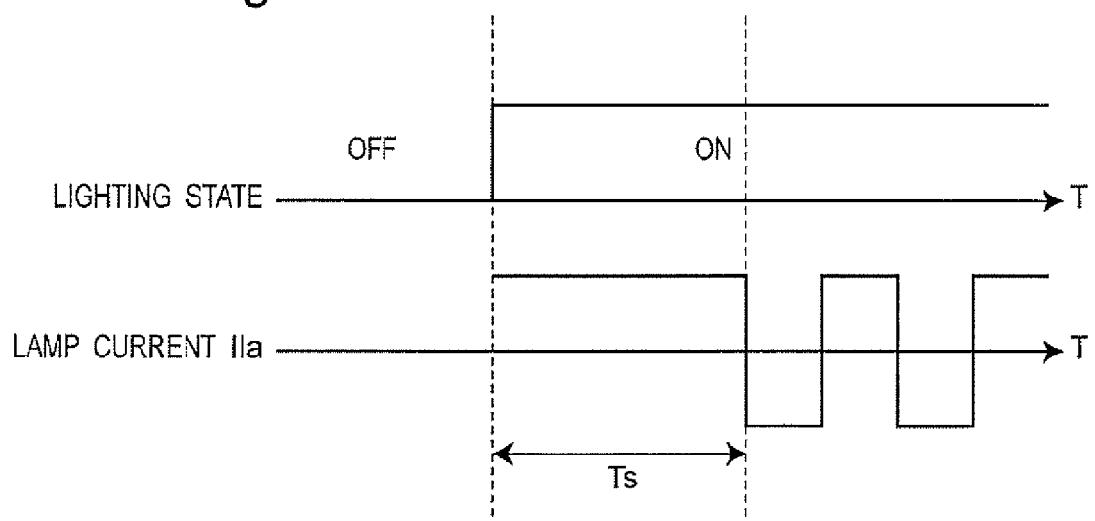
FIG. 46 is a first operation explanatory diagram of Embodiment 15 of the present invention.
Figure 48:
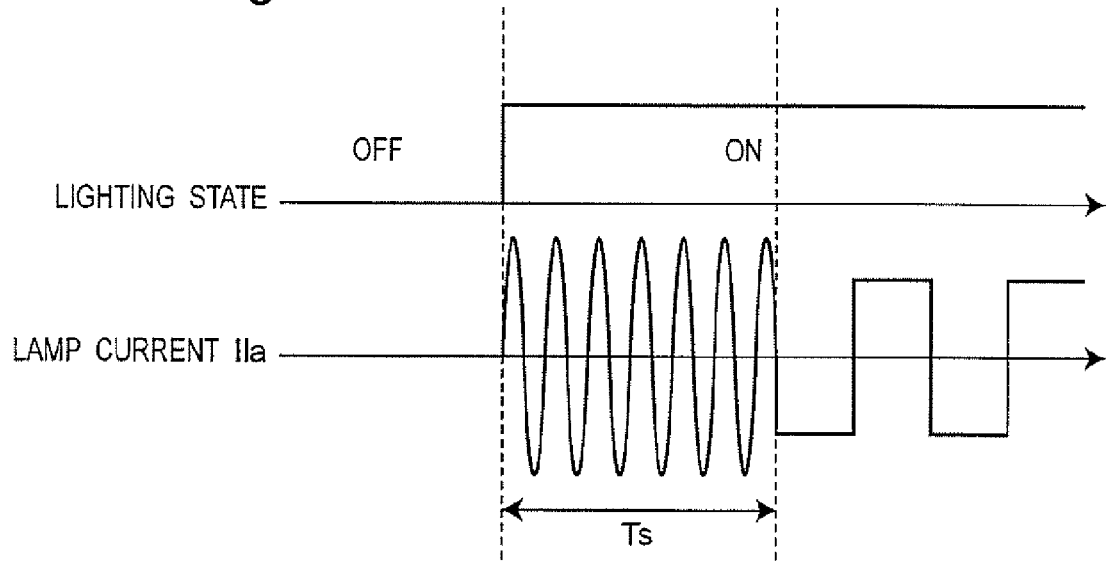
FIG. 48 is a third operation explanatory diagram of Embodiment 15 of the present invention.

A specific operation of the present embodiment is described with reference to FIG. 46. The lamp current waveform is formed to be DC form to reduce the going-out of the lamp due to alternation for polarity inversion only for a prescribed time period Ts immediately after lighting of the lamp. Further, as shown in FIG. 48, the same effect can be obtained in a high frequency current from several tens of KHz to several hundreds of KHz, which alternates for polarity inversion at high speed.

Figure 47:
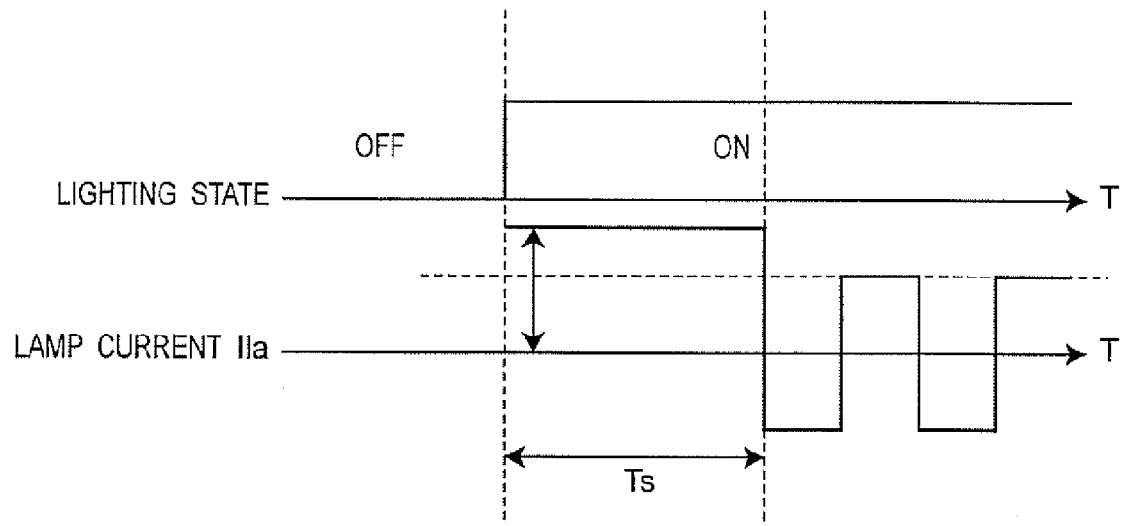
FIG. 47 is a second operation explanatory diagram of Embodiment 15 of the present invention.

Moreover, as described in Embodiment 14, when the lamp current value is increased only during the prescribed period, the start property is further improved. The lamp current waveform at that time is shown in FIG. 47. Needless to say, while the D6 current waveform is shown in FIG. 47, a high frequency current waveform may also be used as shown in FIG. 48.

Embodiment 16

In the present embodiment, a method for shifting power of a plurality of types of discharge lamps to their respective rated lamp power after discrimination of the lamps. The method is described in details with reference to FIG. 49. In the figure, the horizontal axis indicates a lapse of time T after start of lighting, and the longitudinal axis indicates lamp power Wla. It is assumed for example, that the output characteristic of the lighting apparatus has been set to a rated lamp power of a HID lamp having the minimum rated lamp power out of a plurality of types of HID lamps. In a range of 0≦T≦Th, the HID lamp is lighted with a set output characteristic in starting of the lighting apparatus.

Figure 49:
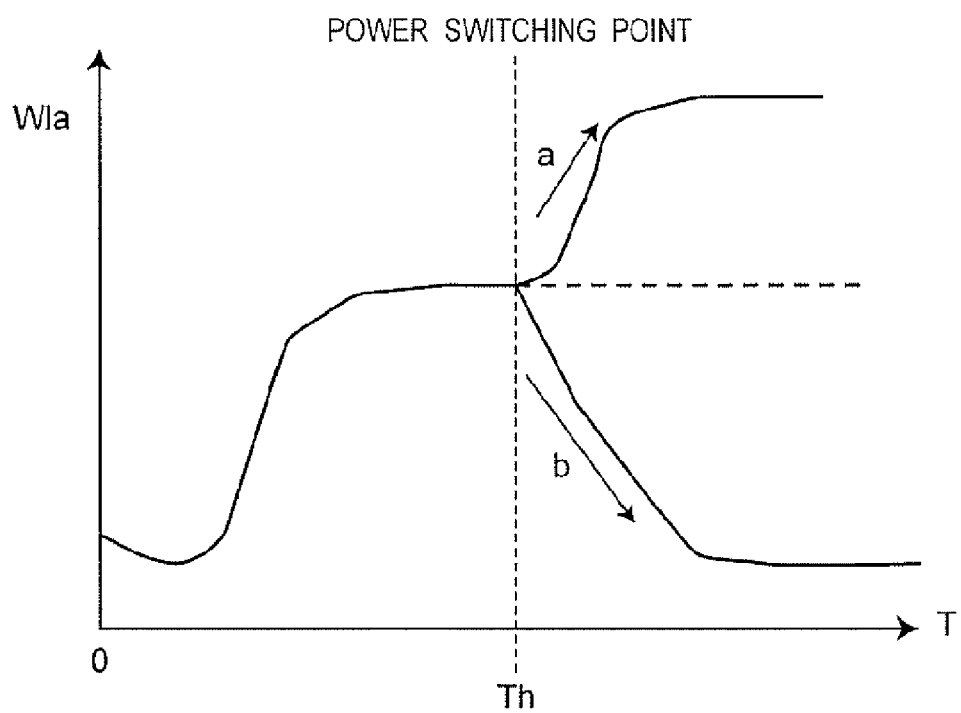
FIG. 49 is an operation explanatory diagram of Embodiment 16 of the present invention.

At a time Th in FIG. 49, after determining the lamp type, the lighting apparatus automatically switches the lighting power to a rated lamp power adapted to the determined lamp. In the example of FIG. 49, when the power is switched to the maximum rated lamp power out of the plurality of types of HID lamps, it is switched so as to be larger than the lamp power in starting, as indicated by an indicator a. Further, when the power is switched to the minimum rated lamp power out of the plurality of types of HID lamps, it is switched so as to be smaller than the lamp power in starting, as indicated by an indicator b.

At this time, in the case of the high-intensity discharge lamp, when the power is instantaneously switched to the smaller power, discharge becomes unstable to cause occurrence of going-out of the lamp. Therefore, after determination of HID lamp type, the lighting power is switched quickly when switched to larger power than the current lighting power, and the lighting power is switched relatively slowly when switched to smaller power than the current lighting power. In regard to the relation of the power switching speed (W/sec) at this time, when a power switching speed at which the power is switched to larger power than the current lighting power is denoted as A and a power switching speed at which the power is switched to smaller power than the current lighting power is denoted as B, the relation of A>B is satisfied.

Embodiment 17

Figure 50:
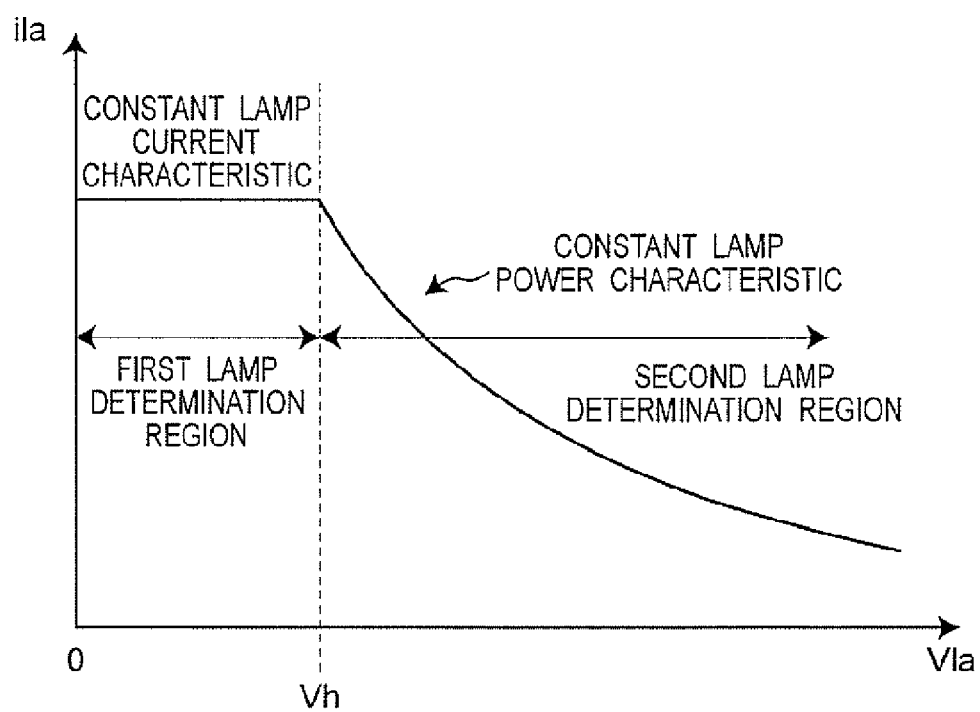
FIG. 50 is an operation explanatory diagram of Embodiment 17 of the present invention.

FIG. 50 is an explanatory diagram of Embodiment 17. In the present embodiment, a determination region for more accurately determining a lamp is described. As previously described in Embodiment 13 by determining a HID lamp type in a first lamp type determination region shown in FIG. 50, an excessive power lighting state is not present where the lamp is lighted with power not smaller than its rated lamp power and the lamp life is not deteriorated. Additionally, as shown in FIG. 50, it is possible to perform lamp determination with higher accuracy by determining the HID lamp type based on both the above determination result and a result of determination in a second lamp determination region.

It is to be noted that in the discharge lamp lighting apparatuses of Embodiments 13 to 17, the prescribed time immediately after lighting of the discharge lamp may be set to a larger current value characteristic than the prescribed substantially constant lamp current value. Further, the lamp voltage and the current waveform in the prescribed time immediately after lighting of the discharge lamp may be a DC voltage and a current waveform.

Further, the lamp voltage and the current waveform during prescribed time immediately after lighting of the discharge lamp may be a mixed waveform of a DC and a high frequency from several tens of KHz to several hundreds of KHz. In the above-mentioned discharge lamp lighting apparatus, the prescribed time immediately after lighting of the discharge lamp may be a time from lighting of the discharge lamp to shifting to arc discharge. Moreover, in the above-mentioned discharge lamp lighting apparatus, the prescribed time immediately after lighting of the discharge lamp may be a time until the discharge lamp reaches a prescribed lamp voltage value.

In the discharge lamp lighting apparatus in Embodiments 13 to 17, power switching after discrimination of a plurality of types of discharge lamps may be performed immediately after discrimination. Further, the power switching after discrimination of the plurality of types of discharge lamps may be performed after a lapse of prescribed time. Moreover, a variation in power when the power is switched to larger power than the present lighting power at the time of switching power after discrimination of the plurality of types of discharge lamps may be made larger than a variation in power when the power is switched to smaller power than the present lighting power.

Embodiment 18

Figure 51:
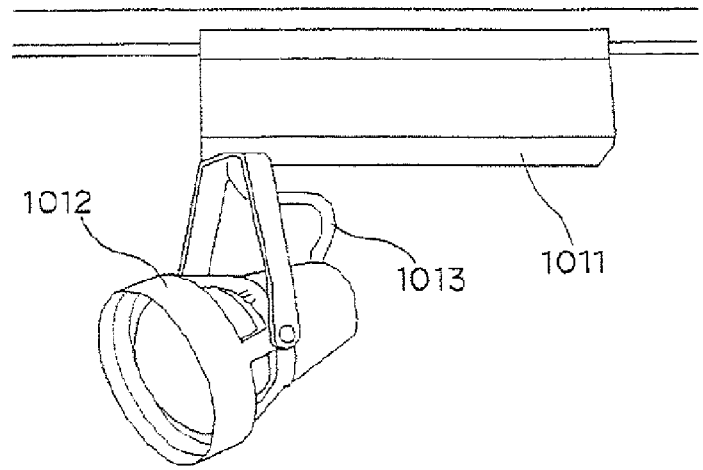
FIG. 51 is a perspective view showing one example of luminaires using the discharge lamp lighting apparatus of Embodiment 18 of the present invention.
Figure 52:
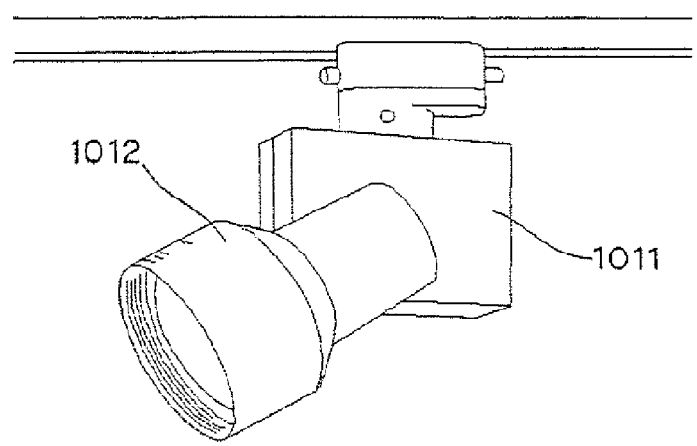
FIG. 52 is a perspective view showing another example of luminaires using the discharge lamp lighting apparatus of Embodiment 18 of the present invention.
Figure 53:
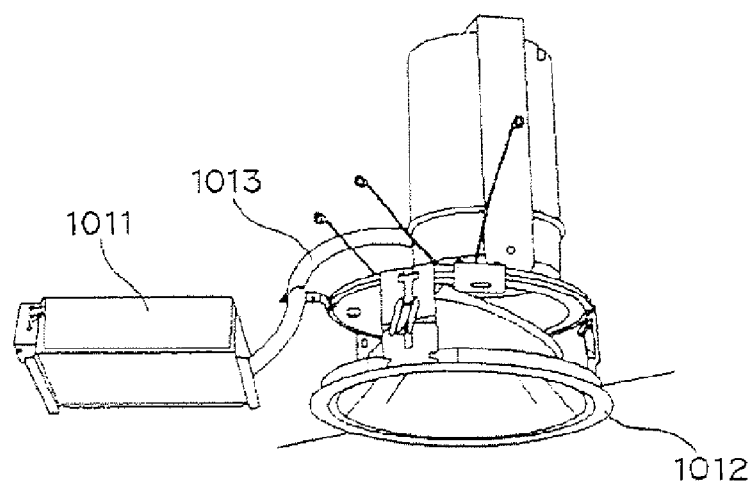
FIG. 53 is a perspective view showing still another example of luminaires using the discharge lamp lighting apparatus of Embodiment 18 of the present invention.

It is possible to provide a luminaire comprising the discharge lamp lighting apparatus of Embodiments 13 to 17 and using a plurality of types of discharge lamps as applicable lamps. FIGS. 51 to 53 show constitutional examples of luminaires using the discharge lamp lighting apparatus of the present invention. FIGS. 51 and 52 each show an example of application to a spot light. FIG. 53 shows an example of application to a down light. In the figures, numeral 1011 denotes an electronic ballast storing circuits of the lighting apparatus, numeral 1012 denotes a lighting body equipped with the high-intensity discharge lamp, and numeral 1013 denotes wiring. A plurality of types of high-intensity discharge lamps, such as 39 W and 70 W, can be appropriately selected to be installed in any of the luminaires. A plurality of those luminaires may be combined to establish an illumination system, and a plurality of different types of high-intensity discharge lamps may be mixed for use according to required illumination, emission color, design, and the like.

Installation of the foregoing high-intensity discharge lamp lighting apparatus capable of discriminating lamp types as a lighting apparatus can save a trouble of replacing high-intensity discharge lamps applicable to the respective luminaires, and further allows replacement of lamps according to an application.

INDUSTRIAL APPLICABILITY

As described above, according to the first aspect of the present invention, it is possible to provide a high-intensity discharge lamp lighting apparatus, a high-intensity discharge lamp luminaire, and high-intensity discharge lamp lighting system, capable of lighting a plurality of HID lamps. Further, by use of the high-intensity discharge lamp lighting apparatus according to the present invention, it is possible to discriminate a plurality of types of lamp rated power without applying stress to the HID lamps irrespective of states (initial start, restart) of the lamps, so that storage of only one type of high-intensity discharge lamp lighting apparatus is required in production of a luminaire thereby to reduce production cost. Further, it is possible for a user to replace the HID lamps as usage.

According to the second aspect of the present invention, in the discharge lamp lighting apparatus capable of lighting a plurality of discharge lamps with rated power and further capable of automatically discriminating rated power of the discharge lamps to light the discharge lamps with rated power thereof, even when the load object is a load whose transient characteristic is significantly different due to improvement in HID lamp characteristics, it is possible to reliably perform load discrimination based upon a difference between the transient characteristics in starting and two different steady characteristics.

According to the third aspect of the present invention, it is possible to provide a discharge lamp lighting apparatus and a luminaire, the apparatus being capable of discriminating a plurality of discharge lamps of different rated power and lighting the discharge lamps with the respective rated power, the apparatus also preventing deterioration in start characteristic and the life of each of the HID lamps.

What is claimed is:

1. A discharge lamp lighting apparatus which is to be loaded with a plurality of types of high-intensity discharge lamps and connected with any one of the lamps to be lighted, the apparatus comprising:
   a power conversion circuit section that converts power supplied from a direct-current power source into alternating-current power to be supplied to a high-intensity discharge lamp;
   a lighting control circuit section that controls the supply power of the power conversion circuit section; and
   discriminator that determines a type of a connected high-intensity discharge lamp,
   wherein said discriminator determines the type of the connected high-intensity discharge lamp based upon a change rate of an electric characteristic of the high-intensity discharge lamp during a specific period, so that the connected high-intensity discharge lamp is lit with a desired electric characteristic selected based upon the determination result, the first change rate referring to a value obtained using a detection circuit to detect, at fixed time intervals, a shift of a voltage characteristic of the high-intensity discharge lamp with a time lapse during a prescribed time lapse after the voltage characteristic reaches a first voltage and then adding the detected values, or a value obtained by dividing the added value by the prescribed time.

2. The discharge lamp lighting apparatus according to claim 1, wherein the first change rate refers to a time lapse for a voltage characteristic of the high-intensity discharge lamp to shift from a first voltage to a second voltage.

3. The discharge lamp lighting apparatus according to claim 1, wherein the first change rate refers to a value obtained by using a detection circuit to detect, at fixed time intervals, a shift of a voltage characteristic of the high-intensity discharge lamp with time lapse from a first voltage to a second voltage and then adding the detected values, or a value obtained by dividing the added value by the time required (tA, tB) for the shift from the first voltage to the second voltage.

4. The discharge lamp lighting apparatus according to claim 1, wherein the change rate refers to a voltage after a prescribed time elapses after a voltage characteristic of the high-intensity discharge lamp reaches a first voltage.

5. The high-intensity discharge lamp lighting apparatus according to either claim 4, wherein the types of high-intensity discharge lamps are determined using, as a second change rate, a value obtained by detecting, at fixed time intervals, a shift of a voltage characteristic of the high-intensity discharge lamp with time lapse during a prescribed time lapse after the voltage characteristic reaches a third voltage and then adding the detected values, or a value obtained by dividing the added value by the prescribed time, in addition to the first change rate.

6. The discharge lamp lighting apparatus according to claim 1, wherein the types of the high-intensity discharge lamps are determined based upon a lowest voltages of the high-intensity discharge lamps, in addition to the first change rate.

7. The high-intensity discharge lamp lighting apparatus according to claim 1, wherein the types of the high-intensity discharge lamps are determined using, as a second change rate, a lapse of time required for the voltage characteristics of the high-intensity discharge lamps to shift from a third voltage to a fourth voltage, in addition to the first change rate.

8. The high-intensity discharge lamp lighting apparatus according to claim 1, wherein the types of the high-intensity discharge lamps are determined using, as a second change rate, a value obtained by detecting, at fixed time intervals, a shift of a voltage characteristics of the high-intensity discharge lamp with time lapse from a second voltage to a third voltage and then adding the detected values, or a value obtained by dividing the added value by the time required for the shift from the second voltage to the third voltage, in addition to the first change rate.

9. The high-intensity discharge lamp lighting apparatus according to claim 1, wherein the types of the high-intensity discharge lamps are determined using, as a second change rate, a voltage after a prescribed time elapses after a voltage characteristic of the high-intensity discharge lamp reaches a second voltage, in addition to the first change rate.

10. The high-intensity discharge lamp lighting apparatus according to claim 1, wherein the types of the high-intensity discharge lamps are determined using, as a second change rate, a value obtained by detecting, at fixed time intervals, a shift of a voltage characteristic of the high-intensity discharge lamp with time lapse during a prescribed time lapse after the voltage characteristic reaches a second voltage and then adding the detected values, or a value obtained by dividing the added value by the prescribed time, in addition to the first change rate.

11. The high-intensity discharge lamp lighting apparatus according to claim 3, wherein the types of the high-intensity discharge lamps are determined using, as a second change rate, a lapse of time required for the voltage characteristic of the high-intensity discharge lamp to shift from a third voltage to a fourth voltage, in addition to the first change rate.

12. The high-intensity discharge lamp lighting apparatus according to claim 3, wherein the types of the high-intensity discharge lamps are determined using, as a second change rate, a value obtained by detecting, at fixed time intervals, a shift of a voltage characteristics of the high-intensity discharge lamp with time lapse from a third voltage to a fourth voltage and then adding the detected values, or a value obtained by dividing the added value by the time required for the shift from the third voltage to the fourth voltage, in addition to the first change rate.

13. The high-intensity discharge lamp lighting apparatus according to claim 1, wherein the types of the high-intensity discharge lamps are determined using, as a second change rate, a voltage after a prescribed time elapses after a voltage characteristic of the high-intensity discharge lamp reaches a third voltage, in addition to the first change rate.

14. The high-intensity discharge lamp lighting apparatus according to either claim 1, wherein the types of high-intensity discharge lamps are determined using, as a second change rate, a value obtained by detecting, at fixed time intervals, a shift of a voltage characteristic of the high-intensity discharge lamp with time lapse during a prescribed time lapse after the voltage characteristic reaches a third voltage and then adding the detected values, or a value obtained by dividing the added value by the prescribed time, in addition to the first change rate.

15. A luminaire comprising the discharge lamp lighting apparats according to claim 1.

16. An illumination system including the luminaire according to claim 15.

17. The high-intensity discharge lamp lighting apparatus according to claim 3, wherein the types of the high-intensity discharge lamps are determined using, as a second change rate, a voltage after a prescribed time elapses after a voltage characteristic of the high-intensity discharge lamp reaches a second voltage, in addition to the first change rate.

18. The high-intensity discharge lamp lighting apparatus according to claim 3, wherein the types of the high-intensity discharge lamps are determined using, as a second change rate, a value obtained by detecting, at fixed time intervals, a shift of a voltage characteristic of the high-intensity discharge lamp with time lapse during a prescribed time lapse after the voltage characteristic reaches a second voltage and then adding the detected values, or a value obtained by dividing the added value by the prescribed time, in addition to the first change rate.

19. The high-intensity discharge lamp lighting apparatus according to claim 3, wherein the types of the high-intensity discharge lamps are determined using, as a second change rate, a lapse of time required for the voltage characteristic of the high-intensity discharge lamp to shift from a third voltage to a fourth voltage, in addition to the first change rate.

20. The high-intensity discharge lamp lighting apparatus according to claim 4, wherein the types of the high-intensity discharge lamps are determined using, as a second change rate, a lapse of time required for the voltage characteristic of the high-intensity discharge lamp to shift from a third voltage to a fourth voltage, in addition to the first change rate.

21. The high-intensity discharge lamp lighting apparatus according to claim 3, wherein the types of the high-intensity discharge lamps are determined using, as a second change rate, a value obtained by detecting, at fixed time intervals, a shift of a voltage characteristics of the high-intensity discharge lamp with time lapse from a third voltage to a fourth voltage and then adding the detected values, or a value obtained by dividing the added value by the time required for the shift from the third voltage to the fourth voltage, in addition to the first change rate.

22. The high-intensity discharge lamp lighting apparatus according to claim 4, wherein the types of the high-intensity discharge lamps are determined using, as a second change rate, a value obtained by detecting, at fixed time intervals, a shift of a voltage characteristics of the high-intensity discharge lamp with time lapse from a third voltage to a fourth voltage and then adding the detected values, or a value obtained by dividing the added value by the time required for the shift from the third voltage to the fourth voltage, in addition to the first change rate.

23. The high-intensity discharge lamp lighting apparatus according to claim 3, wherein the types of the high-intensity discharge lamps are determined using, as a second change rate, a voltage after a prescribed time elapses after a voltage characteristic of the high-intensity discharge lamp reaches a third voltage, in addition to the first change rate.

24. The high-intensity discharge lamp lighting apparatus according to claim 4, wherein the types of the high-intensity discharge lamps are determined using, as a second change rate, a voltage after a prescribed time elapses after a voltage characteristic of the high-intensity discharge lamp reaches a third voltage, in addition to the first change rate.

25. The high-intensity discharge lamp lighting apparatus according to claim 3, wherein the types of high-intensity discharge lamps are determined using, as a second change rate, a value obtained by detecting, at fixed time intervals, a shift of a voltage characteristic of the high-intensity discharge lamp with time lapse during a prescribed time lapse after the voltage characteristic reaches a third voltage and then adding the detected values, or a value obtained by dividing the added value by the prescribed time, in addition to the first change rate.

26. A discharge lamp lighting apparatus which is connectable with a plurality of types of high-intensity discharge lamps and which includes a power conversion circuit section that converts power from a DC power source into AC power to be supplied to a high-intensity discharge lamp and a lighting control circuit section that controls the supply power of the power conversion circuit section, said apparatus comprising:
a detector that detects a transient characteristic of the high-intensity discharge lamp when starting of the lamp until the lamp is shifted to a stable lighting state after the DC power source is turned on, and detecting a ballast characteristic when in the stable lighting state;
a discriminator that automatically determines the type of the connected high-intensity discharge lamp based upon a combination of detection results obtained by the detector;
a switcher that switches target lighting power for driving the high-intensity discharge ramp based upon the type of the high-intensity discharge lamp determined by the discriminator; and
a lighter that lights the high-intensity discharge lamp with rated power corresponding to the determined type of the high-intensity discharge lamp.

27. The discharge lamp lighting apparatus according to claim 26, wherein said lighter constant-current drives the high-intensity discharge lamp with substantially constant lamp current only during a first period from the starting of the high-intensity discharge lamp, and subsequently, in a period of constant-power driving of the high-intensity discharge lamp with substantially constant power only during a prescribed period, said lighter constant-power drives the high-intensity discharge lamp with substantially constant first driving power only during a second period and constant-power drives the discharge lamp with substantially constant second driving power only during a third period, and wherein said detector determines the type of the high-intensity discharge lamp based upon a change rate of a characteristic value of the high-intensity discharge lamp in the first period.

28. The discharge lamp lighting apparatus according to claim 27, wherein, by switching the target lighting power by the switcher, the time for constant-power driving the high-intensity discharge lamp during the second and third periods is set to be a period until a characteristic value of the high-intensity discharge lamp becomes substantially stable, and said detector detects the characteristic value of the discharge lamp after performing the constant lamp power drive during the second and third periods, whereby said lighter lights the high-intensity discharge lamp with prescribed lighting power corresponding to the detection result.

29. The discharge lamp lighting apparatus according to claim 26, wherein said switcher switches lamp current detection resistances to switch target lighting power which is determined based on a lamp current and a target lamp voltage value using a microcontroller.

30. The discharge lamp lighting apparatus according to claim 26, wherein the rated power of the plurality of types of high-intensity discharge lamps are two types of W1 and W2 (W2>W1), and the relation thereof is: W2>W1a1>W1a2, and W1>W1a2, wherein W1 equals a first rated lamp power, W2 equals a second rated lamp power, W1a1 equals a constant first driving power, and W1a2 equal a constant second driving power.

31. The discharge lamp lighting apparatus according to claim 26, wherein the rated power of the plurality types of high-intensity discharge lamps are two types of W1 and W2 (W2>W1), and the relation thereof is: W2>W1a2>W1a1, and W1>W1$a$1, wherein W1 equals a first rated lamp power, W2 equals a second rated lamp power, W1a1 equals a constant first driving power, and W1a2 equal a constant second driving power.

32. The discharge lamp lighting apparatus according to claim 27, wherein the target lamp power is switched to an appropriate target power value after a lapse of the third period.

33. The discharge lamp lighting apparatus according to claim 26, wherein when the detector detects a change with time in characteristic value of the high-intensity discharge lamp to be equal to or below a prescribed value, it is determined that the characteristic value becomes substantially stable.

34. The discharge lamp lighting apparatus according to claim 26, wherein the detection device has an emission illumination detection of the high-intensity discharge lamp, and when detecting a change with time in emission illumination of the discharge lamp to be equal to or below a prescribed value, it is determined that the characteristic value becomes substantially stable.

35. The discharge lamp lighting apparatus according to claim 27, wherein in the third period, the detection is performed before the characteristic value of the discharge lamp becomes stable, thereby determining load types.

36. The discharge lamp lighting apparatus according to claim 30, wherein the relation of the rated power of the high-intensity discharge lamp is $W2>W1a1 \cong W1>W1a2$.

37. The discharge lamp lighting apparatus according to claim 31, wherein the relation of the rated power of the high-intensity discharge lamp is $W2>W1a2 \cong W1>W1a1$.

38. A luminaire comprising the discharge lamp lighting apparatus according to claim 26.

39. An illumination system including the luminaire according to claim 38.

40. A discharge lamp lighting apparatus, comprising:
a power conversion circuit section for converting power from a DC power source to supply the power to a high-intensity discharge lamp; and
a lighting control circuit section for controlling the supply power of the power conversion circuit section and discriminating a plurality of types of high-intensity discharge lamps and controlling lighting power of the discharge lamps,
wherein a voltage-current characteristic as an output characteristic of the lighting apparatus is set based on a voltage-current characteristic which is set within a range from twice a minimum rated lamp current to twice a maximum rated lamp current out of plural types of the high-intensity discharge lamps; and a voltage-current characteristic which consists of a range of a constant lamp power characteristic of the minimum rated lamp power and a constant lamp power characteristic of the maximum rated lamp power out of the plural types of the high-intensity discharge lamps.

41. The discharge lamp lighting apparatus according to claim 40, wherein the voltage-current characteristic as the output characteristic of the discharge lamp light lighting apparatus is substantially constant lamp current characteristic in a region not higher than a prescribed lamp voltage and a substantially constant lamp power characteristic in a region not lower than the prescribed lamp voltage.

42. The discharge lamp lighting apparatus according to claim 40, wherein the discrimination of the plural types of the high-intensity discharge lamps is performed in the range of the substantially constant lamp current characteristic of the voltage-current characteristic as the output characteristic of the lighting apparatus.

43. The discharge lamp lighting apparatus according to claim 40, wherein the discrimination of the plural types of the high-intensity discharge lamps is performed in both the range of the substantially constant lamp current characteristic and the range of the substantially constant lamp power characteristic of the voltage-current characteristic and the output characteristic of the lighting apparatus.

44. A luminaire comprising the discharge lamp lighting apparatus according to claim 40.

45. An illumination system including the luminaire according to claim 44.

* * * * *

UNITED STATES PATENT AND TRADEMARK OFFICE
CERTIFICATE OF CORRECTION

PATENT NO.        : 7,425,802 B2                                        Page 1 of 1
APPLICATION NO.   : 11/568142
DATED             : September 16, 2008
INVENTOR(S)       : J. Kumagai et al.

It is certified that error appears in the above-identified patent and that said Letters Patent is hereby corrected as shown below:

At column 38, line 54 (claim 1, line 15) before "change" insert --first--.

At column 39, lines 9-10 (claim 3, lines 7-8) after "required" delete "(tA, tB)".

At column 40, line 29 (claim 15, line 2) "apparats" should be --apparatus--.

At column 41, line 53 (claim 26, line 18) "ramp" should be --lamp--.

At column 44, line 1 (claim 41, line 3) after "lamp" delete --light--.

At column 44, line 2 (claim 41, line 4) before "substantially" insert --a--.

At column 44, line 17 (claim 43, line 6) "and" should be --as--.

Signed and Sealed this

Twenty-sixth Day of May, 2009

JOHN DOLL
*Acting Director of the United States Patent and Trademark Office*